(12) United States Patent
Horne et al.

(10) Patent No.: US 7,739,511 B2
(45) Date of Patent: Jun. 15, 2010

(54) SYSTEMS AND METHODS FOR WATERMARKING SOFTWARE AND OTHER MEDIA

(75) Inventors: William G. Horne, Lawrenceville, NJ (US); Umesh Maheshwari, San Jose, CA (US); Robert E. Tarjan, Princeton, NJ (US); James J. Horning, Palo Alto, CA (US); W. Olin Sibert, Lexington, MA (US); Lesley R. Matheson, Campbell, CA (US); Andrew K. Wright, Monroe Township, NJ (US); Susan S. Owicki, Palo Alto, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 255 days.

(21) Appl. No.: 11/927,220

(22) Filed: Oct. 29, 2007

(65) Prior Publication Data

US 2008/0215891 A1    Sep. 4, 2008

Related U.S. Application Data

(63) Continuation of application No. 09/629,807, filed on Jul. 31, 2000, now abandoned.

(60) Provisional application No. 60/146,420, filed on Jul. 29, 1999.

(51) Int. Cl.
*H04L 9/32* (2006.01)
*B42D 15/00* (2006.01)
*H04N 1/40* (2006.01)

(52) U.S. Cl. .................. 713/176; 283/113; 358/3.28

(58) Field of Classification Search .................. 713/176
See application file for complete search history.

(56) References Cited

U.S. PATENT DOCUMENTS

| 5,287,407 A | 2/1994 | Holmes |
| 5,339,426 A | 8/1994 | Aoshima |
| 5,535,329 A | 7/1996 | Hastings |

(Continued)

FOREIGN PATENT DOCUMENTS

WO    WO 99/64973    * 12/1999

(Continued)

OTHER PUBLICATIONS

Zane, Francis. Efficient Watermark Detection and Collusion Security. 2000. p. 21-32.*

(Continued)

*Primary Examiner*—Christian Laforgia
(74) *Attorney, Agent, or Firm*—Finnegan, Henderson, Farabow, Garrett & Dunner LLP

(57) ABSTRACT

Systems and methods are disclosed for embedding information in software and/or other electronic content such that the information is difficult for an unauthorized party to detect, remove, insert, forge, and/or corrupt. The embedded information can be used to protect electronic content by identifying the content's source, thus enabling unauthorized copies or derivatives to be reliably traced, and thus facilitating effective legal recourse by the content owner. Systems and methods are also disclosed for protecting, detecting, removing, and decoding information embedded in electronic content, and for using the embedded information to protect software or other media from unauthorized analysis, attack, and/or modification.

2 Claims, 31 Drawing Sheets

U.S. PATENT DOCUMENTS

| | | | |
|---|---|---|---|
| 5,664,018 A * | 9/1997 | Leighton | 380/54 |
| 5,701,452 A * | 12/1997 | Siefert | 707/1 |
| 5,745,569 A * | 4/1998 | Moskowitz et al. | 705/58 |
| 5,930,768 A | 7/1999 | Hooban | |
| 5,943,422 A | 8/1999 | Van Wie et al. | |
| 5,949,885 A | 9/1999 | Leighton | |
| 6,006,328 A * | 12/1999 | Drake | 726/23 |
| 6,044,155 A | 3/2000 | Thomlinson et al. | |
| 6,055,503 A * | 4/2000 | Horstmann | 705/1 |
| 6,085,249 A * | 7/2000 | Wang et al. | 709/229 |
| 6,088,452 A | 7/2000 | Johnson et al. | |
| 6,088,814 A * | 7/2000 | McKenzie et al. | 714/6 |
| 6,119,230 A | 9/2000 | Carter | |
| 6,167,358 A | 12/2000 | Othmer et al. | |
| 6,185,312 B1 * | 2/2001 | Nakamura et al. | 382/100 |
| 6,233,684 B1 * | 5/2001 | Stefik et al. | 713/176 |
| 6,243,480 B1 * | 6/2001 | Zhao et al. | 382/100 |
| 6,246,775 B1 | 6/2001 | Nakamura et al. | |
| 6,263,493 B1 * | 7/2001 | Ehrman | 717/114 |
| 6,266,654 B1 | 7/2001 | Schull | |
| 6,317,834 B1 | 11/2001 | Gennaro et al. | |
| 6,351,837 B1 * | 2/2002 | Huang et al. | 714/733 |
| 6,385,603 B1 | 5/2002 | Chen et al. | |
| 6,415,041 B1 | 7/2002 | Oami et al. | |
| 6,425,081 B1 | 7/2002 | Iwamura | |
| 6,442,284 B1 | 8/2002 | Gustafson et al. | |
| 6,449,377 B1 | 9/2002 | Rhoads | |
| 6,499,137 B1 | 12/2002 | Hunt | |
| 6,504,941 B2 | 1/2003 | Wong | |
| 6,513,118 B1 | 1/2003 | Iwamura | |
| 6,522,766 B1 * | 2/2003 | Ratnakar | 382/100 |
| 6,522,767 B1 * | 2/2003 | Moskowitz et al. | 382/100 |
| 6,522,770 B1 * | 2/2003 | Seder et al. | 382/100 |
| 6,546,505 B1 | 4/2003 | Swoboda et al. | |
| 6,549,638 B2 | 4/2003 | Davis et al. | |
| 6,553,129 B1 | 4/2003 | Rhoads | |
| 6,590,995 B1 | 7/2003 | Schwenk et al. | |
| 6,611,607 B1 | 8/2003 | Davis et al. | |
| 6,636,615 B1 * | 10/2003 | Rhoads et al. | 382/100 |
| 6,665,419 B1 | 12/2003 | Oami | |
| 6,668,325 B1 * | 12/2003 | Collberg et al. | 713/194 |
| 6,728,390 B2 * | 4/2004 | Rhoads et al. | 382/100 |
| 6,744,906 B2 * | 6/2004 | Rhoads et al. | 382/100 |
| 6,754,822 B1 | 6/2004 | Zhao | |
| 6,785,399 B2 | 8/2004 | Fujihara | |
| 6,785,815 B1 | 8/2004 | Serret-Avila et al. | |
| 6,801,999 B1 | 10/2004 | Venkatesan et al. | |
| 6,807,634 B1 * | 10/2004 | Braudaway et al. | 713/176 |
| 6,829,710 B1 * | 12/2004 | Venkatesan et al. | 713/176 |
| 6,834,343 B1 * | 12/2004 | Burns | 713/176 |
| 7,003,731 B1 | 2/2006 | Rhoads et al. | |
| 7,058,813 B2 | 6/2006 | Burns | |
| 7,124,170 B1 | 10/2006 | Sibert | |
| 7,143,290 B1 | 11/2006 | Ginter et al. | |
| 7,231,524 B2 | 6/2007 | Burns | |
| 7,236,610 B1 | 6/2007 | Luo et al. | |
| 7,266,217 B2 | 9/2007 | Rhoads et al. | |
| 7,281,133 B2 | 10/2007 | Ginter et al. | |
| 7,287,166 B1 | 10/2007 | Chang et al. | |
| 2004/0181671 A1 * | 9/2004 | Brundage et al. | 713/176 |
| 2005/0066181 A1 | 3/2005 | Burns | |
| 2005/0160271 A9 | 7/2005 | Brundage et al. | |
| 2005/0182956 A1 | 8/2005 | Ginter et al. | |
| 2006/0123237 A1 | 6/2006 | Burns | |
| 2007/0016790 A1 | 1/2007 | Brundage et al. | |
| 2008/0028474 A1 | 1/2008 | Horne et al. | |
| 2008/0149713 A1 | 6/2008 | Brundage | |
| 2008/0301452 A1 | 12/2008 | Horne et al. | |
| 2009/0178022 A1 | 7/2009 | Horne et al. | |

FOREIGN PATENT DOCUMENTS

| | | |
|---|---|---|
| WO | WO 99/064973 A1 | 12/1999 |

OTHER PUBLICATIONS

Cox, Ingemar J. et al. A review of watermarking and the importance of perceptual modeling. Feb. 1997. p. 1-8.*

Dan Boneh et al. Collusion-Secure Fingerprinting for Digital Data. Sep. 1998. IEEE. vol. 44 No. 5. p. 1897-1905.*

Office Action mailed Feb. 24, 2004, for U.S. Appl. No. 09/629,807, filed Jul. 31, 2000.

Office Action mailed Jan. 27, 2005, for U.S. Appl. No. 09/629,807, filed Jul. 31, 2000.

Office Action mailed Oct. 18, 2005, for U.S. Appl. No. 09/629,807, filed Jul. 31, 2000.

Office Action mailed Jul. 11, 2006, for U.S. Appl. No. 09/629,807, filed Jul. 31, 2000.

Advisory Action mailed Sep. 19, 2006, for U.S. Appl. No. 09/629,807, filed Jul. 31, 2000.

Office Action mailed Oct. 17, 2006, for U.S. Appl. No. 09/629,807, filed Jul. 31, 2000.

Notice of Allowance mailed Mar. 5, 2007, for U.S. Appl. No. 09/629,807, filed Jul. 31, 2000.

Notice of Allowance mailed Aug. 7, 2007, for U.S. Appl. No. 09/629,807, filed Jul. 31, 2000.

Office Action mailed Jun. 15, 2009, for U.S. Appl. No. 11/737,428, filed Apr. 19, 2007.

Office Action mailed Sep. 21, 2009, for U.S. Appl. No. 11/927,200, filed Oct. 29, 2007.

Cox et al., A Review of Watermarking and the Importance of Perceptual Modeling, pp. 1-8 (1997).

Zane, Efficient Watermark Detection and Collusion Security, pp. 21-32 (2000).

Ichisugi, Yuuji, "Watermark for Software and Its Insertion, Attacking, Evaluation and Implementation Methods," (in Japanese), Summer Symposium on Programming, Jul. 1997, pp. 57-64.

"Zelix KlassMaster—Java Obfuscator Change History," Zelix KlassMaster 2$^{nd}$ Generation Protection, Mar. 21, 2002, 7 pages, http://www.zelix.com/klassmaster.

"Zelix KlassMaster—Java Obfuscator—Java Flow Obfuscation," Zelix Klassmaster, Apr. 17, 2001, http://www.zelix.com/klassmaster/featuresflowobfuscation.html, 2 pages.

Zhang, Xiaolan, et al., "System Support for Automatic Profiling and Optimization," The Proceedings of the 16$^{th}$ Symposium on Operating Systems Principles, Oct. 1997, pp. 1-14.

* cited by examiner

```
inline void InsertMark2() {
static int sum;

//  sum = (((sum+MARK0)^MARK1)+MARK2)^MARK3
_asm {
            mov eax, sum
            add eax, MARK0
            xor eax, MARK1
            add eax, MARK2
            xor eax, MARK3
            mov sum, eax
}
}
```

1602 brackets the above block.

```
inline void InsertWatermarkPrimer3() {
static int sum;
//  sum = (((sum+PRIMER0)+PRIMER1)+PRIMER2)+PRIMER3
_asm {
            mov eax, sum
            add eax, PRIMER0
            add eax, PRIMER1
            add eax, PRIMER2
            add eax, PRIMER3
            mov sum, eax        // Store computed value
}
}
```

1604 brackets the above block.

Fig. 16

SYSTEMS AND METHODS FOR WATERMARKING SOFTWARE AND OTHER MEDIA

RELATED APPLICATIONS

This application is a continuation of application Ser. No. 09/629,807, filed Jul. 31, 2000 now abandoned, which claims priority from U.S. Provisional Application Ser. No. 60/146,420, entitled "Software Watermarking Systems and Methods," filed Jul. 29, 1999, and is related to commonly-assigned U.S. patent application Ser. No. 09/629,546, entitled "Software Self-Defense Systems and Methods," filed Jul. 31, 2000 ("the Software Self-Defense application"), each of which is hereby incorporated in its entirety by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the protection of electronic content. More particularly, the present invention relates to systems and methods for watermarking computer software or other electronic content for the purpose of identifying content or controlling its use, and for detecting, tracing, and resisting attacks.

BACKGROUND OF THE INVENTION

Advances in microelectronics and networking technology have enabled the development of increasingly complex computer systems. The software that controls these systems or operates thereon has also become exceedingly complex. As a result, companies often spend large sums to develop the software that they sell to consumers or use in commerce. Yet software, like other forms of electronic content—such as digital music, images, video clips, and text—can be easily modified, copied, and distributed without the permission of its creator.

Although encryption is often used to prevent the unauthorized use of electronic content, encryption is insufficient to protect content at all times, since the content must be decrypted before it can be used for its intended purpose, and once decrypted, can be saved, modified, copied, and/or transmitted to others in unencrypted form.

Content can also be protected by marking it with special identification information. The added information may, for example, identify the person to whom the content was sold. If all authorized copies of the content include such identification information, then someone who attempts to copy or sell the content without the creator's permission can be identified by examining the identification information found in the unauthorized copies.

Thus, a person wishing to distribute unauthorized copies of the electronic content may try to avoid detection by removing the identification information, or by forging the identification information of an innocent party. To avoid such attacks, content owners often try to hide the identification information, and/or to embed it in such a way that removing it from the content will render the content useless or less desirable.

Information that is added to electronic content in the manner described above is often referred to as a "watermark," by analogy to the marks used by paper manufacturers to indicate the origin and quality of their paper. There are a number of fundamental differences, however, between digital watermarks and paper watermarks, including differences in the way the watermarks are applied and used, and in the properties that the watermarks possess.

While increasing attention has been paid to the development of techniques for watermarking digital images and digital audio and video content, relatively little attention has been paid to the development of techniques for watermarking software. Moreover, the watermarking techniques that have been developed for electronic content, and software in particular, are often relatively complicated to apply and/or relatively easy to defeat. What is needed are systems and methods for more efficiently and/or more robustly embedding information in software and other electronic content. Improved systems and methods are also needed for detecting, extracting, and decoding information embedded in software or other electronic content, and for using the embedded information to manage and enforce the rights and interests of the content owner.

SUMMARY OF THE INVENTION

The present invention provides systems and methods for embedding information in software and/or other media such that the information is difficult for an unauthorized party to detect, remove, insert, forge, and/or corrupt. The embedded information can thus be used to protect content by identifying the content's source, thereby enabling unauthorized copies or derivatives to be reliably traced, and thus facilitating effective legal recourse by the content owner. Systems and methods are also disclosed for protecting, detecting, removing, and decoding the embedded information, and for utilizing the embedded information to, e.g., protect software or other media from unauthorized analysis, attack, and/or modification. It should be appreciated that the present invention can be implemented in numerous ways, including as a process, an apparatus, a system, a device, a method, or a computer readable medium. Several inventive embodiments of the present invention are described below.

In one embodiment, obfuscation techniques are used to impede an attacker's attempts to understand the structure and/or operation of a program. In general, these techniques also make watermarks more difficult to identify, remove, and/or replace, as they typically make it more difficult to deduce the importance, or lack thereof, of particular code sequences to the program's correct operation. Tamper resistance techniques are also used to make it difficult for attackers to analyze or modify a program without detection. The present invention also provides methods for making watermarks blend in with the rest of the program, thus making it difficult for an attacker to spot the watermarks in the program's static image. The present invention also provides a variety of techniques for resisting specific attacks, including collusive and auto-collusive attacks. The systems and methods of the present invention also can be used to make it difficult for an attacker to use knowledge gained from one successful attack to mount another.

In one embodiment, a system and method for watermarking a computer program (or other piece of electronic content) is provided. The program is "primed" by inserting a sequence of code that is operable to produce a distinctive pattern. The primed program may then be compiled or transformed in some other manner. The primed program is then watermarked by finding the distinctive pattern, and inserting watermarking information at a location indicated thereby. In one embodiment, the sequence of programming code is inserted via a macro or inlined function, and comprises a sequence of executable machine language instructions.

In another embodiment, a method for inserting a plurality of copies of a watermark into a computer program is described. Each copy of the watermark is combined with a different, quasi-randomly-selected number, or "salt," and the combination is encrypted and embedded in the program. A digital signature of the watermark copy may also be included in the combination. In one embodiment, an unencrypted copy of the salt is also embedded in the program with the encrypted combination. A watermark can be detected by decrypting the encrypted combination and identifying the relationship between the decrypted copy of the watermark and the signature, and/or between the decrypted salt and the unencrypted copy of the salt.

In another embodiment, a method for watermarking copies of a computer program is disclosed. A unique combination of obfuscating transformations is applied to a copy of the computer program, the obfuscating transformations being operable to create a unique "signature." Other copies of the computer program can also be obfuscated with other unique combinations of transformations. An individual copy of the computer program can be identified by detecting the signature left by the obfuscating transformations that were applied to that copy.

In another embodiment, a method for detecting a watermark embedded in an executable software file is described. The watermark is detected by sequentially proceeding through the executable file looking for distinctive registration information associated with the watermark. In one embodiment, portions of the executable file are decrypted, and the resulting decrypted value is analyzed to see if it satisfies a predefined relationship. If it does, then the decrypted value is deemed to be part of the watermark. The process of decrypting and analyzing portions of the executable file can be repeated until the entire watermark is retrieved.

In yet another embodiment, a method for watermarking a piece of software in a manner designed to resist a collusive attack is described. Watermarks are encoded as a sequence of multi-bit symbols, wherein each symbol is selected from a predefined alphabet. In a preferred embodiment, the length of the sequence, the size of the alphabet, and the number of bits in each symbol are selected in relation to an expected number of colluders. This encoding technique is simpler than the Boneh-Shaw encoding technique, and is shorter in length if the expected number of colluders is small.

In another embodiment, a method for protecting a program instance-specific watermark (or fingerprint) from collusive attacks is described. The method involves performing a number of obfuscating transformations on the program—such as rearranging the program's basic blocks, inserting opaque predicates, rearranging the program's control flow graph, and the like—to create a number of different program versions. Instances of each version can be marked with instance-specific watermarks. The number of expected colluders can be used to determine how many versions to create.

In another embodiment, a method for watermarking and distributing a piece of software is described. The software is divided into at least two portions. Copies of the first portion are distributed to consumers, and copies of the second portion are individually watermarked and maintained in a database. When a consumer wishes to activate his or her copy of the first portion of the software, the consumer contacts the database administrator and asks for a copy of the second portion. The copy of the second portion is combined with the copy of the first portion, either on the consumer's computer system or at a remote server, and a record is maintained of the unique watermark contained in the copy of the second portion that was used. In some embodiments, additional watermarks can be embedded in the copy of the second portion before it is combined with the consumer's copy of the first portion.

In another embodiment, a method is provided for protecting watermarks in a computer program from unauthorized detection or modification. A number of obfuscating transformations are performed on the program before and/or after watermarking, and one or more self-checking or other tamper-resistance mechanisms are added to the program. Mechanisms for detecting debuggers or other analysis tools may also be added.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 16 illustrates the use of inlined functions to insert watermarks into a piece of software in accordance with an embodiment of the present invention.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. For example, while embodiments are described in the context of a system and method for watermarking software, those skilled in the art will recognize that the disclosed systems and methods are readily adaptable for broader application. For example, without limitation, the present invention could be readily applied in the context of watermarking other types of protected content, such as audio, video, or textual files. In addition, while numerous specific details are set forth in the following description in order to provide a thorough understanding of the present invention, the present invention may be practiced according to the claims without some or all of these details. Finally, for the purpose of clarity, certain technical material that is known in the art has not been described in detail in order to avoid obscuring the present invention.

1. Overview

The present invention provides systems and methods for watermarking software and other media, such that the watermarks are difficult for unauthorized parties to detect, remove, insert, forge, and/or corrupt. Watermarking is closely related to information hiding techniques such as steganography and fingerprinting, and indeed, the precise dividing line between these techniques is somewhat ill-defined. Thus, for ease of explanation, and unless otherwise clear from the context, the term "watermarking" will be used to refer to information hiding and/or embedding techniques in general, and is intended to encompass what some practitioners may classify as watermarking, steganography, fingerprinting, and/or other information hiding or embedding techniques.

Figure 1A:
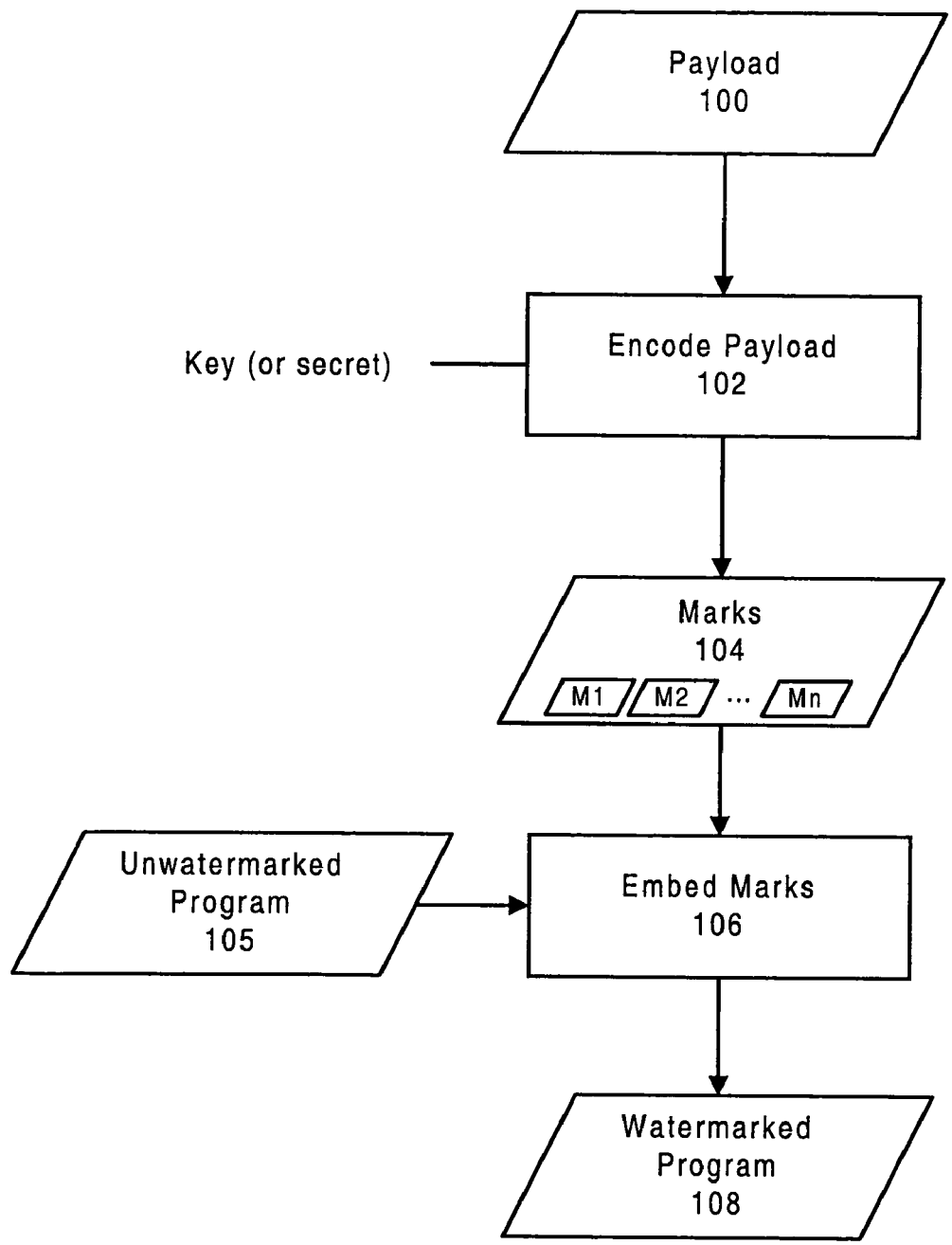
FIGS. 1A and 1B show a general process for inserting watermarks into, and extracting watermarks from, a piece of software or other content.
Figure 1B:
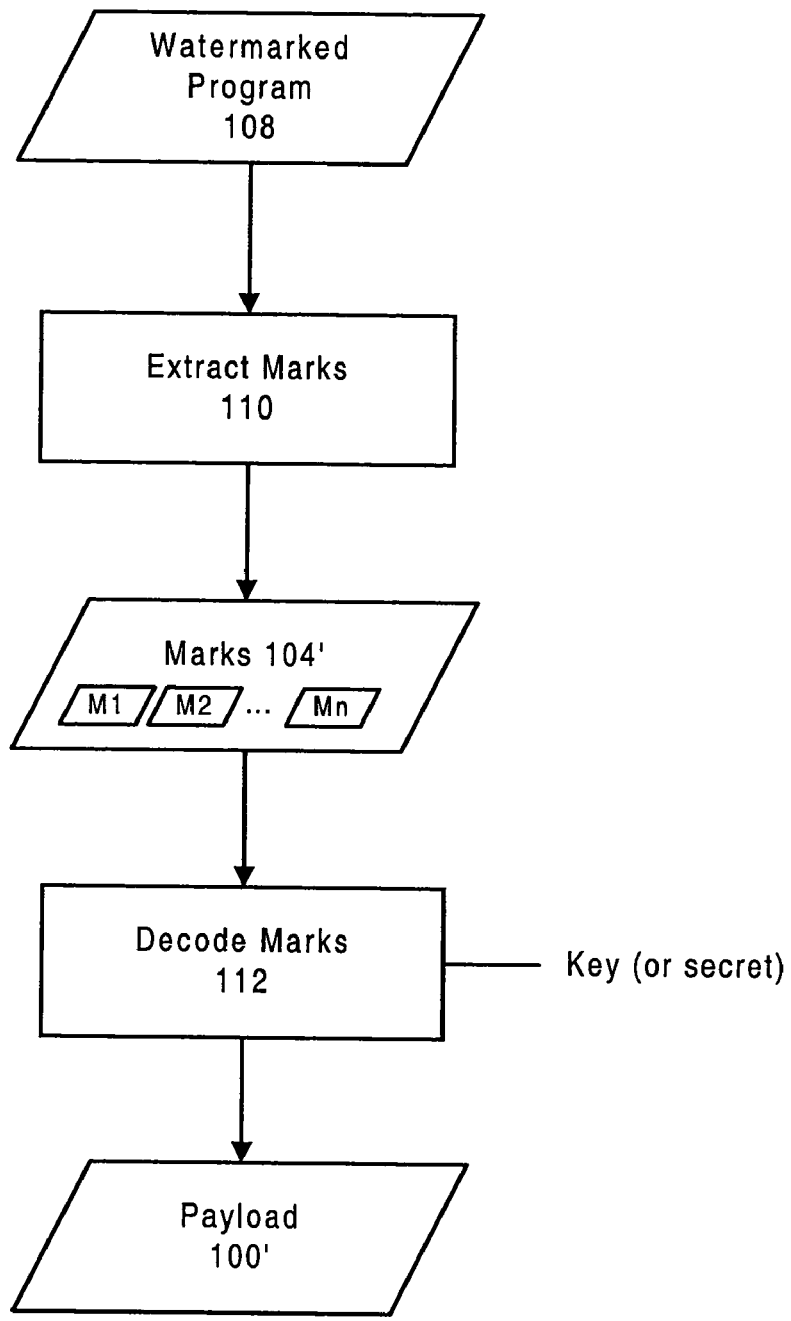

FIGS. 1A and 1B show a general process for inserting watermarks into a piece of software or other content (the "substrate"), and for retrieving watermarks from the same. As shown in FIG. 1A, the watermarking process can be divided into two general steps: encoding step 102 and embedding step 106. In encoding step 102, the information 100 that is going to be inserted into the substrate—commonly referred to as the payload—is transformed in some predefined fashion to make it more resistant to attacks and/or retrieval errors. Encoding step 102 often involves transforming the payload into a sequence of one or more "marks" 104, a mark being the unit of information that is independently embedded in, or extracted from, the substrate (and typically also the unit of detection by attackers). In embedding step 106, the encoded payload—possibly consisting of a set of marks 104—is inserted into the unwatermarked program 105. The marks may be embedded in contiguous locations within the program, or may be distributed throughout the program. In contrast to the encoding step 102, embedding step 106 is usually performed in a manner that is specific to the substrate.

As shown in FIG. 1B, the process of retrieving the payload from a piece of watermarked content can also be divided into two general steps: extracting step 110 and decoding step 112. In extracting step 110, the encoded payload 104' is retrieved from the watermarked content. In decoding step 112, the encoded payload 104' is decoded to recover the original payload 100'. It should be appreciated that FIGS. 1A and 1B are provided to aid and organize the explanation of certain embodiments of the present invention. Some of the components shown in FIGS. 1A and 1B may be optional in some embodiments, and the distinctions between the steps shown in FIGS. 1A and 1B may be blurred or non-existent in practice.

When watermarking a piece of software, care should be taken to avoid adversely affecting the software's performance. While a certain amount of delay may be tolerable, incorrect program execution typically will not. Thus, effective software watermarking techniques—like effective techniques for watermarking other media—should take reasonable steps to reduce or minimize the amount of perceptible differences between the watermarked and the unwatermarked versions of the software, and between differently-watermarked copies of the software. Stated differently, it will generally be desirable to maintain functional equivalence between differently watermarked copies of a piece of software and the original, unwatermarked program. It should be noted, however, that equivalence is not an absolute notion. For example, if a program includes code that receives two inputs, processes them, and generates an output, a first instance may take the inputs 2 and 2 and yield 4, while a second instance may take 2 and 2 and yield 5, and a third instance may take 2 and 2 and yield 6. Under a strict definition of equivalence, these programs would not be equivalent, as they produce different results for the same input. However, if one is only interested in whether the result is a positive or a negative number, such programs could be considered equivalent. Thus, the watermarked program need not be identical to the original program to be considered its equivalent, and will generally have a variety of observable differences when executed on a computer. For example, different values may be stored in particular RAM locations, execution times may be different, and/or different results may be computed. However, an effective software watermarking technique will strive to maintain equivalence between the behavior observed by a user of the unwatermarked software and the behavior observed by a user of a watermarked version of the software, both in terms of the results generated by the software, and preferably also in terms of the amount of time and space the software consumes while generating those results.

1.1. Threats and Countermeasures

In a general sense, an "attacker" can be seen as anyone who attempts to use a program in an unauthorized manner. For example, an attacker might be a person who attempts to make or distribute unauthorized copies of a piece of software, or a person who attempts to use one of those unauthorized copies. An attacker might also be a person who attempts to modify a program to perform functions that the author did not intend the program to perform, or for which the attacker has not obtained the necessary permissions. An attacker might also be a competitor of the software's author or owner, who wishes to misappropriate portions of the software or to undermine the software's effectiveness. Watermarking techniques can be used to resist, prevent, and/or detect some or all of these general attacks, and thus, at a more specific level, an attacker can be seen as a person who attempts to circumvent the protection offered by a watermarking scheme.

There are a variety of attacks that might be mounted against a watermarking scheme. To the extent a watermark is used to identify attackers or to prevent certain uses of the watermarked content, an attacker may attempt to remove the watermark or replace it with another, valid watermark. Similarly, if a watermark is required in order to use the content in certain ways, an attacker may attempt to add such a watermark to unwatermarked content in order to gain access to the restricted features. Thus, there is a need for systems and methods which are resistant to both unauthorized removal and unauthorized addition of watermarks. In many cases, the means for resisting these attacks will be the same or closely related.

Attackers might apply a variety of static, dynamic, manual, or automatic attacks to detect, remove, and/or forge marks. For example, an attacker might examine the static binary image of the program in order to determine how the program operates and what each particular programming construct does. Or the attacker might simply look for unusual programming constructs, and focus his analysis there. An attacker might also examine the execution of the program dynamically, using, e.g., a debugger or other specialized tool, in an attempt to further understand the program's operation and the purpose of the individual programming statements and data structures contained therein. For example, an attacker might search for code that is never used or that has no practical effect on the program's execution. Having found such code, an attacker might simply remove it.

An attacker might also compare two instances of a program, looking for dissimilarities between the two. If the programs contain different watermarks—for example, if the programs are watermarked with information regarding the identity of their respective users—these differences will show up on comparison. An attacker might then change one program to contain the watermark of the other, or might remove both watermarks. This type of attack is known as a collusive attack, and is particularly difficult to defend against.

As described in more detail below, the present invention provides systems and methods for creating watermarks that are resistant to some or all of these attacks. For example, in one embodiment obfuscation techniques are used to impede an attacker's attempts to understand the structure and/or operation of a program. In general, these techniques also make watermarks more difficult to identify, remove, and/or replace, as they typically make it more difficult to deduce the importance, or lack thereof, of particular code sequences to the program's correct operation. Tamper resistance techniques can also be used to make it difficult for attackers to analyze or modify a program without detection. Similarly, special measures can be taken to make the watermarks themselves blend in with the rest of the program, thus making it difficult for an attacker to spot them in the program's static image. The present invention also provides a variety of techniques for resisting specific attacks, including collusive and auto-collusive attacks. The systems and methods of the present invention also can be used to make it difficult for an attacker to use knowledge gained from one successful attack to mount another.

1.2. Program Structure and Formation

The design of optimal watermarking techniques typically requires an understanding of the media into which the watermarks are to be inserted. In the case of software, this involves understanding the structure of the program that is to be watermarked.

Figure 2:
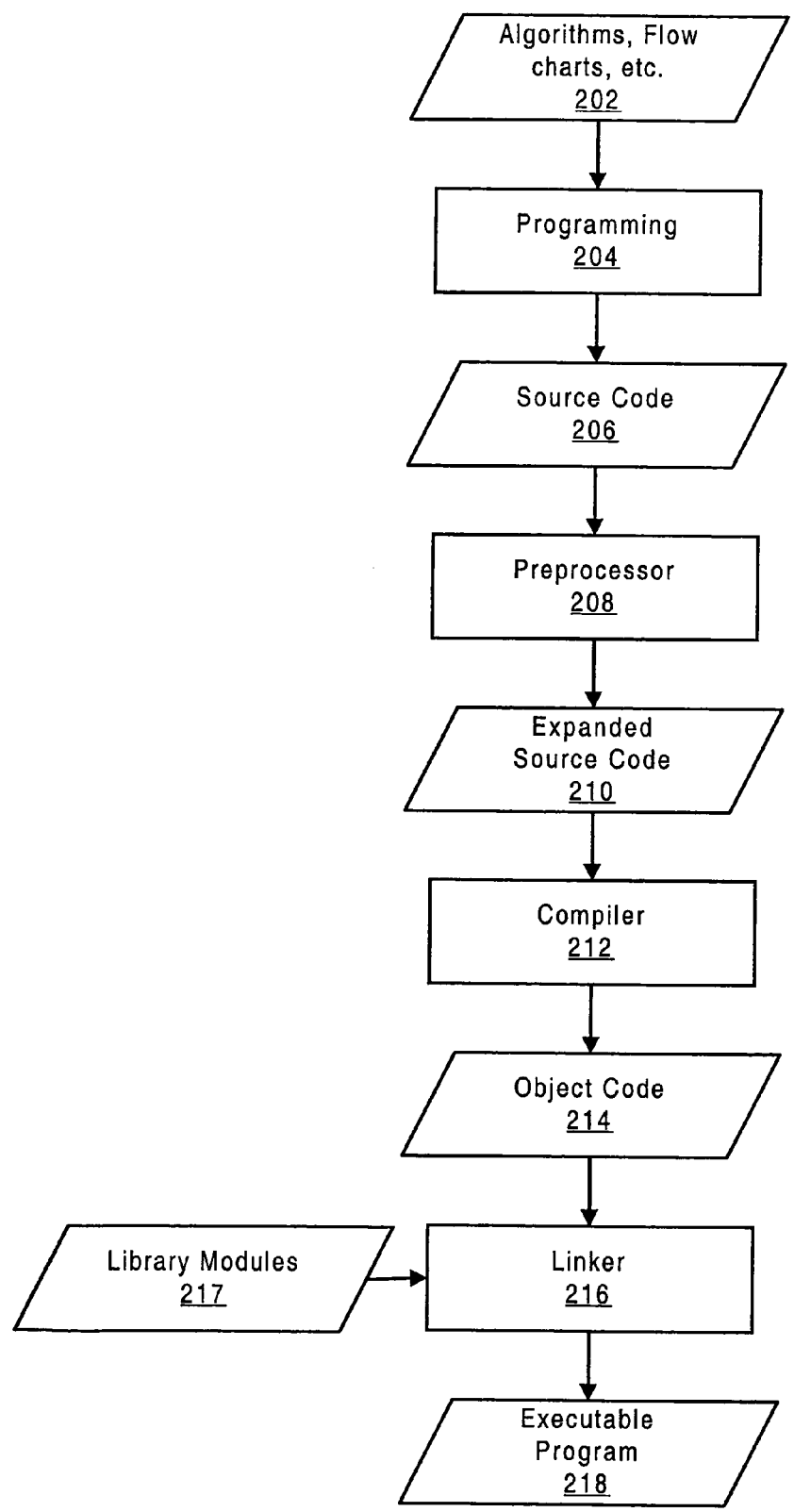
FIG. 2 illustrates the general process of creating a piece of software.

FIG. 2 illustrates the general process of creating a computer program. The initial stage of generating a program typically consists of determining what the program is supposed to do and how the program will do it. The output of this stage may be a set of flow charts, algorithms, or other plans 202. Computer programs are typically written by human programmers, who take the flow charts and other program requirements and write a series of programming statements that describe the steps a computer should perform in order to produce the desired behavior (204). Computer programs are typically written in a high-level programming language like C, C++, Java, or the like, and the code generated by the programmer is often referred to as the source code (206). After the programmer has finished writing the program 206, a preprocessor may be used to expand certain shorthand notation used by the human programmer—such as macros, inlined functions, or file inclusions—by inserting additional source code into the program (208). The preprocessor thus typically produces an expanded source code version of the program (210). A compiler is then used to translate the high-level source code 208 into low-level, machine-specific instructions 214 that a computer's processor can understand and execute (212). Once the program is compiled, a linker 216 can be used to associate the compiled program with additional modules—such as library modules—that have already been compiled. The output of the linker is an executable program 218 that can be loaded into memory and run by an appropriate processor.

The resulting executable program 218 contains machine language instructions that a microprocessor can execute. The format of an executable program will typically vary depending on the hardware platform and/or operating system on which the executable program is designed to run. Due to the relative ubiquity of computer systems that use Intel® microprocessors and the Microsoft® Windows™ operating system, many of the examples and illustrations set forth herein will, for ease of explanation, be modeled after the Portable Executable (PE) format used by those systems; however, it will be appreciated that the concepts described herein are generally applicable to other platforms.

Figure 3:
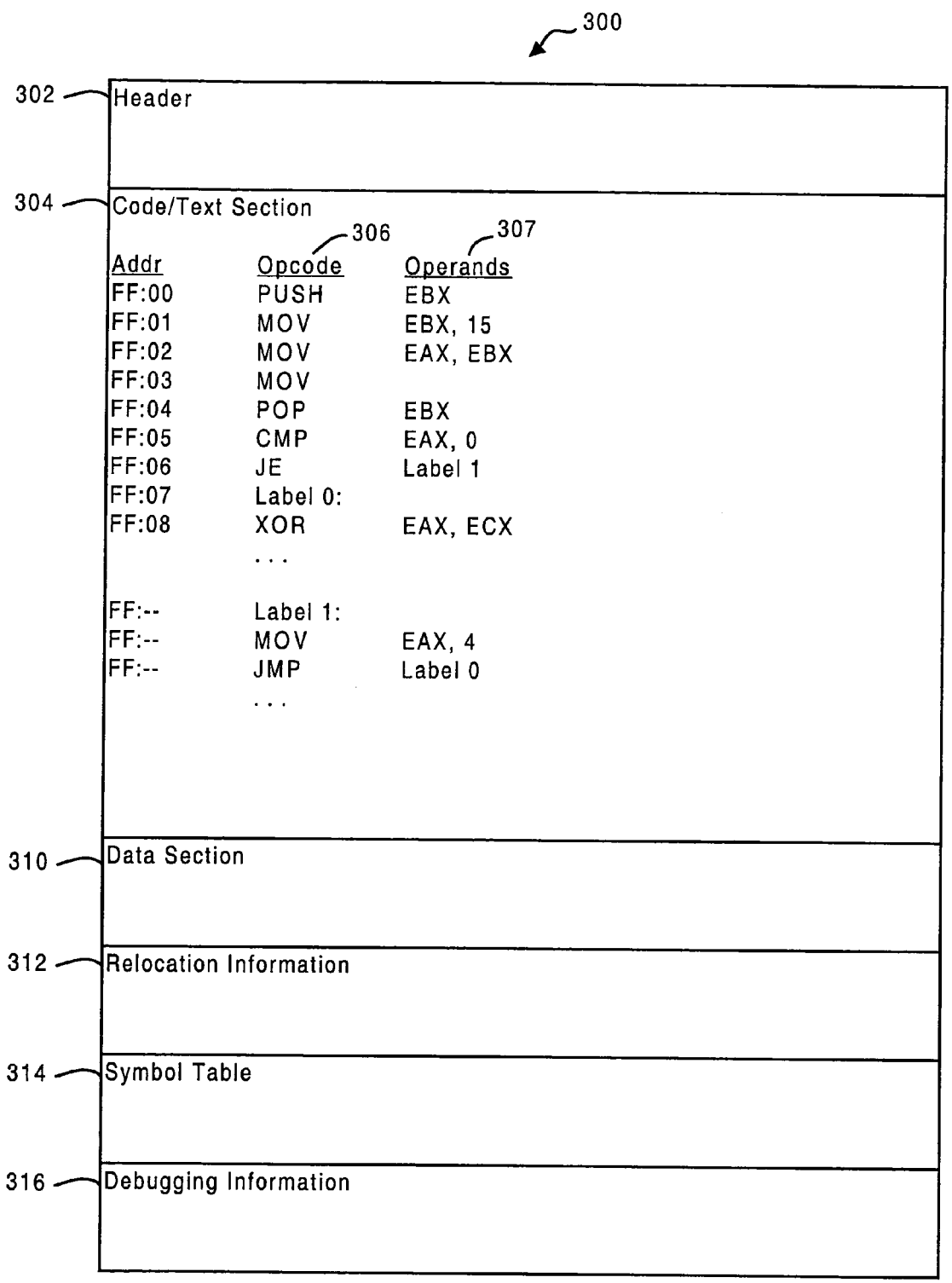
FIG. 3 illustrates the structure of a generic executable program.

FIG. 3 illustrates the structure of a generic executable program in a format similar to the PE format. FIG. 3 is provided for purposes of illustration, and one of ordinary skill in the art will appreciate that actual executable programs will typically differ somewhat from the generic program shown in FIG. 3, depending on the platform and operating system on which they are designed to run.

As shown in FIG. 3, an executable file 300 typically includes a header 302 that contains a variety of information about the rest of the executable, such as the number of sections contained in the executable, and the size, name, and location of each section. The function of header 302 is analogous to the table of contents of a book.

Executable file 300 also includes a text or code section 304 containing the machine code of the program. For purposes of illustration, and to improve readability, the "machine code" shown in FIG. 3 has been written in the more human-readable, assembly language form, as is standard practice. Each of the human-readable instructions shown in FIG. 3 translates into a machine language instruction, which is actually a binary sequence of 1s and 0s (or at an even more fundamental level, a set of voltage levels in a computer system's memory).

As shown in FIG. 3, machine language instructions consist of two general parts: the operation code (or opcode) 306 and the operands 307. The opcode specifies the operation that is to be performed, while the operands specify the data that are to be operated upon, or the locations of these data. The set of opcodes that a given processor will recognize, and the operands that these opcodes will accept, are typically published by the manufacturer of each microprocessor. For example, information regarding the opcodes available for the Intel 80x86 family of microprocessors can be found in the Intel Architecture Software Developer's Manual, Volume 2: Instruction Set Reference Manual, Intel Order Number 243191 (1999).

Referring once again to FIG. 3, an executable program 300 also typically includes a data section 310. Data section 310 contains the data that are used by the program. These data may be stored statically with the program, or may be generated dynamically during program execution.

Executable 300 may also include relocation information 312, a symbol table 314, and debugging information 316. Relocation information 312 identifies the instructions and data in program 300 that depend on absolute addresses. If instructions or data are moved to a different address, the relocation table can be used to adjust these addresses appropriately. Thus, the relocation table is typically useful for other programs, such as debuggers or linkers. Similarly, symbol table 314 contains information about the names and locations of functions, procedures, global variables, labels, and the like. Debugging information 316 contains a variety of information for use by debugging tools. For example, debugging information 316 typically includes information that enables a debugger to map machine language instructions to their source-code counterparts. Although relocation information, symbol table(s), and debugging information are often generated automatically by a compiler, it is generally possible for this information to be removed from an executable program without affecting the program's operation, since the information contained in these tables is typically not used at runtime.

A typical executable file may also contain a variety of other components. For example, executable file 300 may contain an import table and/or an export table listing the external references that are made by the program or the internal locations that can be referenced by outside programs, respectively. An executable file 300 may also contain jump tables, virtual function tables, index tables, and the like. More information on the components of executable files is readily available. For example, information regarding the PE file format can be found in "Microsoft Portable Executable and Common Object File Format Specification," rev. 6.0, Visual C++ Business Unit (Microsoft 1999) (see also, http://msdn.microsoft.com/library/specs/msdn_pecoff.htm). As described in more detail below, the format of the executable file and the intricacies of the microprocessor's instruction set will typically offer a variety of opportunities for the application of watermarking techniques.

Programs are typically distributed to consumers or other users in executable form. This allows the consumer to simply load the program onto a computer and use it, without needing to first compile the program into machine-readable form. Distributing executable code, rather than source code, also makes the underlying details of the program's operation more difficult for an attacker to understand or modify. However, some programs are distributed in source code form or in other relatively high-level forms. Thus, the present invention provides a variety of systems and methods for applying watermarks, some of which are applicable generally to code in whatever form it is distributed, and others of which are specific to a given code form (e.g., source or machine code) or processor/operating system platform.

Figure 4:
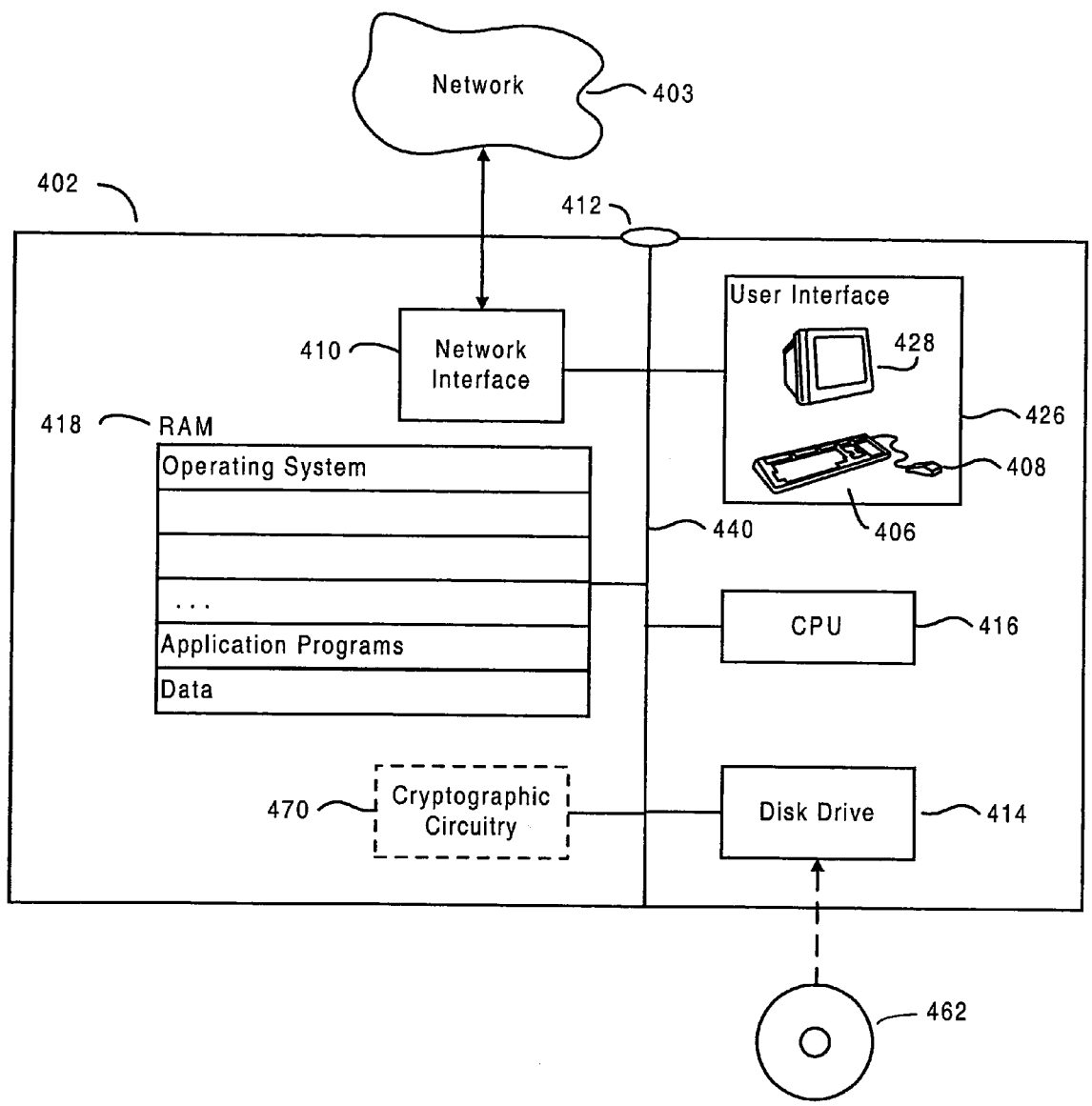
FIG. 4 illustrates the structure of a typical computer system.

FIG. 4 illustrates the structure of a typical computer system, such as that which could be used to execute a piece of watermarked software, and/or to apply watermarks to a piece of software using the tools and techniques described herein. As shown in FIG. 4, system 402 will typically include:
  a processing unit 416;
  system memory 418, usually including high speed random access-memory (RAM), read-only non-volatile memory (ROM), and a bulk non-volatile storage unit (e.g., a hard disk and/or flash memory) for storing programs and data for use and execution by processing unit 416;
  one or more input/output devices, such as:
    network interface 410 for communicating with other systems via a network 403 such as the Internet;
    I/O port 412 for connecting to one or more peripheral devices; and/or
    one or more disk drives 414 for reading from, and/or writing to, diskettes, compact discs, DVDs, and/or other computer-readable media;
  a user interface 426, including a display 428 and one or more input devices, such as keyboard 406 and mouse 408; and
  one or more internal buses 440 for interconnecting the aforementioned elements of the system.

The operation of system 402 is controlled primarily by programs contained in system memory 418 and executed by the system's processing unit 416. For example, system 402 might contain an operating system and one or more watermarked or unwatermarked application programs. If system 402 is being used to apply watermarks to a piece of software, or to extract watermarks therefrom, it might also contain, e.g., a binary code modification tool for modifying the executable image of a program, and/or a variety of programs or modules that implement or embody the techniques described herein. It should be appreciated that while FIG. 4 sets forth an illustrative system for practicing embodiments of the present invention, other systems with different architectures and different configurations of subsystems could also be used. For example, embodiments of the present invention can be practiced using only a limited subset of the components shown in FIG. 4. Accordingly, it should be understood that the system shown in FIG. 4 is intended to be illustrative and not limiting.

2. Payload

As discussed above, the information conveyed by a watermark is commonly referred to as the payload. The payload may contain virtually any type of information, including, for example, information that identifies the watermarked item, its owner, its licensee, and/or the terms of the license. Watermarks can also be used in connection with special hardware and/or software to control access to software or other content, the special hardware and/or software checking for the presence of the watermark and enforcing whatever rules or controls are explicitly or implicitly contained therein. For example, use could be made of techniques such as those described in commonly-assigned U.S. Pat. No. 5,943,422, entitled "Steganographic Techniques for Securely Delivering Rights Management Control Information Over Insecure Communication Channels," issued Aug. 24, 1999 ("the '422 patent"), and/or U.S. Pat. No. 5,892,900, entitled "Systems and Methods for Secure Transaction Management and Electronic Rights Protection," issued Apr. 6, 1999 ("the '900 patent"), both of which are hereby incorporated by reference in their entirety. In some embodiments the payload is encrypted or otherwise encoded as described in more detail below.

The system designer will typically want to control access to the information contained in the payload. That is, the system designer will want to control who is able to read the watermark and/or what they are allowed to know about the watermark-reading process. The system designer's choices on these issues may influence the nature of the encoding and embedding steps that are used to insert the payload into the substrate.

2.1. Privately Readable

One option is to make the payload privately readable. This can be done, for example, by encoding or inserting the payload using a secret key or technique. This type of watermark may, for example, be used for forensic purposes, where it is not necessary to delegate the task of detecting and/or extracting the watermark to potentially untrusted or insecure devices or entities. A privately-readable watermark may contain information such as the software's serial number, information about the user and/or the transaction by which the user acquired the software, or virtually any other type of information. In general, the payload can either carry this information explicitly, or carry an index into a separate database that stores the information.

2.2. Publicly Readable

A "publicly-readable" watermark is one which a user/client's device is capable of detecting and/or extracting—possibly on-the-fly—for purposes of e.g., authorizing certain uses of the watermarked item, providing an information channel, or the like. A publicly-readable (and/or publicly-writeable) watermark may, for example, be used in situations where a consumer's content-rendering device is expected to make decisions regarding the allowable uses of a piece of content based on the presence, absence, or contents of one or more watermarks. Thus, a publicly-readable watermark may be used in situations where the watermark payload consists of rules and controls that govern the content's use, or the like.

In general, watermarks intended for detection by client-side watermark readers will be more susceptible to certain attacks, since the client-side watermark reader will typically afford an attacker the opportunity to perform experiments, without risking detection, to identify the watermark and/or to determine how the watermark was embedded. In contrast, with a privately-readable watermark the attacker will typically not have a convenient, risk-free mechanism by which he can determine whether his attempts to identify and/or remove the watermark have been successful.

In general, a client-side watermark reader will either be a "black box" or a "white box." A black box reader simply accepts content and user input, and returns the watermark payload or information indicating whether the watermark payload was detected. A black box reader typically relies on obfuscation and/or hardware or software tamper resistance mechanisms to shield the details of the watermark detection process from the user's view. In contrast, a "white box" reader is one for which the algorithmic details of the watermarking process have been published to the user, or included in hardware or software that can be readily examined and/or reverse-engineered. As a result, white-box readers typically rely on relatively strong watermarking techniques that cannot be easily compromised by a person with detailed knowledge of the watermarking algorithm.

3. Encoding and Decoding

In a general sense, watermark "encoding" is the process of determining how a watermark's payload bits are represented. The encoding process can, to a large degree, be considered independently of the medium into which a watermark is inserted, although the sizes of the marks may be governed somewhat by the substrate and the embedding techniques that are used.

A watermark payload may be encoded in various ways. For example, to facilitate robust protection and/or recovery of the payload, additional information can be added to the payload and/or the watermark container to provide registration; noise tolerance; resistance to deletion, cropping, correlation, and/or collusive attacks; resistance to forgery; and/or other functionality.

The decoding process is closely related to the encoding process. Decoding takes information and noise that were extracted from the substrate and transforms it back into the original payload. Thus, in a general sense, the decoding step can be thought of as the inverse or complement of the encoding step, as the decoding step reverses the work performed by, and the information inserted during, the encoding step to reconstitute the watermark payload from the encoded marks. If the encoding process involves a secret key (e.g., for anti-forgery or anti-collusion purposes), the decoding process will generally also use that key (or a related key) and possibly a database of encoded payloads to, e.g., recover watermarks that have been corrupted by collusion or cropping.

A variety of encoding and decoding techniques are set forth below, organized generally according to the functionality that they provide. It will be appreciated, however, that the categories given below are provided primarily to organize the discussion. The categories are not rigid, and many of techniques fit within more than one category and/or provide additional functionality.

3.1. Error Correction

In many cases, it will be desirable to detect and recover a watermark even if storage and transmission errors have corrupted the substrate and/or the watermark, and even if an attacker has tried to forge or remove the watermark by changing or deleting portions of it and/or the substrate in which it is embedded. To make a watermark withstand such threats, error correction techniques can be used, including without limitation, such well-known techniques as repetition, Hamming or other linear block codes, cyclic codes, quadratic residue codes, Golay codes, Reed-Mueller codes, Reed-Solomon codes, convolutional codes, trellis codes, and the like. A basic idea of such techniques is that by including redundancy in a communication stream, the corruption or loss of some of the information in the stream can be corrected or detected. The present invention applies this insight to the context of software watermarking by treating the watermarked substrate and/or the sequence of marks itself as the communication stream, and encoding the watermarks using error correction techniques to facilitate their recovery in the face of noise or malicious tampering.

Figure 5A:
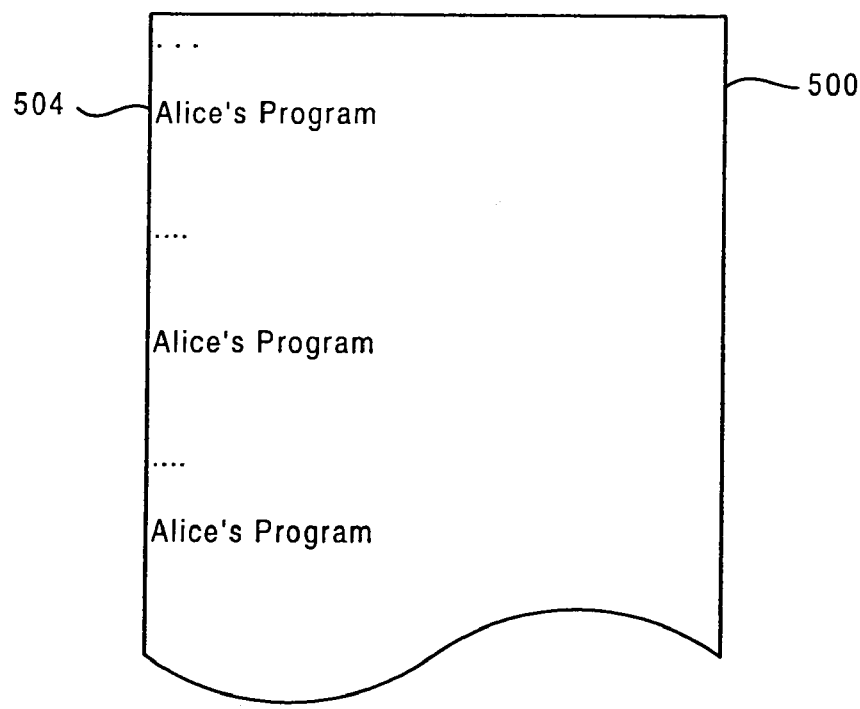
FIGS. 5A and 5B illustrate the use of an error-correction technique to encode a watermark.
Figure 5B:
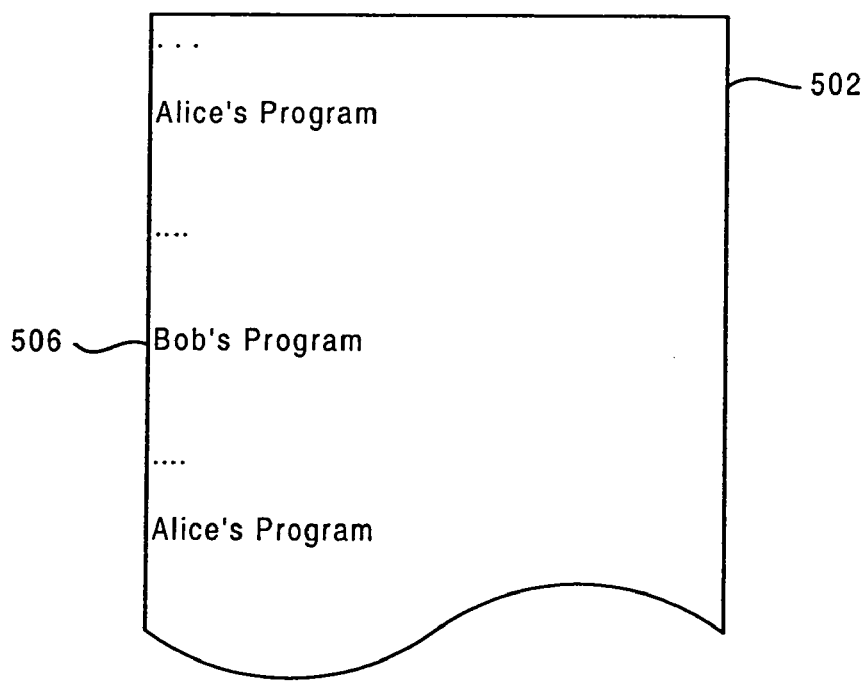

As shown in FIGS. 5A and 5B, for example, one error-correction technique is to embed multiple copies of each mark in the substrate. If one or more of the copies is corrupted or deleted, the correct value of the mark can be determined by taking the majority value of each of the copies that are detected. Referring to FIG. 5A, a program fragment 500 is shown in which the illustrative watermark "Alice's Program" 504 has been embedded multiple times. As shown in program fragment 502 in FIG. 5B, if an attacker discovers one instance of watermark 504 and attempts to alter it (e.g., by changing it to say "Bob's Program"), the correct value of the watermark can be recovered by examining each of the marks, and selecting the mark that appears the most times (i.e., "Alice's Program").

As another example, if each mark is relatively unique—as might be the case if each mark were generated using the sparse space encoding techniques described in more detail below—then even if an attacker were able to change or delete several copies of the mark, as long one copy remains (or even portions of one copy), it may be possible to recover the correct mark with a relatively high degree of confidence. Thus, mark repetition is particularly effective in resisting deletion, cropping, and forgery attacks, since if redundant marks are spread throughout the program it will be difficult for an attacker to inhibit watermark detection simply by removing a portion of the program or forging a few marks. As the number of redundant marks is increased, the effort required to find, remove, or forge each copy (or a majority thereof) will generally increase as well.

It will be appreciated that there are a variety of other ways to apply error correction techniques in the context of watermarking, and that for purposes of practicing the present invention any suitable technique or combination of techniques can be chosen. For example, multiple copies of each mark can be included in the program, as described above, and each mark may itself be encoded using error correction codes such as Reed-Solomon codes, Hamming codes, or the like. An advantage of special-purpose error correction/detection codes such as Reed-Solomon codes and Hamming codes is that the redundant information included in these codes is typically not as easily recognizable as repeated, verbatim occurrences of the mark, and thus marks encoded using these special-purpose codes will typically be less susceptible to certain attacks. In addition, special-purpose error correction codes typically require less overhead than simple mark repetition—that is, special-purpose codes may require less additional information to be inserted into the substrate for a given level of error tolerance. However, simple repetition will typically be somewhat easier to implement, and may thus be preferable for many applications.

3.2. Registration

Figure 6:
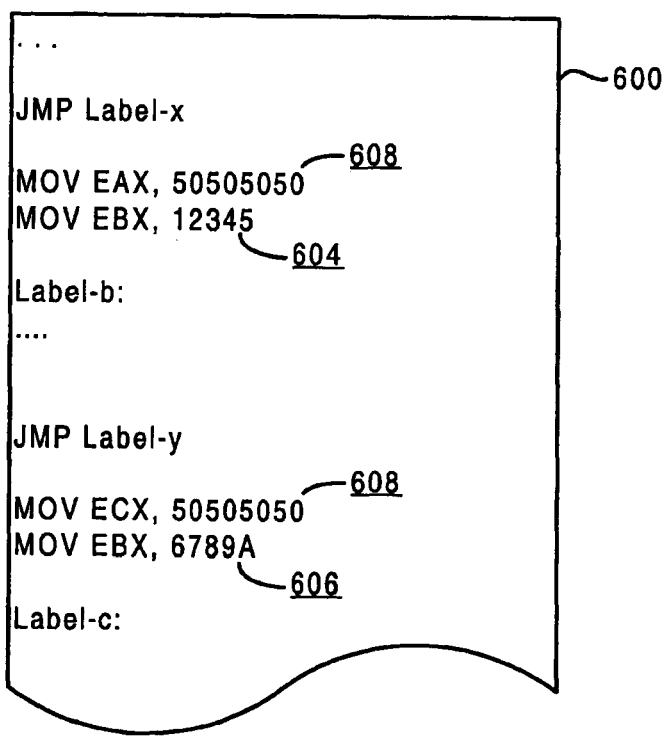
FIG. 6 shows the use of a watermark registration scheme in accordance with an embodiment of the present invention.

Registration refers generally to the process of providing information to facilitate the location and retrieval of a watermark. Registration information can be provided in a variety of ways. One registration technique is to embed a suitably predefined sequence of bits in the substrate, the sequence indicating the location of the watermark. An illustrative implementation of this technique is shown in FIG. 6. Referring to FIG. 6, a watermark comprising the value "123456789A" is embedded in a piece of software 600. The watermark could, for example, represent the serial number of the software or information about the software's user. In the example shown in FIG. 6, the watermark is split between two marks 604 and 606. Each mark is preceded by a tag 608 comprising the predefined value "50505050." The watermark is found by looking for the predefined value.

To ensure that the tag does not collide with other values that occur in the program, the unwatermarked program can be checked for the presence of a proposed tag, and if an occurrence is found, another tag can be used instead. In other embodiments, tag sequences that collide with other values in the program are tolerated, and may even be desirable as a means of disguising the tags. In such embodiments, the tags could form part of a multi-part detection process in which a combination of tags and other registration information are used to recover watermarks from the program.

Figure 7:
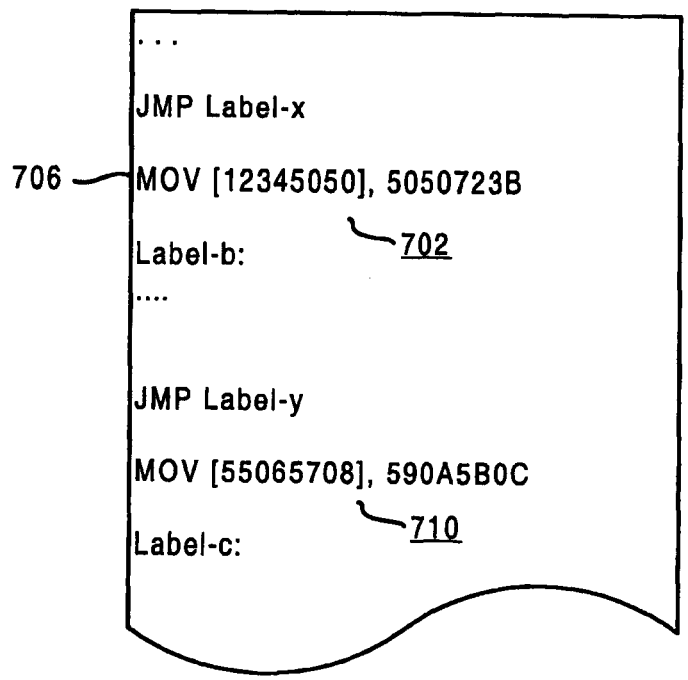
FIG. 7 shows the use of a tag-based watermark registration scheme in accordance with an embodiment of the present invention.

Another registration technique is to insert registration bits into the substrate as part of a watermark's payload. For example, a fixed (and preferably secret) tag can be added to each mark:

Mark=Payload Data+Tag where "+" may comprise a simple concatenation or a more complex combination technique. As shown in FIG. 7, for example, mark 702 consists of the payload data "1234" concatenated to a tag consisting of the value "50505050" and spanning both operands of instruction 706. As another example, mark 710 is formed by interleaving the sequence "56789A" and the tag "50505050."

If the substrate is uniformly random, the inclusion of T bits of tag can reduce the probability of a false hit by $2^{-T}$, where a "false hit" refers to the mistaken determination that noise or other substrate data is actually a valid mark. If unique tags are chosen from a predefined set, tag repetition can be avoided, thus making it more difficult for an attacker to detect and/or remove the tags.

Figure 8:
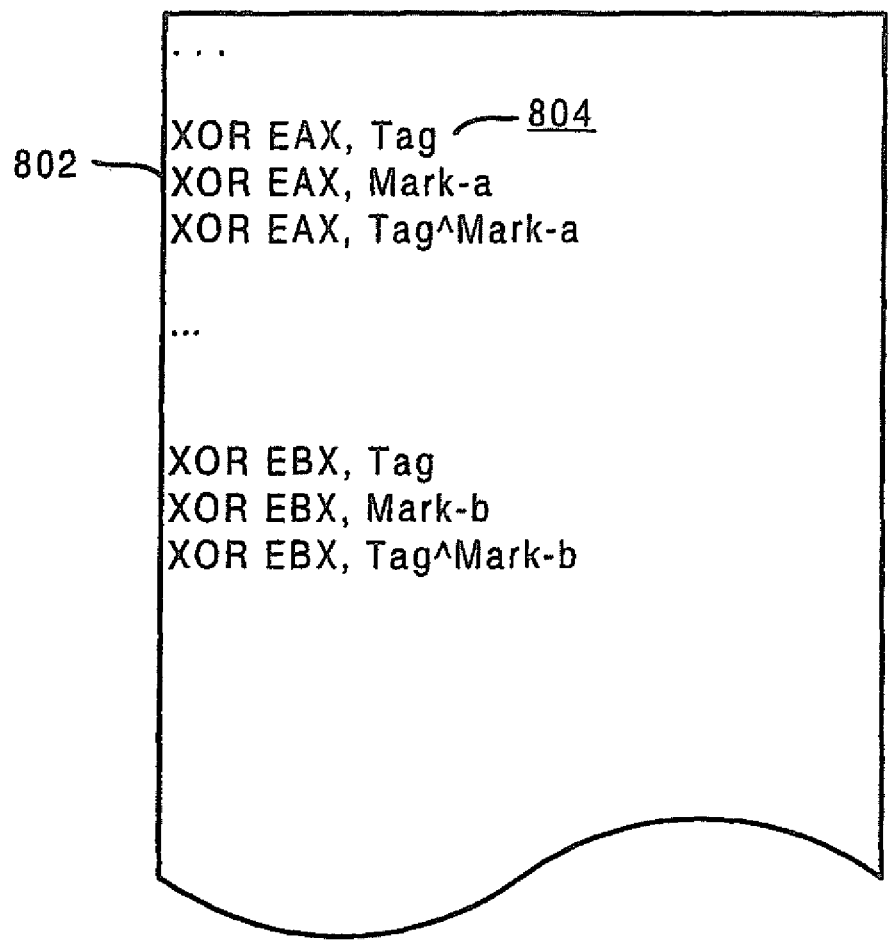
FIG. 8 illustrates a watermark encoding scheme in which the watermark container is used to provide registration information.

Registration information can also be provided by the container itself. For example, if it is known that a watermark is embedded as a predefined set of operands in an identifiable sequence of opcodes, the marks can be found by looking for the sequence of opcodes—the opcode sequence thus providing the registration information for the watermark. This technique is illustrated in FIG. 8, in which a sequence of three consecutive XOR instructions 802 comprises the watermark container and also provides registration information, thus allowing a tag 804 (if any) to consist of a smaller, perhaps less noticeable value.

Marks can also be inserted without providing explicit registration information in the program. For example, marks can be stored at predefined locations in the program. The entity responsible for retrieving the watermarks can maintain a list of the locations at which the marks are stored for each instance. Marks are retrieved by consulting the list. The marks in different instances of the program can be stored at different locations, and a key can be maintained for each instance, the key indicating where the marks are stored. In such embodiments the external list (or key) effectively supplies the registration information.

It will be appreciated that a variety of related registration encodings could be used in addition to, or instead of, the techniques described above. For example, error correction techniques can be applied to the registration information to prevent its removal, and the resulting difficulty in extracting marks from the program. Or, a combination of several registration techniques can be used to provide greater resolution in locating a mark and greater resistance to certain attacks.

3.3. Encryption

Figure 9:
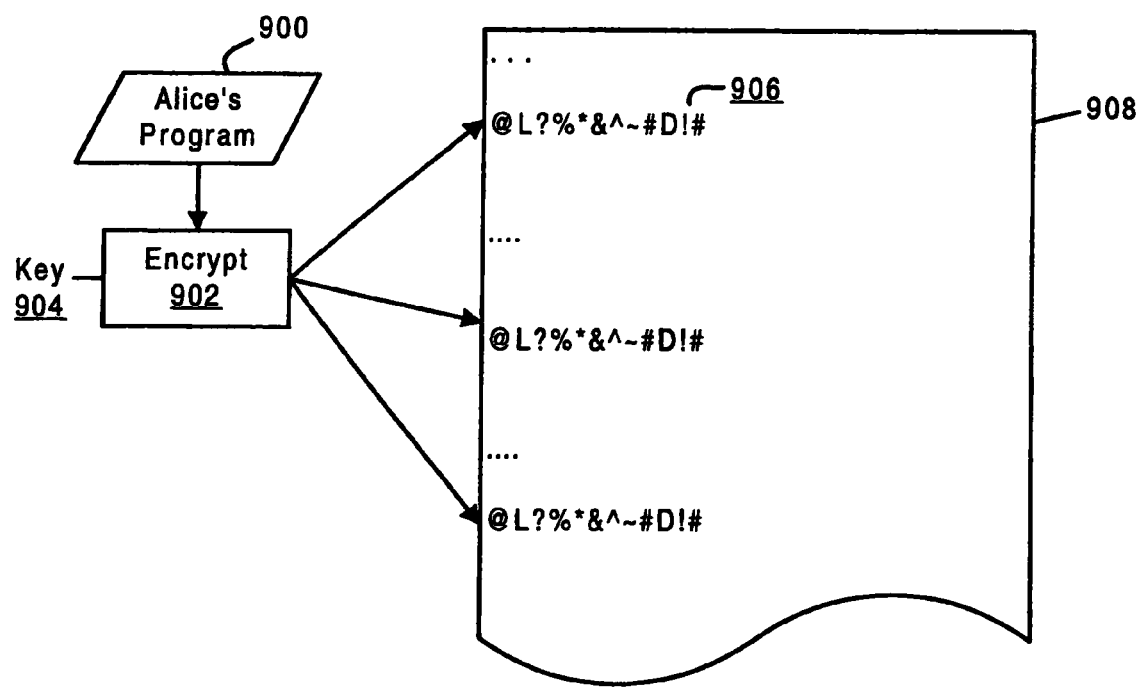
FIG. 9 illustrates the use of encryption to hide watermark information.

As shown in FIG. 9, encryption is an effective technique for hiding easily-recognizable watermark information, thus making it difficult for an attacker to find the payload by simply examining the program's static image. Referring to FIG. 9, the illustrative watermark "Alice's Program" 900 is encrypted using a suitable encryption function 902 and key 904. The result is encrypted string 906, which is inserted into program 908 instead of the unencrypted watermark 900. An attacker will generally be unable to retrieve and decode the watermark without knowing the encryption key. Since individual marks will often be relatively small, it will often be acceptable to use a relatively lightweight encryption method, such as a one-time pad. However, stronger encryption techniques can also be used.

3.4. Salt

As seen in FIG. 9, even if a mark is encrypted, if it appears several places in the program it may still be detectable by an attacker who employs a collusive attack or looks for repeated patterns. Although the attacker may not be able to decode the mark, the attacker could remove, forge, or tamper with it. The present invention provides techniques for resisting such attacks.

Specifically, in one embodiment extra information, or "salt," is used to make different copies of the same mark appear different. The salt may, for example, consist of a randomly chosen 16 or 32 bit value, or any other suitably-sized value. In one embodiment salt is simply added or concatenated to each instance of the mark, and the result is then scrambled. For example:

Mark=Encrypt(Salt+Payload Bits)

Since many encryption algorithms yield a random or effectively random output for each unique input, adding a different salt to each copy of the payload reduces the likelihood that different copies of the payload will encrypt to the same or similar values. Thus, S bits of salt can be used to provide approximately $2^S$ unique copies of the payload. Because different copies of the same mark will now appear different, an attacker will find it more difficult to detect all copies of a given mark even if the attacker is able to deduce the identity of one such copy.

Figure 10:
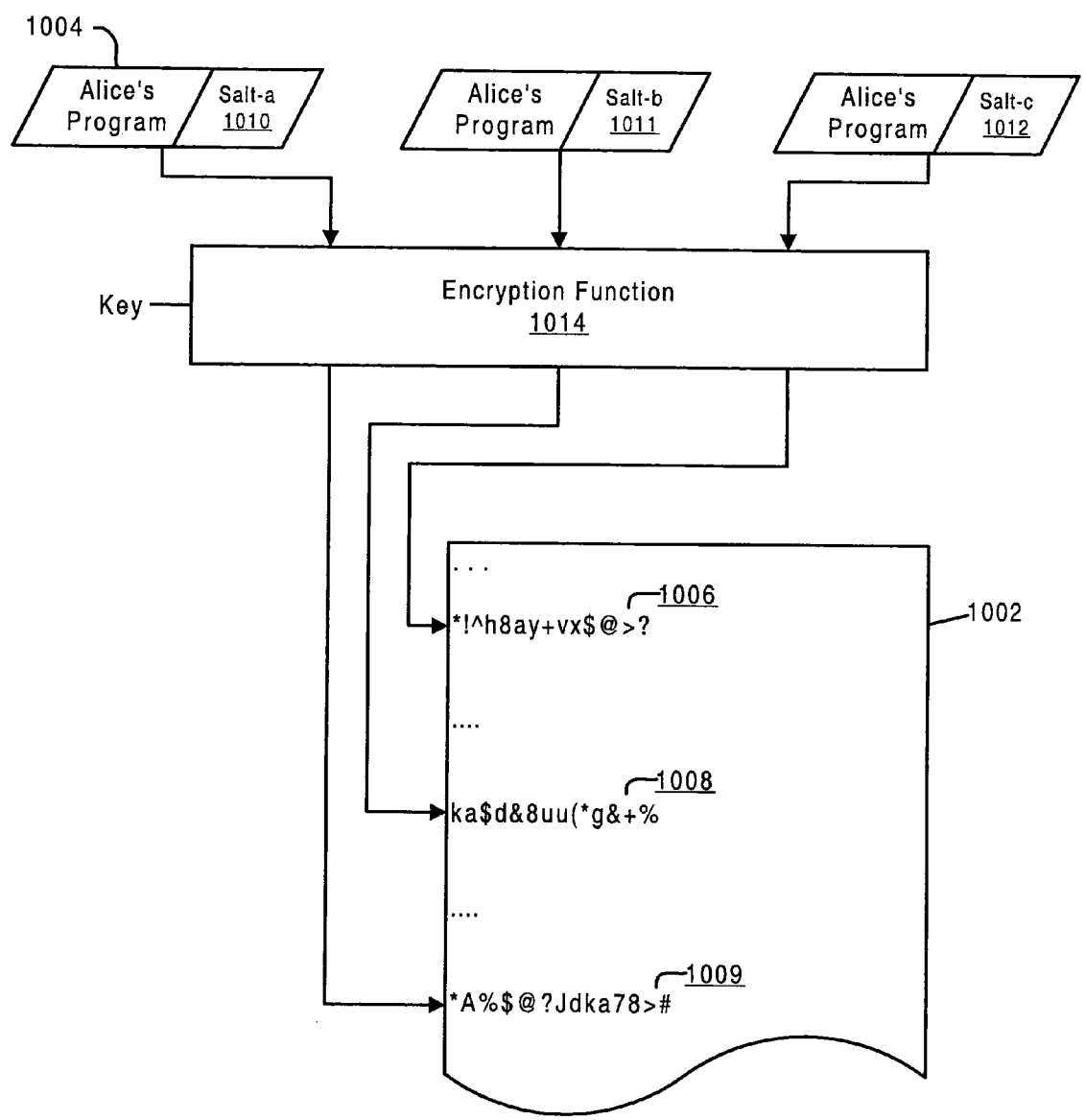
FIG. 10 illustrates a salt-based encryption technique for encoding watermarks in accordance with an embodiment of the present invention.

FIG. 10 illustrates the use of salt. As shown in FIG. 10, multiple copies of the payload "Alice's Program" are inserted into program 1002. However, before each copy is inserted, it is combined with a different, possibly randomly-generated, salt (1010, 1011, 1012) and encrypted (1014). In a preferred embodiment, an encryption technique such as DES or triple-DES is used, although it should be appreciated that any suitable encryption technique could be used, including the well-known techniques set forth in Menezes et al., "Handbook of Applied Cryptography," pp. 191-319 (CRC Press, 1997), which is hereby incorporated by reference. The result of the encryption process is a set of different marks (1006, 1008, 1009). Because each copy of the mark is different, when the marks are placed into program 1002 their presence and identity will be more difficult to discern.

Salt can also be helpful in resisting forgery. If different copies of a mark are encoded using a different salt, as described above, an attacker might be able to set any one copy of the mark arbitrarily, but will generally find it difficult to set many copies of the mark to have different salts but the same payload, since the encryption technique and/or the key is secret. Thus, if an attacker tries to forge several copies of a mark, the salt recovered from each of the copies is likely to be the same. The correct value of the mark can then be determined using the error correction techniques described previously. For example, if a copy of a program contains three differently-salted copies of a mark (e.g., "Alice's Program"), and an attacker were to insert four additional copies of a single mark obtained from another program (e.g., "Bob's Program"), the correct value of the mark (i.e., "Alice's Program") could be recovered by choosing the payload that appears the most times with different salts. Since, in this example, each copy of the forged mark has the same salt, that mark would be rejected in favor of the authentic mark.

3.5. Authentication

Digital signature techniques can be used to provide registration information and/or resistance to forgery or other attacks. A signature can be included in a watermark, or stored externally by an entity responsible for detecting the watermark. When a potential watermark is retrieved, it is rejected if the stored signature does not match the expected value.

In one embodiment the signature is a secret function of the payload and/or the salt, and can be formed using well-known digital signature techniques. For example, use could be made of the well-known Digital Signature Algorithm (DSA) or any of the other techniques described in Schneier, "Applied Cryptography," 2d ed., pp. 483-502 (John Wiley & Sons 1996), which is hereby incorporated by reference. It will often be unnecessary to use public-key cryptography to create the signature, however, since the entity checking the signature will typically know the key that was used.

The general form of a signature-containing mark might be:

Mark=Encrypt(Salt+Payload+Signature).

The watermark decoder checks for the expected signature after decrypting the mark. Such an encoding provides a way to check each copy of the payload for validity, and also can be used to provide registration information when the container does not do so, as may be the case with a data-section watermark. If the container provides some relatively weak registration information, the signature can be used to filter out false hits. As with tags, T bits of signature can reduce the probability of a false hit by $2^{-T}$. To resist malicious tampering, in one embodiment the encryption of the signature depends on all other bits (salt and payload), so that any change to the encrypted watermark is highly likely to corrupt the signature upon decryption. This can be done in a variety of ways, including by using a block-based cryptographic algorithm with blocks big enough to include the entire watermark, by using a chained cryptographic algorithm such as DES-CBC with the signature placed at the end, and/or by using a hash-based scheme.

Another illustrative signature technique is shown below. In this example, the mark stores a plaintext version of the salt and an encrypted concatenation of the salt and the payload, giving the structure:

Mark=Salt+Encrypt(Salt+Payload)

When the mark is retrieved, the encrypted value is decrypted, and the decrypted payload is accepted if the decrypted salt matches the plaintext salt. Thus, the salt is effectively used as a signature to detect whether the mark or the salt have been modified. For security, it will generally be preferable for the payload to affect the encryption of the salt, and vice-versa.

A variety of other signature techniques could also be used. For example, the signature could be a predefined, fixed tag. This technique is effectively the result of combining tag-based registration and salt-based anti-correlation. The tag need not be secret since the encryption key is secret. For example, the tag could be all zeroes. The watermark detector decrypts a potential mark and checks for the tag. If the tag is present, the payload is accepted; otherwise, it is rejected. The technique is simple, yet powerful if the cryptographic algorithm is sufficiently secure. To the extent the tag is a known value, however, this technique may be prone to partially-known plaintext attacks on the cryptographic algorithm. If the tag is kept secret, a known-plaintext attack will generally not be possible, although a partially-fixed plaintext attack might be used. In another, slightly more complex, embodiment, the signature is computed by hashing the salt and the payload. Although any suitable hashing technique could be used, in one embodiment the hash is computed as the piecewise XOR of the salt and the payload. For additional secrecy, the hash could be computed using encrypted versions of the salt and the payload. Many other signature techniques could also, or alternatively, be used.

3.6. Sparse Space Encoding

Another encoding technique is to allocate watermark payloads randomly from a large space, thus making it difficult for an attacker to randomly guess a valid watermark. For example, a watermark payload could be represented as a 1024 bit string. Such a string represents $2^{1024}$ different combinations. If, for example, only 17 million of those combinations are actually used, then the odds are quite small (approximately one chance in $2^{1000}$) that an attacker will be able to guess or randomly generate a valid combination. Since the strings are preferably allocated randomly (or quasi-randomly), even an attacker with knowledge of one valid string will find it difficult to deduce the value of another. It will be appreciated that the bounds of the sparse space can be optimized for the particular application, there typically being a tradeoff between string size and resistance to attack, where longer strings will generally be more difficult to embed, but more difficult for an attacker to guess.

Figure 11:
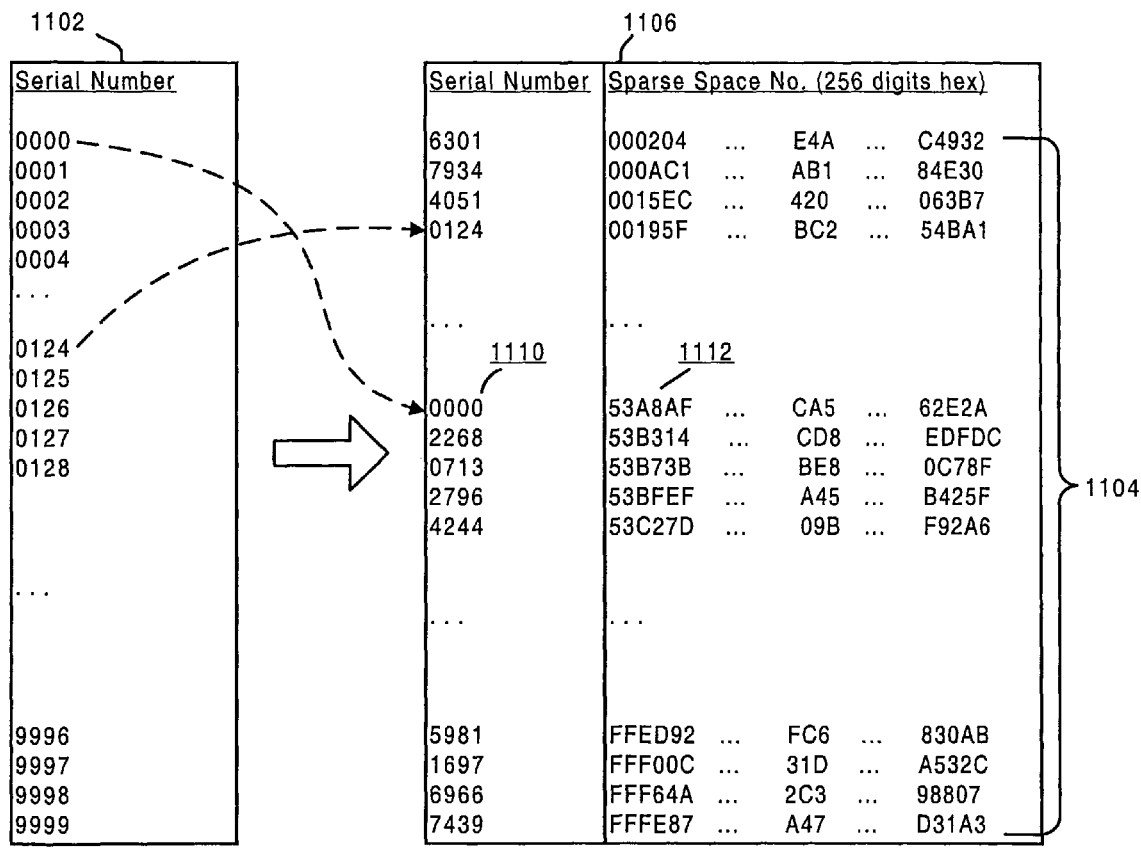
FIG. 11 illustrates a sparse space watermark encoding technique in accordance with an embodiment of the present invention.

FIG. 11 illustrates a sparse space encoding technique. Referring to FIG. 11, a set of desired payloads 1102—in this example, a sequence of serial numbers—are mapped onto a set of numbers 1104 chosen randomly or quasi-randomly from a large range. In the example shown in FIG. 11, numbers 1104 are 1024 bits long (i.e., 256 hexadecimal digits). The result is a table 1106 indicating the sparse space number that corresponds to each serial number in the original list 1102. For purposes of watermarking a piece of software or other content with a given serial number 1110, the corresponding sparse space string 1112 is inserted into the substrate. If the serial numbers were themselves inserted into the substrate, an attacker with access to several copies might infer their sequential nature and then be able to guess other valid serial numbers with relative ease. In contrast, when each serial number 1110 is mapped to a string from a large range 1104, and the string is embedded in the substrate, an attacker will have more difficulty detecting the marks and/or deriving and embedding a different, valid value.

Figure 12:
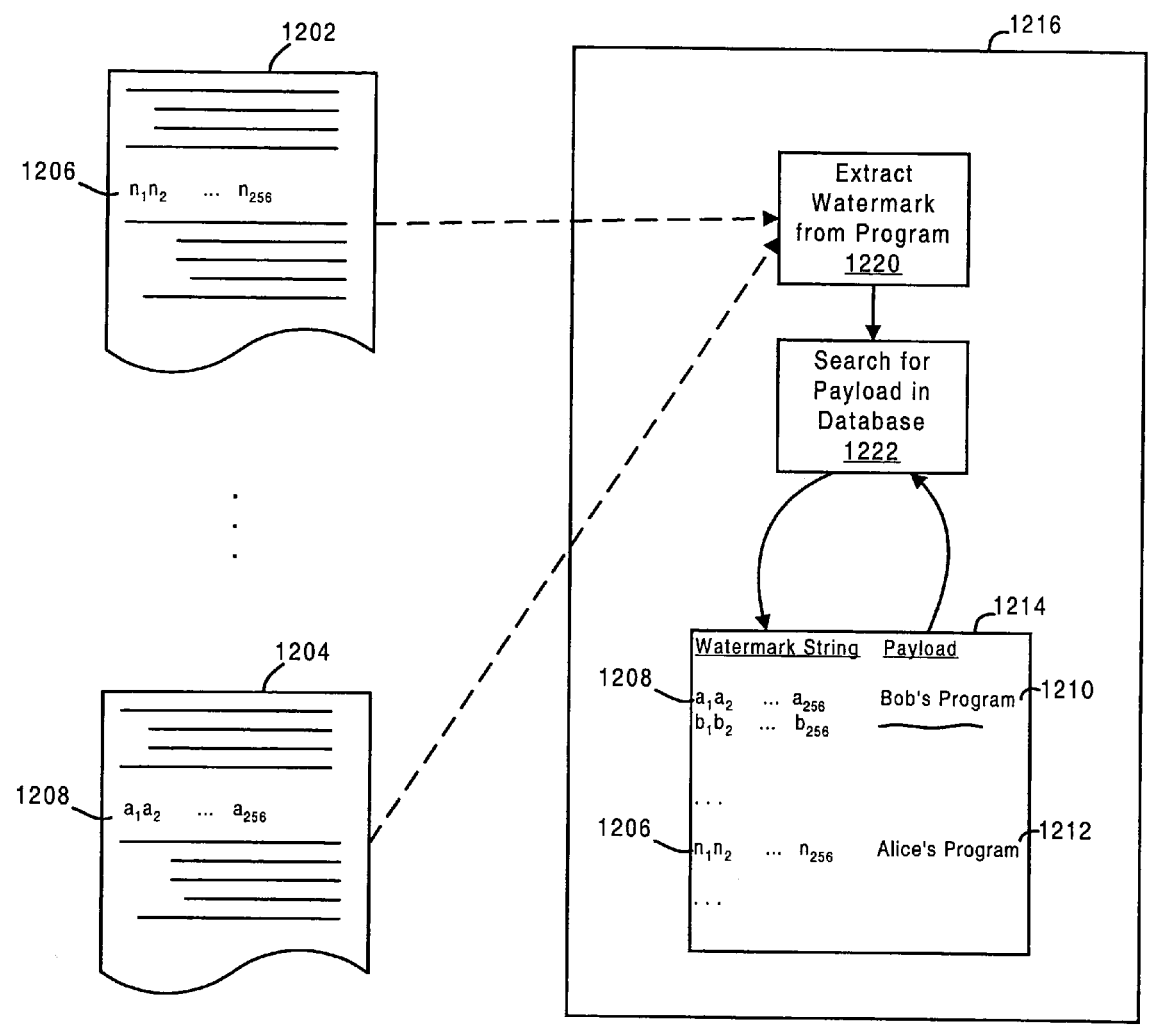
FIG. 12 illustrates a system for extracting a watermark encoded in the manner shown in FIG. 11.

FIG. 12 illustrates a watermarking system that makes use of the sparse-space encoding technique described above. Referring to FIG. 12, randomly-selected sparse-space strings 1206, 1208 are associated with payload information 1210, 1212. The value of each string 1206, 1208 is recorded in a database 1214, together with the payload information 1212 to which the string corresponds (and/or instructions or keys operable to transform the string into the payload). For example, the original payload might include information regarding the identity of the program and/or the purchaser (as shown in FIG. 12), the date and location of purchase, or the like. The database is maintained by the software creator, the software distributor, and/or another agent 1216 tasked with extracting watermarks from watermarked software instances. When agent 1216 obtains a piece of software 1202, agent 1216 extracts the watermark (1220), looks up the value of the watermark string (e.g., 1206) in database 1214, and retrieves the associated payload information (1222). It will be appreciated that the general watermark detection and retrieval process illustrated in FIG. 12 can also be used in connection with watermarks encoded using other techniques.

By using a sparse-space encoding technique, it can be made arbitrarily improbable that an attacker will generate a valid, forged watermark at random, and thus the presence of a valid watermark can give the content owner a reasonable degree of confidence that the watermarked piece of software is indeed the originally marked instance, or a copy thereof. Thus, sparse-space encoding can be used to protect against the unauthorized distribution of software (or other content), as the presence of a valid mark can be used to reliably identify the source of the unauthorized copies, as an attacker will find it difficult to forge a valid mark in an attempt to frame others or evade detection.

Figure 13A:
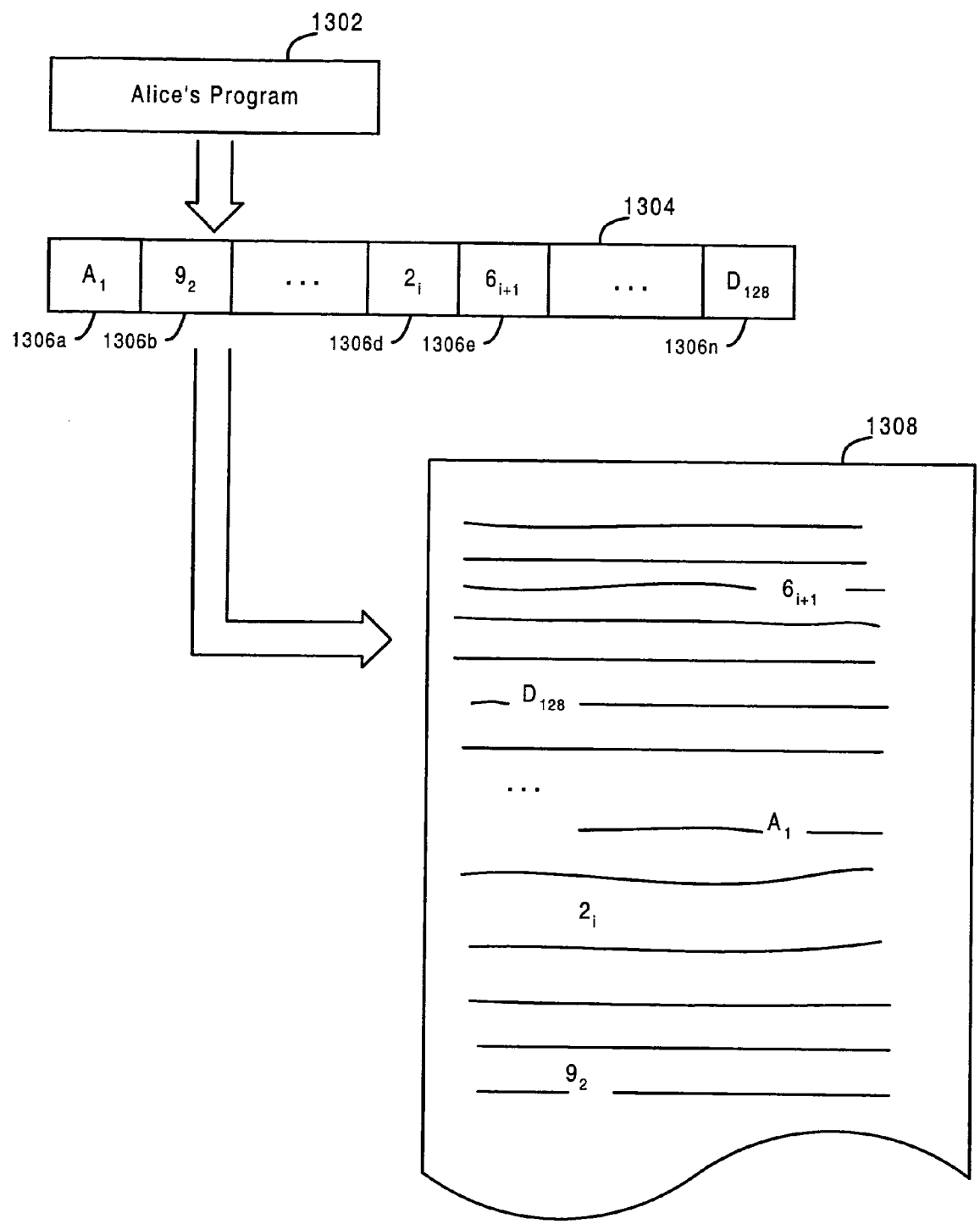
FIGS. 13A and 13B further illustrate a sparse space encoding and decoding technique in accordance with an embodiment of the present invention.

A related benefit of sparse-space encoding is that sparse-space strings are relatively resistant to deletion and/or cropping attacks. As shown in FIG. 13A, for example, a payload 1302 is associated with a sparse space string 1304. Sparse space string 1304 can be divided into a sequence of subparts 1306a, 1306b, 1306d, 1306e, 1306n, each of which is embedded in a copy of program 1308, possibly multiple times and/or using error correction codes. Breaking up the string in this manner will typically make it more difficult for an attacker to detect. As shown in FIG. 13A each subpart may include an indication of its position in the string. In one embodiment the subparts are encoded in the following form:

$$\text{Mark}_i = \text{Encrypt}(\text{subpart}_i + \text{position}_i + \text{signature}(\text{subpart}_i, \text{position}_i))$$

where "+" can represent a concatenation or other suitable combination function. The position information allows the subparts to be stored in the program in any order, and the signature allows the marks to be inserted without additional registration information.

Figure 13B:
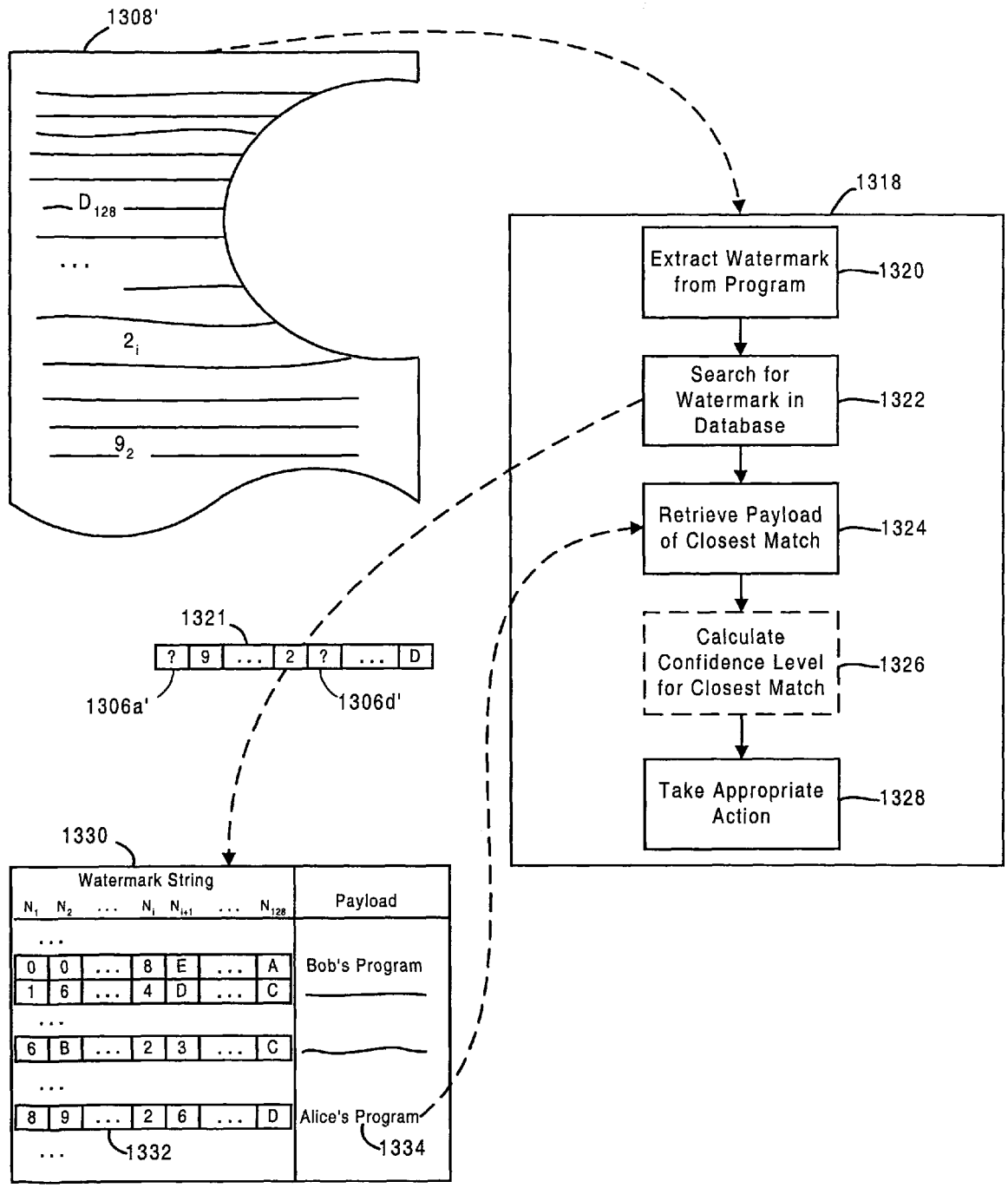

If a portion of the watermark is deleted or corrupted, the portion of the watermark that is recovered can be compared to a database of allocated strings, and the string with the maximal match can be determined. The watermark detection process is illustrated in FIG. 13B. Referring to FIG. 13B, upon receipt of a damaged (or undamaged) program 1308', watermark-detection agent 1318 extracts the marks that remain (1320). To extract the marks, watermark detection agent 1318 may use a key indicating where the marks were stored. Or, if the marks are encoded in the manner described above, mark detection agent 1318 may use the self-registration information contained within the marks themselves. That is, watermark detection agent 1318 scans the program for bit-sequences that, when decrypted, exhibit the appropriate signature relationship—i.e., include a subpart and a positional indicator that, when signed, equal the signature. It should be appreciated however, that other registration schemes could be used.

Referring once again to FIG. 13B, having recovered a mark sequence 1321—possibly missing some values 1306a', 1306d' that were deleted or corrupted—watermark detection agent 1318 searches the database of allocated strings 1330 for the string (or strings) that matches the recovered string 1321 most closely (1322). In the example, shown in FIG. 13B, the closest match is string 1332. Having located the closest match 1332, watermark detection agent 1318 retrieves the corresponding payload data 1334 (i.e., "Alice's Program") (1324). Watermark detection agent 1318 may also calculate the probability that, given recovered sequence 1321, the matching string 1332 is, in fact, the correct match (1326). Well-known probability techniques can be used to make this calculation.

Depending on how close the recovered string is to the closest allocated string, it may be possible to determine with a relatively high degree of confidence which string (if any) the program originally contained. Thus, even if an attacker removes a portion of the watermark, if the watermark string is long enough and unique enough, the original watermark can still be recovered. If the watermark string is encoded using additional error-correction techniques, the chances of recovering the original mark can be enhanced.

Having recovered the original watermark 1334, the watermark detection agent can initiate appropriate action (1328). The action that is taken will typically depend on the reasons the watermark detection process was performed. For example, if copies of the program were being distributed without the software creator's permission, the watermark can be used to determine whose copy of the software was being distributed. The software creator or its agents could then contact that person (i.e., Alice) and/or take other action. As another example, if the program had been damaged inadvertently, the watermark could be used to confirm the owner's identity before sending a replacement program.

3.7. Collusion Resistance

If otherwise-identical instances of a program contain different watermarks identifying the particular program instance ("fingerprints"), the watermarked locations can be detected by simply comparing two or more instances of the program and noting the locations of the differences. As previously noted, such a collusive attack presents a potentially serious obstacle to the effective use of instance-specific watermarks.

As described below, the present invention provides systems and methods for encoding and embedding instance-specific watermarks in a collusion-resistant manner.

3.7.1. A Collusion-Resistant Code

Suppose a content provider wants to distribute a piece of software or other electronic content to u users. The provider embeds a distinct watermark in the copy given to each user. If some users collude to create a new copy of the content that contains a corrupted watermark, the encoding scheme described herein allows the content provider to infer the identity of at least one of the colluders. The longer the watermark, the more colluders it can resist.

In a preferred embodiment, the bits constituting the watermark are inserted at secret locations within the software and the content provider preferably uses a private decoder to identify the colluder(s).

3.7.1.1. High-Level Structure of the Code

Figure 14A:
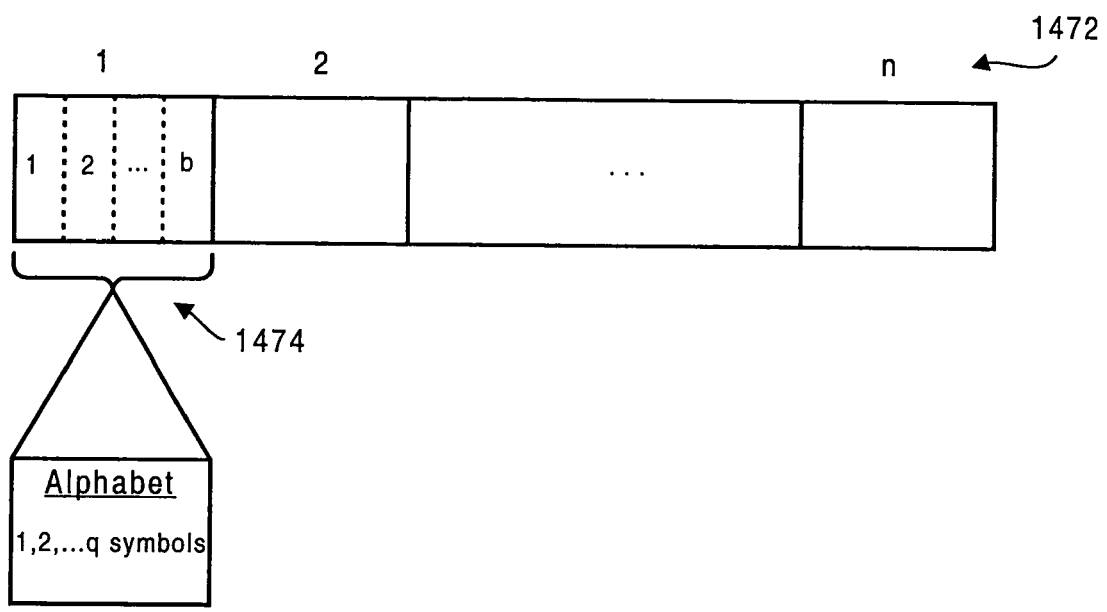
FIG. 14A illustrates a collusion-resistant encoding scheme in accordance with an embodiment of the present invention.

In a preferred embodiment of the collusion-resistant encoding scheme, a watermark is represented as a string of n symbols chosen from an alphabet of size q. As shown in FIG. 14A, the code has two layers:

1. An outer code 1472, consisting of a string of n symbols chosen from an alphabet of size q.
2. An inner code 1474 consisting of a symbol represented as a string of b bits.

The two-layer structure of this code is similar to that of the Boneh-Shaw code for fingerprinting. See, e.g., Boneh and Shaw, "Collusion-Secure Fingerprinting for Digital Data," pp. 452-65 (CRYPTO 1995) (also appearing in "Lecture Notes in Computer Science," vol. 963 (Springer 1995)). The construction of the outer code is also similar the Boneh-Shaw code; however, the inner code of the present invention is much simpler. While this simplicity comes at the cost of increasing the length of the outer code, n, when resisting a large number of colluders; the code of the present invention may reduce the overall length of the code when resisting a relatively small number of colluders.

3.7.1.2. The Outer Code

The outer code is preferably random. That is, the watermark assigned to each user is a string of symbols selected randomly and independently from the alphabet. The content provider maintains a private database that associates user identities with the watermarks that are assigned to them.

Decoding of the outer code is preferably performed using a maximum-match technique. A watermark $f_r$ retrieved from a copy of the watermarked content may be potentially corrupted by colluders. It is compared with each assigned watermark $f_a$ by counting the number of symbols that match between $f_r$ and $f_a$ (i.e., the "match of $f_a$"). The decoder outputs the identity of the user who was assigned the watermark with the maximum match.

For purposes of this discussion, a decoder is said to be in error if it does not output the identity of a colluder. As shown in Appendix A, the probability of decoder error, e, can be reduced arbitrarily by increasing the length n of the outer code, provided that the inner code meets certain criteria.

3.7.1.3. The Inner Code

A symbol is represented as a string of b bits. For each symbol position in the outer code (1 through n), a fresh set of q representations is generated to encode the q possible symbols in that position. Thus, there are n*q distinct representations in all. Each representation is generated by selecting bits randomly (or quasi-randomly). These representations are preferably known only to the content provider/watermark-encoder.

The inner code is decoded by finding an exact match. In one embodiment, if a symbol position in the retrieved watermark contains a representation that does not match any representation generated for that position in the database of assigned watermarks, the decoder returns an invalid symbol. Thus, in this embodiment error correction is not performed. In fact, since the outer decoder performs match operations on symbols, the inner decoder need not perform any operation at all.

As shown in Appendix A, the exemplary two-layer code shown in FIG. 14A resists collusion among c users if the size of the alphabet, q, is greater than or equal to c, and if the bit-length of each symbol, b, is greater than c*log(q). If q and b are set to the smallest such values for a desired level of collusion resistance, the symbol-length of the outer code, n, should be chosen to be greater than $(14*c^{c+2}*\log(u/e))$. Although these results are sufficient for collusion-resistance, they might not be necessary. However, experimental evidence suggests that if the first condition does not hold (i.e., if q<c), then increasing the length of the watermark (b or n) is ineffective in increasing the collusion resistance of the scheme. These results are derived in the analysis set forth in Appendix A hereto. It will be observed that for large c, the length of this code is relatively inefficient compared to the Boneh-Shaw code, where the bit-length of fingerprints is roughly $O(c^4*\log(u/e))$. However, this code is simpler than Boneh-Shaw's code, and for small c (as might be the case if customization is applied, as described in the next section), it may be shorter in length.

3.7.2. Customization and the Benefit of Multiple Base Versions

The difficulty of obtaining multiple instances of a program in order to mount a collusive attack can be greatly increased by having many different versions of the original binary. For example, a binary customization tool can be used to transform a program into many distinct versions by rearranging basic blocks, applying obfuscation techniques, and/or by performing other customization techniques such as those described herein and/or in the Software Self-Defense application. Each version can, in turn, have its own distinct set of slots into which watermark values can be inserted, and can use different bit-representations for the symbols contained in those slots. If an attacker obtains two different versions of the same original binary, they cannot be easily compared to locate the slots, because the slots themselves (as well much of the rest of the binary) will be in different locations. In effect, the versions can be made too difficult to compare.

Although customization thus provides a powerful form of resistance to collusive attacks, in many situations it will be impractical to uniquely customize each instance of a program—especially in a commercial setting where numerous instances are distributed. Thus, in one embodiment of the present invention, practical protection from collusive attacks is obtained by creating a number of uniquely-customized program versions. In order to mount an effective collusive attack, the attacker will thus need to obtain two or more instances of the same program version, since comparing instances of different versions will, due to customization, yield little useful information to the attacker.

If there is only one version of the program, obtaining two differently-watermarked instances simply entails obtaining two instances of the program. However, if there are multiple program versions, the "birthday paradox" characterizes the probability of obtaining multiple instances of the same version.

The birthday paradox is the somewhat counterintuitive probabilistic observation that it is necessary to gather only 23 randomly-chosen people in order to have a greater than even chance of finding two with the same birthday (ignoring leap years and assuming all birthdays are equally probable). Applying this insight to collusion-resistant program customization, it can be seen that even if there are 365 different program versions, there will be a greater than even chance that an adversary who obtains 23 randomly-selected instances will have two instances of one of the 365 versions, and could thus mount a potentially successful collusive attack. This analysis is generalized below.

For n different versions, the probability of getting at least two instances of the same version after obtaining m instances is given by the formula:

$$1 - n!/(n^m(n-m)!)$$

The probability of getting at least three instances of the same version is given by the formula:

$$n^{-m}m! * \text{Sum}(0 \ldots k \ldots m) \text{Choose}(n, m-k) * \text{Choose}(m-k, k) * 2^{-k})$$

Table 1 shows the number of instances that an adversary would need to obtain in order to find two (or three) instances of the same program version with a desired probability. For example, as shown in Table 1, when there are 10,000 distinct program versions, the number of instances needed to mount a 3-colluder attack begins to become impractical, as an attacker (or group of attackers) would generally need to obtain 184 program instances for even a 1% chance of success. Thus, the program developer might use the information in Table 1, or a straightforward mathematical extension thereof, to choose the appropriate parameters for the two-layer encoding scheme that was described in the previous section. For example, the program provider can determine the level of collusion that is deemed to be probable given the number of customized versions that are produced, then select the parameters of a collusion-resistant encoding using this fact and an assessment of the level of risk that the program provider is willing to bear.

TABLE 1

| Number of Versions | Desired Probability | Number Expected for Two Identical | Number Expected for Three Identical |
|---|---|---|---|
| 20 | 0.5 | 6 (0.564) | 4 (0.509) |
| 20 | 0.1 | 3 (0.145) | 8 (0.114) |
| 100 | 0.5 | 13 (0.557) | 38 (0.502) |
| 100 | 0.1 | 6 (0.141) | 21 (0.112) |
| 1000 | 0.5 | 38 (0.5093) | 168 (0.5025) |
| 1000 | 0.1 | 15 (0.1001) | 89 (0.1015) |
| 1000 | 0.01 | 6 (0.0149) | 41 (0.0103) |
| 2500 | 0.5 | 60 (0.5101) | ~304 (0.4957) |
| 2500 | 0.1 | 24 (0.1048) | 162 (0.1009) |
| 2500 | 0.01 | 8 (0.1114) | 74 (0.0101) |
| 10000 | 0.5 | 119 (0.5058) | ~760 (0.4991) |
| 10000 | 0.1 | 48 | 404 (0.10056) |
| 10000 | 0.01 | 15 | 184 (0.010028) |
| 10000 | 0.001 | 5 | 86 (0.0010016) |

3.7.3. Layered Watermarks

Figure 14B:
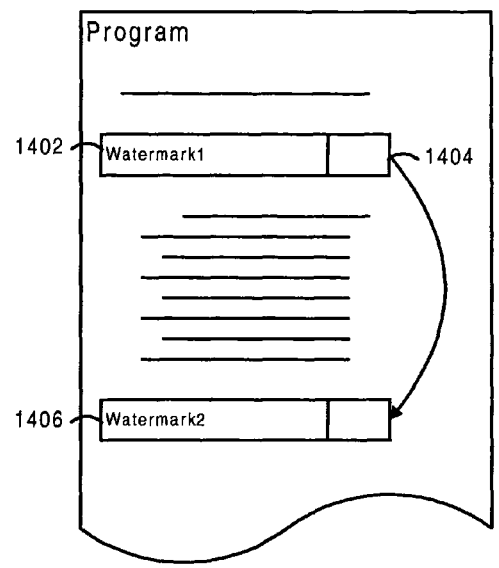
FIGS. 14B and 14C illustrate a layered watermarking scheme in accordance with an embodiment of the present invention.

As shown in FIGS. 14A and 14B, another technique for resisting collusion is to apply multiple watermarks to each program instance. For example, one or more unique watermarks can be applied to a program at different stages of the program development and distribution process. For instance, the software developer might add one or more watermarks to a particular version of the program, these watermarks being the same across all instances of that version of the program. A second watermark can be inserted when the user installs the program, for example, and can be chosen to be effectively unique for each instance of the program (or for each instance of that version of the program). The watermarks can be located by first finding the version-specific watermark, and following a pointer, such as pointer 1404, to the location of the instance-specific watermark. If the watermarks are connected in this manner, the instance-specific mark can be relatively small, since it need not contain self-identifying information.

Although an attacker might be able to detect the instance-specific watermark using a collusive attack, such an attack would typically be unsuccessful in detecting the version-specific watermark, since it would be the same across all instances of that version of the program and would not stand out upon comparison of two program instances. Accordingly, this technique provides resistance to collusive attacks, and also provides a level of redundancy that is effective in resisting cropping and patching attacks.

Figure 14C:
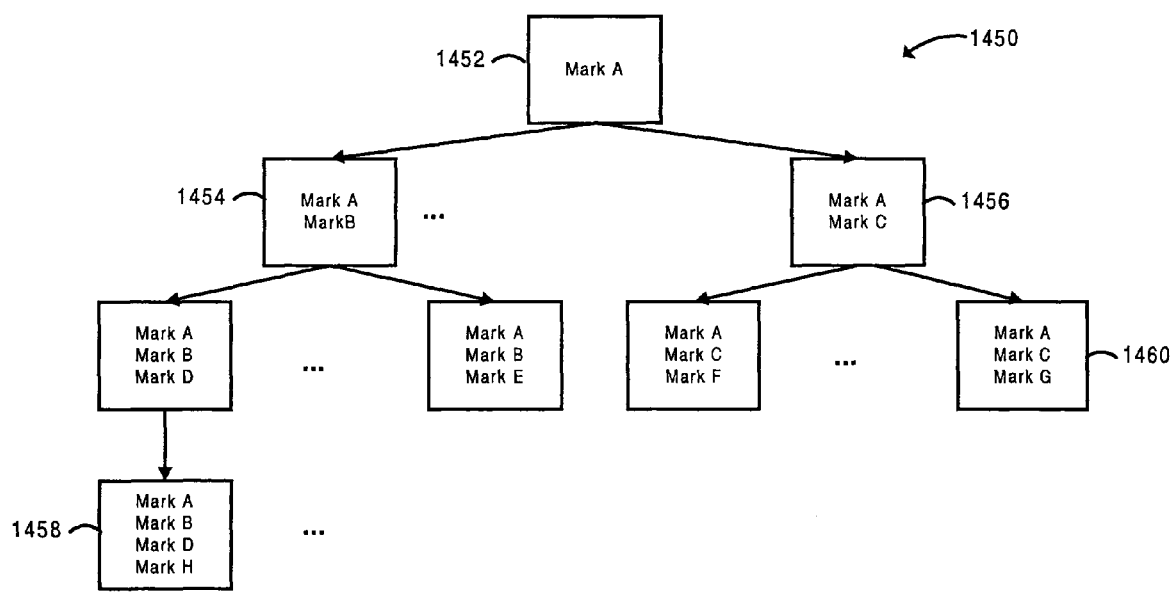

It will be appreciated that this technique can be used to create any suitable number of watermark layers. For example, a program might contain three or more layers of watermarks, the watermarks linked together with pointers in the manner shown in FIG. 14B. From a system perspective, the layers of watermarks create a tree structure, the leaves identifying each instance of the program in an effectively unique fashion. This is illustrated in FIG. 14C, in which node 1452 of tree 1450 represents the original program, nodes 1454 and 1456 represent different versions of the program, nodes 1458 and 1460 represent different instances of those versions, and so forth. Thus it can be seen that each instance of the program can contain a plurality of watermarks—the layers providing collusion resistance, and the multiplicity of watermarks providing resistance to cropping and patching attacks. If an attacker is able to remove one watermark, other watermarks will remain to identify the program.

Thus, a variety of watermark encoding techniques have been presented. These techniques can be used in the context of software or any other suitable substrate, and can be used alone or in combination with each other. The next section describes techniques for embedding suitably-encoded marks into a piece of software.

4. Mark Placement and Detection

4.1. Placement

There will typically be numerous locations in a piece of software or its environment in which watermarking data can be inserted. For example, marks can be placed outside the code or data sections, in dead code or data, and/or in inert code or data. Marks can alternatively, or in addition, be inserted by making peephole changes to effective code, by making refinements to data-types or operations, by modifying the static control-flow graph, by modifying the program's dynamic behavior, and so forth.

As described below, some placement techniques may require new resources to be inserted into the program, while other techniques use existing resources (e.g., techniques like setting scale bits, writing dead or inert code/data over existing NOPs, re-allocating registers, and the like). The placement techniques set forth below may also provide different capacities to hold data. For example, techniques such as setting scale bits, re-allocating registers, and using single-instruction inert code typically provide relatively fine-grained marks containing only a few bits each. Other techniques, such as those that use longer sequences of inert code, may be capable of containing a watermark's entire payload. In addition, placement techniques may differ in their symbol density (i.e., the average number of marks that can be inserted in a program of a given size). However, it will also be appreciated that many of the placement strategies described below overlap to some extent, or are closely related.

4.1.1. Introduce New Components

A general technique for watermarking a piece of software is to insert new code, data, or other components that may serve as watermarks, or may be subsequently modified to include watermarks. As described below, there are a variety of components that can be inserted for this purpose, and there are a variety of ways to actually insert these components.

4.1.1.1. Unused Components

One type of information that can be added to a program is code and/or data that are not used during the program's execution. This information can serve as a watermark, or can later be modified to include a watermark. A benefit of including a watermark in unused program components is that the addition of the watermark will generally not harm the performance of the program, although it will increase the program's size. A disadvantage of watermarking unused components is that an attacker may be able to identify code that is never executed, or data that are never used, and then simply alter and/or remove this code or data, thus removing any marks contained therein.

4.1.1.1.1. Unused Data

One of the simplest watermark containers is a static array of data stored in the data section of the executable. On most platforms, virtually all of the space created in this way is available for the watermark content. For example, the following macro definition could be used to insert an array of N marks into a program written in the C programming language:

```
# define InsertWatermark()
    {static int X[N] = {MARK0, MARK1, ... MARKN – 1};}
```

Marks inserted in this manner will typically be able to withstand code optimization or instruction substitutions, will generate little if any runtime overhead, and will be largely platform-independent. Note, however, that if an array of 32-bit words is used, the layout of the bytes constituting each word will typically depend on the byte order of the platform. For example, the Intel® 80x86 architecture stores the least significant byte in the lowest address, while other platforms may have a different byte order. Thus, to locate and/or interpret the marks, the platform's byte-ordering scheme should be taken into account. These complications may be avoided by using an array of bytes rather than an array of words.

A data section watermark, such as the one shown above, may be somewhat susceptible to discovery by certain collusive and/or static analysis attacks since the data section of a program is often much smaller than the code section. Because current tools for customizing programs typically do not support data section rearrangement, it may be relatively difficult to defend against such attacks.

4.1.1.1.2. Unused Code

Marks can also be placed in unused (or "dead") code. In one embodiment, basic blocks are inserted containing code that is never executed, and marks are inserted into these blocks. The unused basic blocks can be inserted between other basic blocks in the program using a binary modification engine to correct references to the moved code, as described in the Software Self-Defense application, which was previously incorporated by reference. Opaque predicates can be used to disguise the fact that certain code is never executed. For example, a jump in the original program can be converted to an apparently conditional jump that always evaluates to a predefined value (e.g., "true") at runtime, although an attacker may be unable to deduce this easily using static analysis.

Various techniques can be used to embed marks in unused code. For example, marks can be stored as immediate operands of instructions. In one embodiment the inserted code is made to look like real code by using, e.g., techniques described in the Software Self-Defense application and elsewhere herein.

Although an attacker may perform static or dynamic analysis to find unused code, or may reorganize basic blocks or insert null-effect instructions to displace code, these attacks generally require a binary editor and will thus be relatively costly and/or time-consuming to perform successfully.

4.1.1.1.3. Manipulating Tables, Debug Info, Relocations and/or Padding

Marks can also be placed in areas other than the code or data sections of a program. For example, marks can be placed in program headers, symbol tables, debugging information, jump or relocation tables, import/export tables, virtual function tables, or other locations. There are many such areas in the Microsoft PE binary format, and marks can be advantageously embedded therein using, e.g., a binary code manipulation tool.

For example, one technique is to add watermarking information between structures in the import table. Such structures are defined in the "Portable Executable and Common Object File Format Specification 4.1" (Microsoft, August 1994), and include the Import Directory Table, the Import Lookup Table, the Import Address Table, and the Hint/Name Table.

Another illustrative technique is to take advantage of ordinal-based addressing in import tables. Import tables typically have two addressing modes. In one mode, the import table references a function by storing a pointer to the function's name, while in another mode, the import table references a function by simply storing the ordinal value of the function's position in the table. Since ordinal addressing consumes less bits per table-entry than pointer-based addressing, watermarking information can be stored in the unused bits of table entries that use ordinal addressing. For example, ordinal values typically consists of 16 bits, plus a 1-bit flag indicating that ordinal-based addressing is being used, while a pointer typically consists of a 31-bit value, plus a 1-bit flag. Thus, ordinal entries include 15 unused bits into which watermarking information can be inserted.

It will be appreciated that there are many similar techniques for including watermarking information in tables, headers, and the like.

4.1.1.1.4. Add New PE Sections

Another watermarking technique is to simply add new sections to the portable executable file. The new sections can be used to store watermarking information. An advantage of this technique is that it can provide a large area for the insertion of watermarks. However, if an attacker discovers that the new PE section is unused, he might simply remove it. Accordingly, this technique is preferably used in connection with self-checking and other tamper-resistance techniques—such as those described in the Software Self-Defense application—in order to discourage such an attack.

4.1.1.2. Used Components

Code or data that is used at runtime, but that is ineffective in changing program behavior, can also be added to the program and watermarked. Such inert code/data sequences are effectively NOPs, and can take a wide variety of forms—a PUSH followed by a POP, for example. Marks can be stored in inert code as, e.g., immediate operands, opcodes, memory addresses, and the like. Additional null-effect instruction sequences are described in the Software Self-Defense application, which was previously incorporated by reference, and in commonly-assigned U.S. patent application Ser. No. 09/095,346, entitled "Obfuscation Techniques for Enhancing Software Security," filed Jun. 9, 1998 ("the '346 application") and in Cohen, "Operating System Protection Through Program Evolution," Computers & Security, vol. 12, no. 6, pp. 565-584 (1993) ("the Cohen paper"), both of which are hereby incorporated by reference in their entirety.

Although any suitable null-effect sequences can be used, care should be taken to avoid unacceptably degrading the program's runtime performance. For example, the programmer or binary editor should be aware of inner loops or performance-critical basic blocks, and should avoid inserting time-consuming inert code sequences in those locations.

It will generally be relatively difficult for an attacker to detect and/or remove marks embedded in inert code or data, as such marks will survive a static or dynamic search for unused components. Although inert code/data marks may be susceptible to attacks that check for the presence of ineffective code, obfuscation techniques can be used to hide the fact that certain code/data is inert.

4.1.1.2.1. Inert Code

Figure 15A:
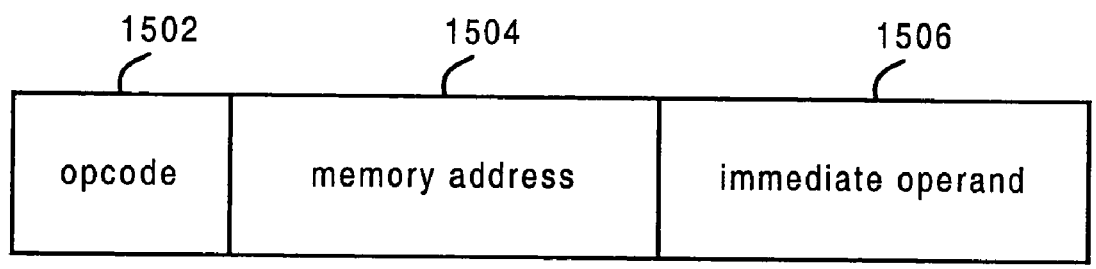
FIG. 15A shows the general form of an illustrative inert-code watermark holder.

As mentioned above, a code-section watermark can be embedded in the immediate operands of inert instructions. The watermark is thus spread over non-adjacent slots with intervening opcodes. FIG. 15A shows the general form of an illustrative watermark holder, which consists of an opcode 1502, a memory address 1504, and an immediate operand 1506.

Referring to FIG. 15A, opcode 1502 may comprise any suitable value, including such common opcodes as MOV, LEA, ADD, SUB, AND, OR, and the like. Since common opcodes typically have different variants (e.g., to handle operands of different sizes, particularly on complex instruction set computers), it may be possible to store several bits of information in the choice of opcodes. For instance, if there are eight ways to represent an instruction or instruction sequence, then the choice of any one representation contains three bits of information (i.e., $\log_2 8$).

Memory address 1504 can be stack-relative or absolute. A stack-relative address will typically result from a macro such as the following:

```
#define Macro1( )
{int dummy = operand; ...}
```

This type of macro usually translates into {mov [sp+x], operand} or {mov [bp-x], operand}. Care should be taken to prevent the compiler from eliminating the macro code during optimization, and it may be desirable to avoid storing information in the address unless x is controllable or predictable. In any event, since x is likely to be a small integer, just like in many other naturally-occurring instructions, it will generally not help much with registration.

In contrast, an absolute addresses will typically result from a macro such as the following:

```
#define Macro2( )
{static int dummy; dummy = operand;}
```

Figure 15B:
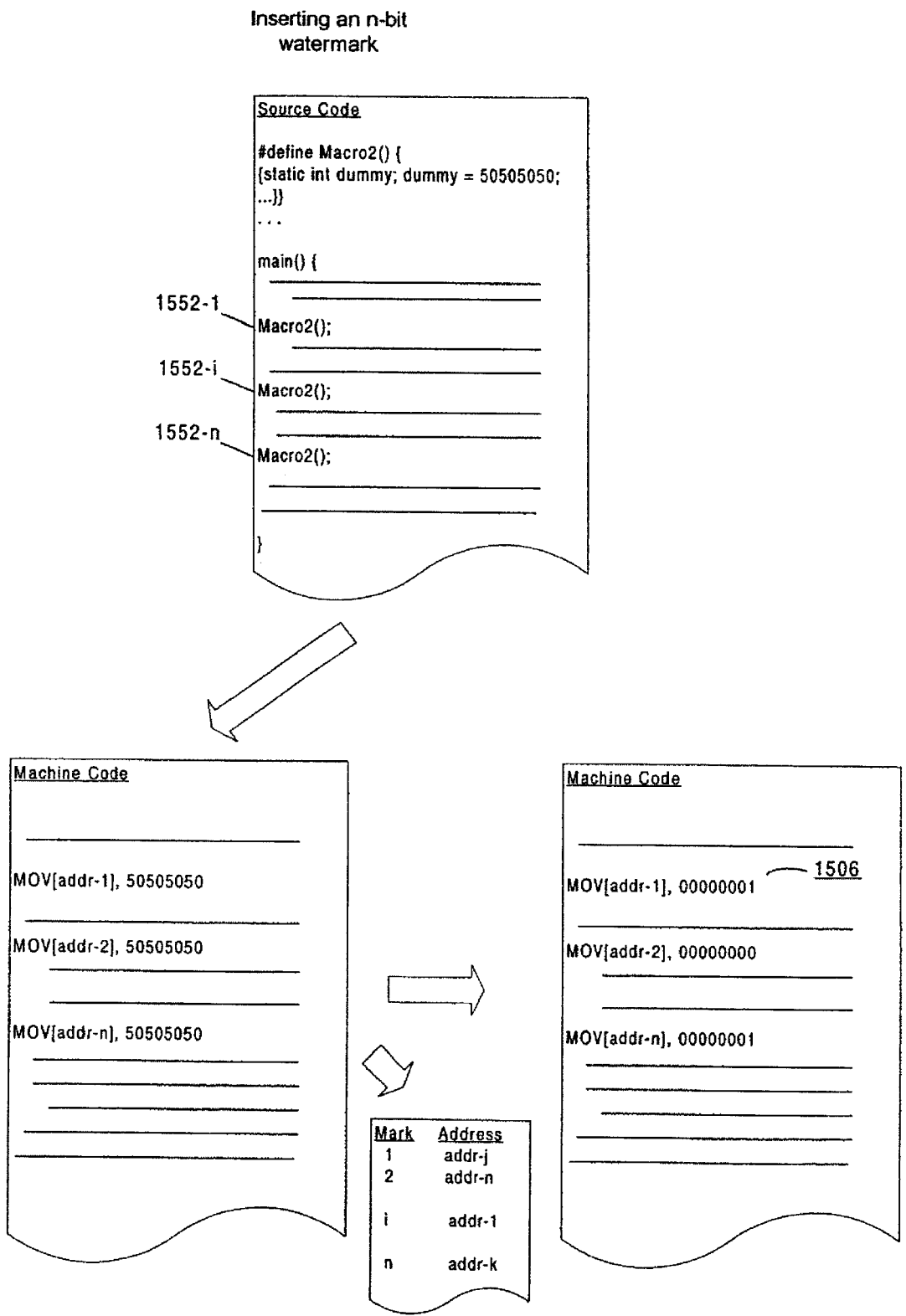
FIG. 15B illustrates the use of a plurality of macros to create space for a multi-bit watermark, and the encoding of such a multi-bit mark in accordance with an embodiment of the present invention.

Note that {static int dummy=operand;} would not result in any code, since if the operand is an integer, it will simply be stored in the data section. If the macro's variables are defined as static variables, as shown above, then different instances of the macro will result in a unique locations in the data section corresponding to the macro's variable (e.g., the "dummy" variable shown above). In fact, as shown in FIG. 15B, the absolute addresses can provide registration information and identify the bit location that is being encoded. For example, 1600 different addresses could identify 1600*mr positions, where m is the size in bits of the payload, and r is the number of times the payload is replicated. If the macros are inserted in the source code, the addresses will typically not be known in advance, although they can be found after compilation if the operands are initially set to distinctive values (e.g., "50505050" in FIG. 15B).

Referring to FIG. 15B, in one embodiment immediate operands 1506 are chosen to be relatively small. For example, operands smaller than 28 could be used. This is possible since the addresses provide registration and identification of the bit locations, and thus the operands need only store however much of the watermark payload is desired. For example, the operands could contain a single bit of information (e.g., a 0 or 1). If the operands are initially set to distinctive values to facilitate location of the addresses, these distinctive values can be replaced with watermark-containing operands after compilation (e.g., 0x00000000 or 0x00000001). This watermarking technique is described in more detail below, under the heading "Priming and Stamping."

As with other inert code watermarks, marks inserted in the manner shown in FIG. 15B can be attacked by looking for code sequences that are never used or that do not affect the program's proper execution. A way to counter such attacks is to use opaque predicates on the memory addresses. However, opaque predicates may actually give away the locations of the slots. One solution is to use opaque predicates on random ranges of data. If enough are used, they will cover most of the slots. Such predicates should preferably be kept out of inner loops, and it is desirable to have a relatively large variety of such predicates. Another solution is to use different opaque predicates on different slots. It will be appreciated that even relatively lightweight predicates can be used, as they may be hard to find automatically even though they may be relatively easy to spot manually.

It has been found that C-language macros such as those described in connection with FIG. 15B may result in relatively unpredictable watermark and/or container placement, as the compiler may, due to optimizations, pull instructions from the preceding or succeeding code into the instructions generated by the macro. Moreover, the instructions emitted by the compiler may vary depending on compile-time options. It will often be desirable to have a more predictable mechanism. Thus, in one embodiment the macros and/or inlined functions are encoded in assembly language to control the placement of content slots precisely. The macros and/or inlined functions can be inserted into the source code by using appropriate compiler directives, or can be inserted directly into the assembly or machine code using a binary modification tool. While use of this technique facilitates precise watermark placement, since it uses assembly code, it has the disadvantage of generally needing to be coded separately for different platforms.

FIG. 16 shows examples of inlined functions for inserting assembly language containers and/or marks into a program. For example, inlined function 1602 is operable to insert a sequence of alternating ADD and XOR statements, the rightmost operand of which is used to store watermark information. This type of watermark container facilitates collusion resistance, since if the code section is customized, the location of the watermark will generally differ in differently-customized copies.

Referring back to FIG. 16, another illustrative container 1604 is shown. Container 1604 consists of a series of ADD statements, the right-most operand of which is used to store watermark information. Note that container 1604 might appear suspicious to an attacker inspecting the disassembled code since the sequence of consecutive add instructions can be compressed to a single add instruction, and a reasonable compiler will make that substitution automatically. Container 1602 is not as suspicious or compressible since it contains a sequence of alternating ADD and XOR instructions. Thus, in a preferred embodiment, containers similar or identical to container 1602 are used; however, it will be appreciated that containers such as container 1604 could be used as well.

4.1.1.2.2. Watermark Generation Language

Figure 17A:
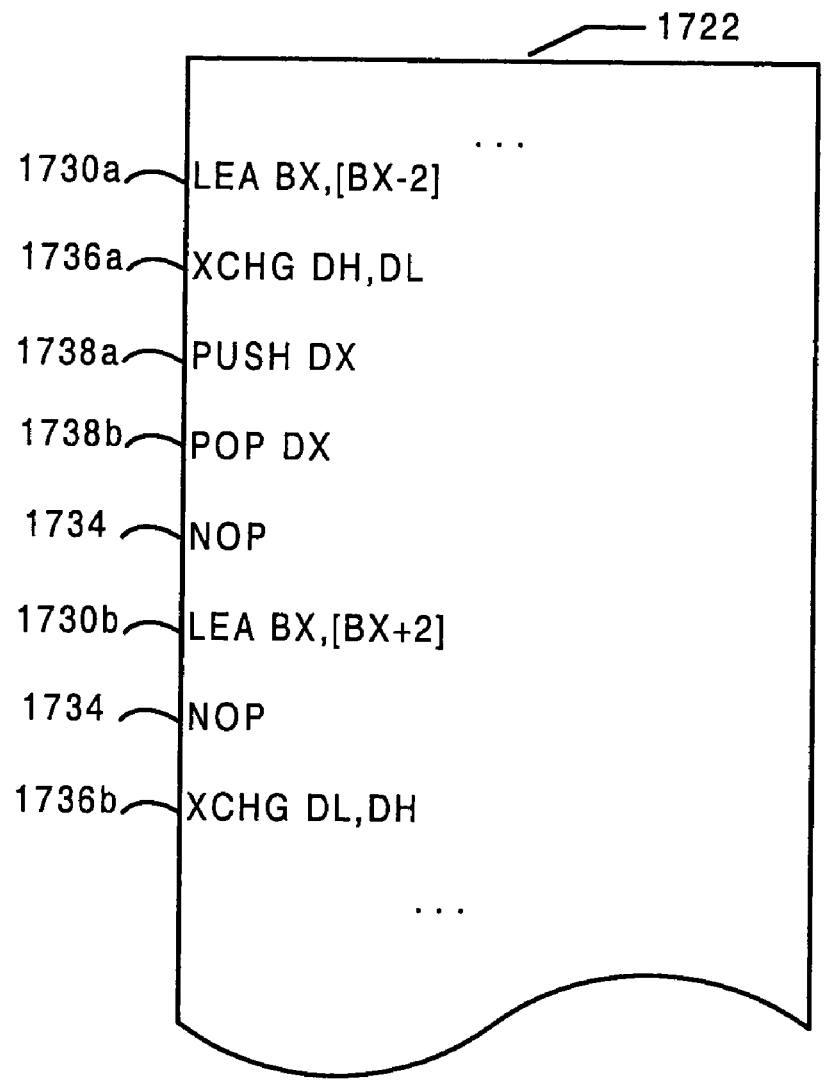
FIG. 17A illustrates a watermark created using a library of atomic, null-effect primitives.

An exemplary method for making watermark containers, such as those described above, and/or watermark registration patterns substantially unique without having to store a key is described below. A formal language is used to describe a possible set of parameterized null-effect sequences, based on some atomic primitives. For example, the sequence PUSH imm32/Readjust-SP is an example of an atomic parameterized NOP (imm32 being the parameter). In the simplest case the language is like parentheses balancing, i.e., the primitives consist of components that are paired into elements that do something and undo it like the PUSH/Readjust-SP example. In addition, we can use the fact that the contents of the registers, memory, and/or stack can be interchanged as long as the state of the system (e.g., computer) is unchanged in the end. Using such a language, a generator and a parser can be written. The generator is operable to generate random instances that are unique for each slot. Examples of null-effect sequences that might form part of such a library include:

PUSH reg; POP reg;
PUSH EAX; MOV EAX, value; POP EAX;
PUSH imm32; Readjust-SP;
LEA reg, [reg-x]; LEA reg, [reg+x];
XCHG reg1, reg2; XCHG reg2, reg1;
AND reg, -1;
OR reg, 0;
NOP Additional examples can be found in the Software Self-Defense application and the '346 application. FIG. 17A shows an example of the use of various null-effect primitives to create a unique null-effect pattern in watermarked program 1722.

4.1.1.2.3. Statistical Model of Watermark Language

To avoid detection, it is important for components that are added to a program to blend in with the rest of the program. Otherwise, an attacker might find the watermarks by creating statistical models of the executable code and looking for unusual code fragments. The present invention provides systems and methods for creating watermarks that blend in with the program into which they are inserted.

Figure 17B:
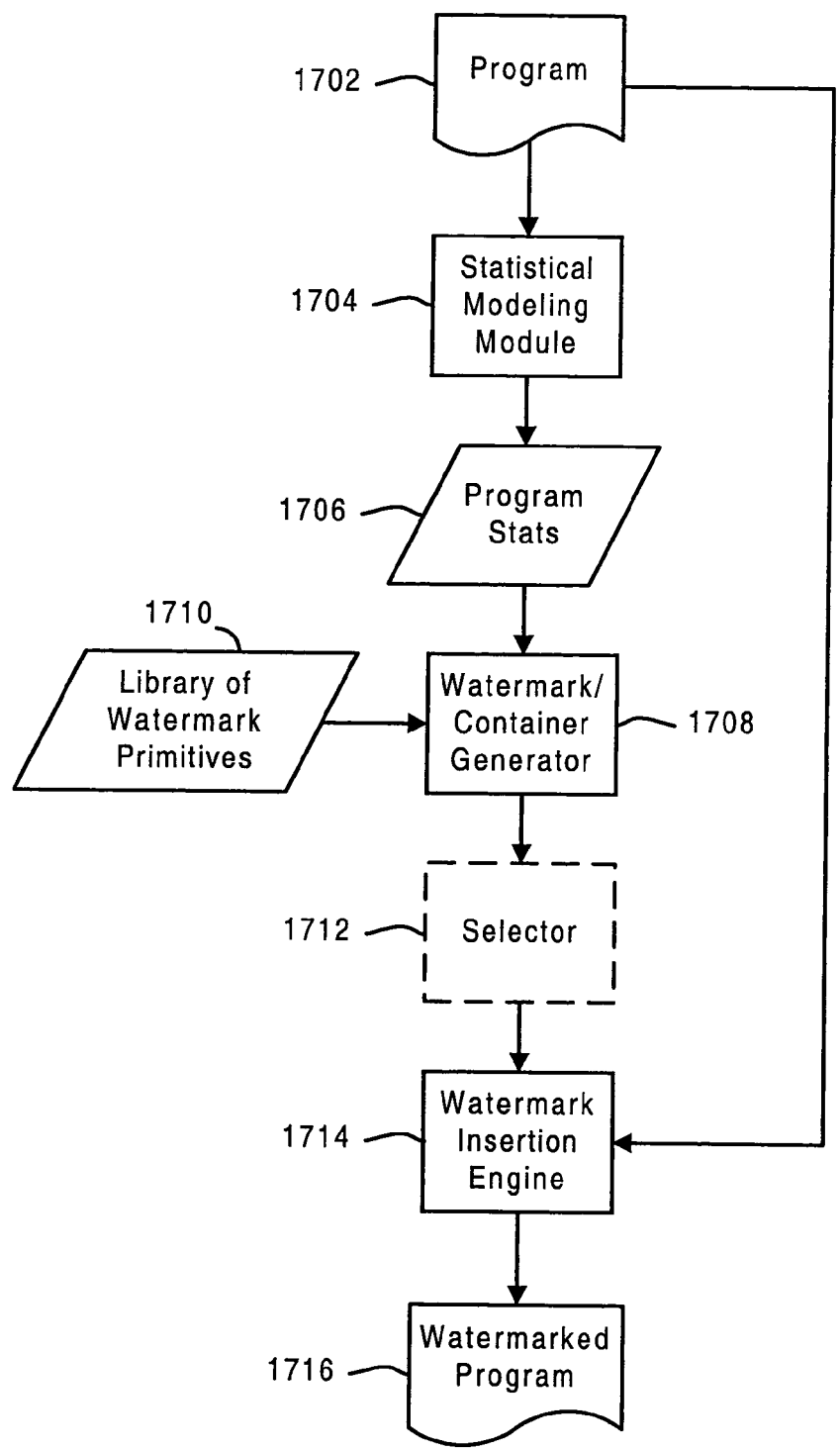
FIG. 17B illustrates a system and method for watermarking a program using statistical analysis to select stealthy mark holders and/or marks.

One technique for creating stealthy watermarks and/or watermark holders is to examine common compiler or programming idioms, and to model the watermark code after such idioms. FIG. 17B illustrates a system for watermarking a program using statistical analysis to select stealthy mark holders and/or marks. Referring to FIG. 17B, a statistical analysis module 1704 analyzes a program 1702 and generates one or more statistical models 1706 of the programming idioms, data structures, and/or other programming constructs contained therein. Watermark generator 1708 uses these models 1706 in connection with a library of watermark primitives 1710 (such as that described above in connection with FIG. 17A) to create stealthy marks for insertion into the program by watermark insertion engine 1714.

It will be appreciated that a number of variations could be made to the illustrative system shown in FIG. 17B. For example, while the embodiment described above integrates statistical models 1706 into watermark generation process 1708, in other embodiments statistical models 1706 can be used by a separate watermark selection module 1712 to decide whether to accept or reject the potential watermarks generated by generator 1708 (such as watermark 1722 in FIG. 17A). Similarly, while FIG. 17B shows an embodiment in which watermarks are generated automatically from a library of atomic watermarking primitives 1710, it is also possible to simply choose and/or create the watermarks by hand, using the statistical models 1706 for guidance. Moreover, it should be appreciated that statistical modeling 1704 need not be performed on the program that is actually watermarked. Depending on the level of sophistication of statistical modeling step 1704, it may be preferable to simply analyze one or more programs that are similar to the program that is to be watermarked, and to use those statistical models to select the watermarks, thus avoiding the need to perform statistical modeling each time a program is to be watermarked. Since an attacker will typically not have a copy of an unwatermarked version of the watermarked program, he will not be able to generate a statistical model on the unwatermarked version of the program anyway. Indeed, since the statistical modeling performed by an attacker will typically be done on similar or related programs, it may be preferable to generate statistical model 1706 from one or more such programs in order to avoid accentuating other unusual characteristics of the program that is to be watermarked (such as those characteristics that may result from the application of tamper resistance or obfuscation measures) by reinforcing those unusual characteristics with watermarks that mimic their appearance.

Figure 18A:
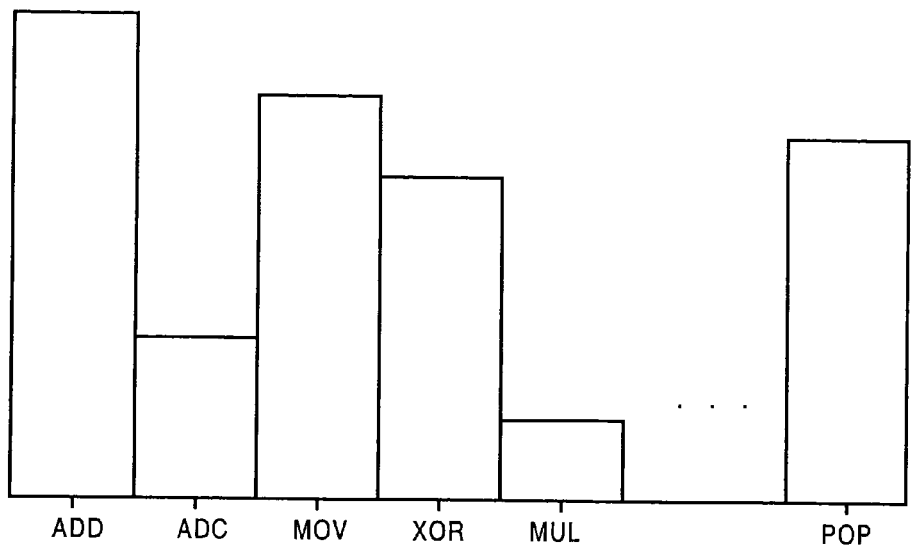
FIGS. 18A and 18B illustrate statistical modeling techniques in accordance with embodiments of the present invention.
Figure 18B:
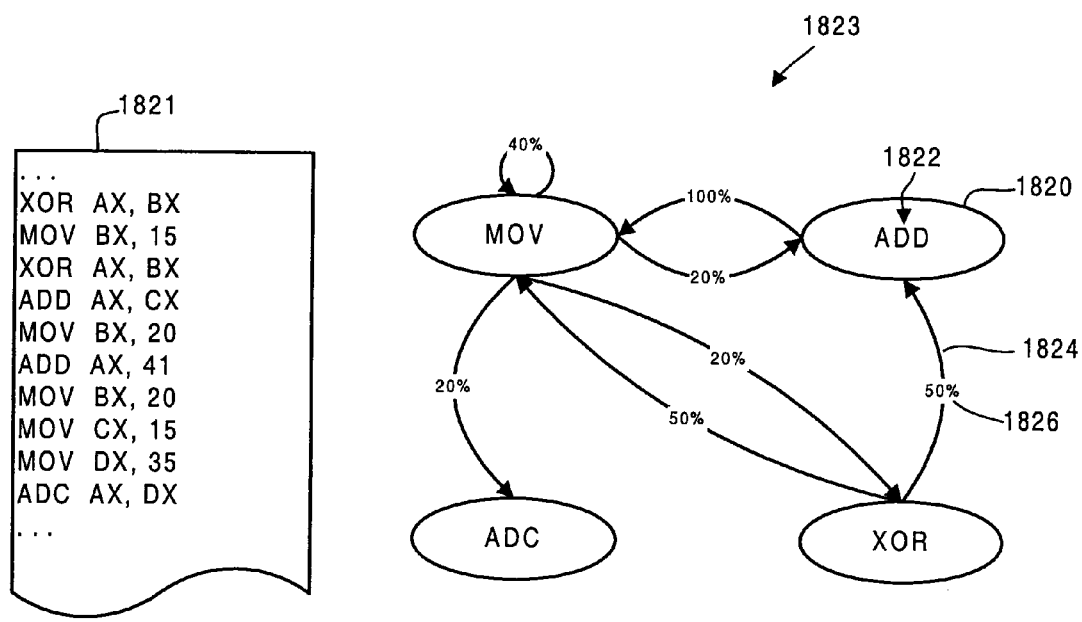

FIGS. 18A and 18B illustrate several statistical modeling techniques that may be used by a statistical modeling module such as that shown in FIG. 17B. Referring to FIG. 18A, one relatively simple modeling technique is to count the number of times certain opcodes are used. As shown in FIG. 18A, the result might be a histogram showing the frequency with which each opcode appears in the program. Watermark holders can then be chosen that avoid using relatively uncommon opcodes. For example, it has been observed that while instructions like ADD, XOR, and MOV are relatively common in the code produced by standard compilers, instructions like MUL, ADC, and AAD are not.

Alternatively, or in addition, more sophisticated statistical modeling techniques can be used to characterize common sequences of code, thus enabling the generation of even more stealthy code sequences. For example, in one embodiment Markov models are used to analyze the common code sequences and idioms that appear in "normal" compiled programs. The insights gained from this modeling process are then used to select the types of code sequences and customizations that are used for purposes of watermarking, the goal being to generate and use code sequences that blend naturally into the rest of the program, and are thus resistant to statistical analysis.

A simple statistical modeling technique is shown in FIG. 18B. A graph is formed in which each node 1820 corresponds to an opcode 1822. The edges 1824 that connect the nodes represent the occurrence of a sequence of two opcodes. Each edge has an associated probability 1826 that represents the likelihood that the given two-opcode sequence will occur (or the relative likelihood that the next opcode in the sequence will occur, given the occurrence of the first opcode). Thus the graph is effectively a probabilistic state diagram in which each node represents a state, and each edge represents the probability of a transition between the states that it connects.

As shown in FIG. 18B, a simple code fragment 1821 might generate statistical model 1823. Model 1823 shows the probability that each opcode will occur, given the occurrence of another opcode. In the short code sample shown in FIG. 18B, the MOV opcode is followed once by the XOR opcode, once by the ADD opcode, and twice by another MOV opcode. Thus, given a MOV opcode, the probability that the next opcode will be another MOV is 50%, the probability that the next opcode will be an ADD is 25%, and the probability that the next opcode will be an XOR is also 25%. The probability of each of the other edges in the graph is generated in a similar fashion. Note that in this example the edges represent relative probabilities, and thus it may be desirable to assign each node a probability (obtained from a histogram such as that shown in FIG. 18A) that indicates the likelihood that a given state will occur. This probability can be multiplied by the relative path probability to obtain the absolute probability that the given path will occur in the program.

The effectiveness of the modeling technique can be enhanced by using something more detailed than an opcode for each node—for example, something like "AND with a 32-bit immediate operand, and 8-bit displacement address." Thus, in one preferred embodiment, the nodes of the Markov model consist of "instruction, operand type, register use", with each of these nodes having associated distributions of immediate operands, displacement addresses, etc. Alternatively, or in addition, these distributions can be associated with larger groups of nodes to get statistically better results. Thus, for example, the probability distribution of the jump location for conditional jumps might be X; the probability distribution of the immediate operands for logical operations might be Y, and so forth. The transition probabilities can then be determined empirically for a large piece of code. This can inherently model compiler idioms and provide a way to quantitatively say how likely it is that a sample piece of code was generated by a compiler. Of course, like any Markov model of a non-Markovian process, a great deal of potentially relevant (and/or important) information is thrown out.

Thus, it will be appreciated that statistical modeling can be done at different levels of complexity, depending on available resources, the level of statistical analysis that is expected from an attacker, and other factors. Moreover, it should be appreciated that there are a variety of sequence modeling techniques, and that any suitable one could be used without departing from the principles of the present invention, including Markov models such as those described above and variations thereof.

4.1.2. Replace or Modify Existing Components

Watermarks can also be inserted into components that already exist in the program, thus obviating the need to insert and disguise new watermark containers.

4.1.2.1. Replacing Dead Code

Many common compilers align code on 16-byte boundaries. When functions do not align, the compiler typically pads up to the nearest boundary with RET or INT3 instructions that are never executed. For example, the Microsoft Visual C++ compiler often generates a lot of these padded regions, especially for functions and methods that consist of little more than a call to another function or method. These padded areas and unreachable blocks make good places to place watermarking bits using a binary code modification tool. The watermarks placed in these locations can take a variety of forms. For example, one technique is to insert arbitrary code. Another is to store a jump table. Since the compiler often stores jump tables after a RET instruction, this would be relatively stealthy and attack-resistant, since if an attacker removes all code or jump tables inserted after RET instructions until the next 16-byte boundary, the attacker will often remove some valid code or jump tables as well.

4.1.2.2. Alternate Instruction Encodings

Marks can also be embedded by making peephole changes to code that is executed at runtime. For example, scale bits can be manipulated, instructions or instruction sequences can be replaced with their equivalents, registers can be re-allocated, and so forth. Use of such techniques will often be advantageous in that they generally do not involve the addition of new resources or expansion of the program.

4.1.2.2.1. Manipulating the Instruction Format

One effective watermarking technique is to make use of redundant or complementary components that are peculiar to the instruction format of the platform on which the watermarked software is run. These redundant instruction components can be used to generate instructions that have the same effect on the program's operation, but which appear slightly different in the program's binary image. The Intel 80x86 instruction set presents many such opportunities for watermark insertion, due to the variety of idiosyncratic formatting options that have resulted from the processor's complex evolution, and the variety of design decisions and backwards compatibility requirements that this evolution entailed. For purposes of illustration, several examples of the watermarking possibilities offered by the Intel 80x86 instruction format are described below; however, it will be appreciated that there a wide variety of similar or equivalent ways to insert watermarks by exploiting the peculiarities of the Intel instruction format and/or the instruction formats of other platforms, any of which could be used without departing from the principles of the present invention.

Figure 19:
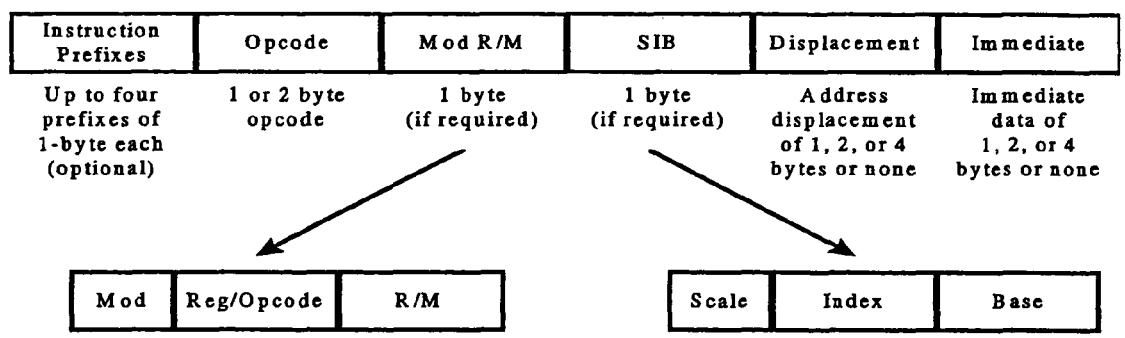
FIG. 19 shows the general format of an instruction on the Intel 80x86 platform.

To facilitate the discussion that follows, FIG. 19 shows the general format of an instruction on the Intel 80x86 platform. Additional information on the Intel instruction set can be found in the Intel Architecture Software Developers Manual, Chapter 36, which is hereby incorporated by reference. Information about instruction sets for other platforms can be found, for example, in "PowerPC Microprocessor Family: The Programming Environments for 32-bit Microprocessors" (Motorola, MPCFPE32B/AD); "The SPARC Architecture Manual, Version 9" (Sparc Int'l, 1999); Sites and Witek, "Alpha AXP Architecture Reference Manual" 2nd ed. (Digital Press, 1995); Kane, "MIPS R2000 RISC Architecture" (Prentice Hall, 1987); and "SA-110 (StrongARM) Microprocessor Technical Reference Manual" (Intel Corp.).

4.1.2.2.1.1. Instruction Prefix Bits

As shown in FIG. 19, each opcode can be preceded by any of four classes of optional instruction prefixes, which can be used to override addressing segments, to change from 32-bit to 16-bit operations, and to specify repetitive operations for string-based instructions. For many opcodes these prefixes are irrelevant, but can nevertheless be inserted into the instruction stream without adverse effect. For example, many instructions do not do any addressing, but can be given an addressing-mode prefix. Thus, watermarking information can be inserted into a program by manipulating the prefix bits of instructions for which those bits do not matter. Such manipulations will typically incur negligible computational overhead, and will be relatively stealthy since they will not show up as keywords when the code is disassembled.

One such prefix is the bit pattern 001xx110, where xx are two bits that can be varied to select between segment override prefixes CS, DS, ES, and SS. If this prefix is added to an instruction for which the prefix is irrelevant—such as a NOP—the xx bits can be set to any desired value without affecting the program's operation. Thus, watermarks can be added to the program by, e.g., adding instructions for which the prefix bits do not matter and embedding a watermark in the prefix bits, and/or by looking for existing occurrences of this type of instruction and adding or changing the prefix bits as desired. The marks can be found by maintaining a list of the locations at which the prefix manipulations were performed, or by using other suitable registration techniques.

4.1.2.2.1.2. Direction Bits

Direction bits provide another opportunity to take advantage of the instruction formatting idiosyncrasies of the Intel 80x86 architecture. The opcodes of many two-operand instructions on the Intel 80x86 platform include a bit—the direction bit—that indicates which operand is the source and which is the destination. This may be useful, for example, if one of the operands is a register and the other operand is a memory location. However, if both operands are registers, for example, the direction bit is essentially redundant, since the direction bit can be set to an arbitrary value and the order of the registers in the machine language representation of the instruction can be flipped to preserve the original meaning of the code.

Figure 20:
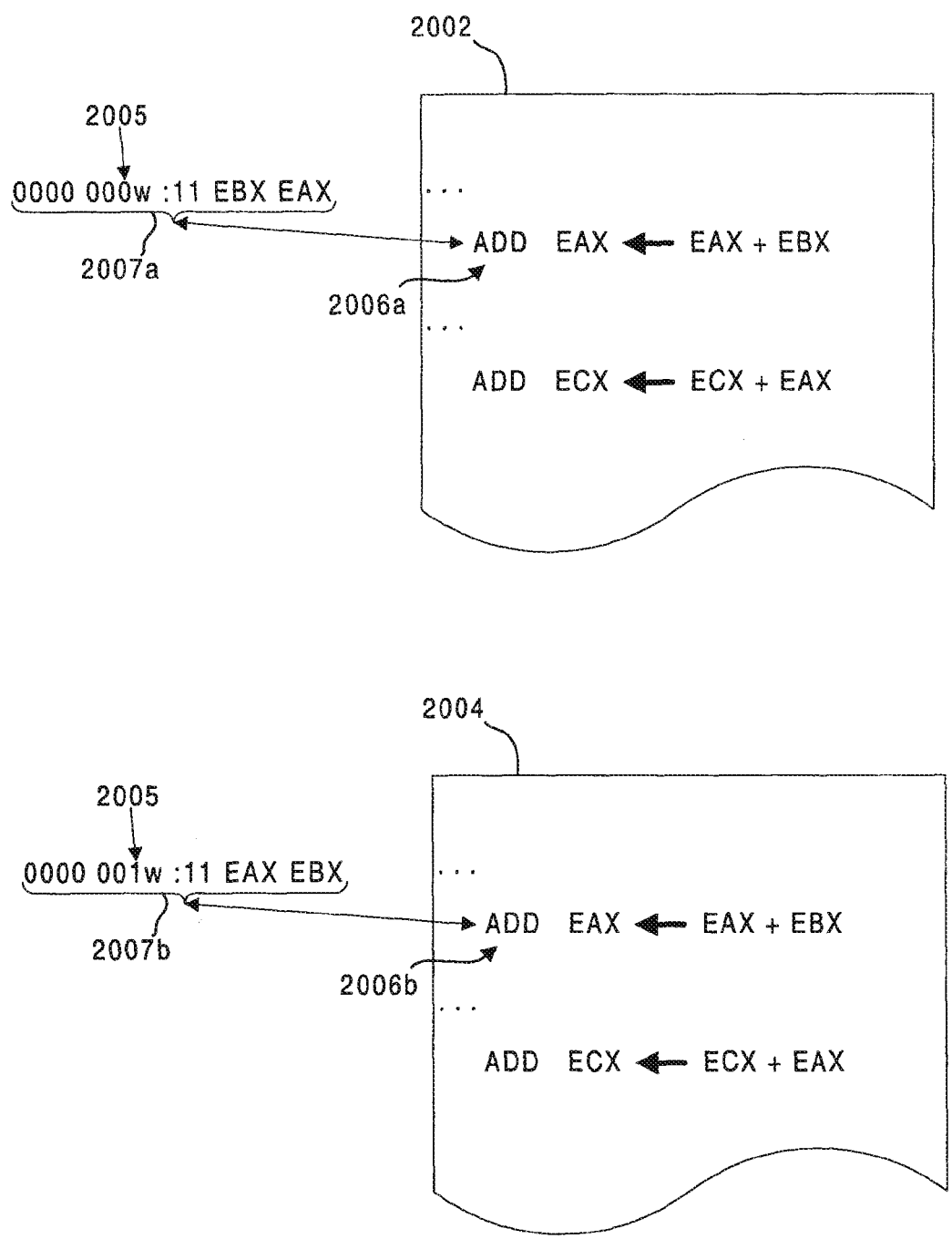
FIG. 20 illustrates a watermarking technique that makes use of the direction bit on the Intel 80x86 platform.

FIG. 20 illustrates how watermarking information can be embedded in the direction bits of certain instructions. Referring to FIG. 20, original pseudo-code sequence 2002 is transformed into watermarked pseudo-code sequence 2004 by manipulating the direction bit of certain two-operand instructions in which both operands are registers. Specifically, the direction bits are used to form a relatively long, error-correcting string that contains all or part of the watermark payload. The order of the registers is switched, as appropriate, to preserve the original function of the program. For example, in original code sequence 2002, instruction 2006 added the values contained in the EAX and EBX registers and stored the result in the EAX register. In the machine code representation of that instruction 2007*a*, the direction bit 2005 was originally set to 0, and the code for the EBX register was listed first, followed by the code for the EAX register. In watermarked code sequence 2004, the direction bit has been changed to 1, and the codes for the EAX and EBX registers have been swapped in the machine language representation of the instruction 2007*b* order to maintain equivalence between original instruction 2006*a* and watermarked instruction 2006*b*. Thus, both instructions 2006*a* and 2006*b* add EAX to EBX and store the result in EAX, but the machine code implementations differ. Successive bits of the watermark can be encoded in successive instructions of this type (e.g. ADD reg1, reg2). To retrieve the watermark, the direction bits of instructions of this type can be placed in a sequence, and the watermark can be recovered by examining the resulting bit stream. If the watermark is encoded as an error-correcting string in a sparse space, it will be recoverable even if part of the string is missing or if spurious bits are added. The direction bits of different instruction types can be used to hold different watermarks (or different portions thereof). For example, a separate watermark could be stored in the string of direction bits associated with ADD instructions, while another watermark could be stored in the direction bits of XOR instructions. A normal program will typically contain numerous instructions of this type, and thus the direction bits provide a relatively high-capacity channel for the storage of watermark information. To improve stealth, it may be desirable to examine the use of direction bits by common compilers and to use direction bits in a similar manner when watermarking the code. Additional information on the encoding of the direction bit can be found in the "Intel Architecture Software Developer's Manual, Volume 2: Instruction Set Reference Manual," Appendix B, p. B-5, Intel Order Number 243191 (1999).

4.1.2.2.1.3. Scale Bits

Another watermarking technique takes advantage of useless bits in the SIB (scale-index-base) addressing mode found in Intel 80486 and later processors. In SIB addressing mode, if Index is the bit pattern 100, the SS bits are ignored. Thus, the SS bits can be used to store watermark information. The watermark information can be detected using an external database of locations and/or content. Simple disassembly will be able to locate the SS bits, which may obviate the registration issue. The stored database of content can then be used to link them up in the correct order.

This approach is advantageous in that no instructions need to be added to the program, as there will typically be plenty of such instructions already in the code. Moreover, since additional instructions are not being added, and the added bits are ignored, performance is generally not degraded. In addition, the watermark is quite stealthy since it does not disassemble into anything suspicious looking, and can thus be easily overlooked by an attacker. The primary disadvantage is that if an attacker discovers the hiding mechanism, it is relatively simple to remove the entire watermark. That is, this technique is prone to generalization.

4.1.2.2.2. Equivalent Forms of Instructions

Many instructions and instruction sequences can be expressed in any of several effectively equivalent forms. Thus, watermarking information can be stored in the form that is chosen. For example, if there are two ways to represent an instruction, the choice can be used to contain a bit of watermark information. For example, a "mov eax, imm8" instruction can be replaced with a "mov eax, imm32" instruction, as the second instruction will be able to handle whatever value was specified by "imm8." One of ordinary skill in the art will appreciate that there are numerous other examples of such equivalent instructions and instruction sequences, some of which are set forth in the Software Self-Defense application, which was previously incorporated by reference herein. It will also be appreciated that this technique is related to the permutation techniques described below in connection with FIGS. 21A and 21B. Moreover, since this technique can make use of instructions that actually form part of the program's execution, it will generally be difficult for an attacker to remove a mark embedded in this manner.

4.1.2.3. Watermarked Booleans

Watermarking may advantageously be combined with any of several program and data obfuscation techniques, as described in the '346 application and in the Software Self-Defense application, in order to achieve stronger obfuscation and to make it more difficult to remove or modify the watermark without impairing the execution of the program. The kernel of the idea is to include parts of the watermark in computations of the program in such a way that changes to the watermark by an attacker will almost certainly disrupt the computation, but without unduly constraining or complicating the watermarking process. Any redundant representation of watermarks may be used, and the program variables may be of any type. However, a preferred embodiment uses boolean program variables to simplify the implementation.

For ease of explanation, a simplified scheme will first be described. The basic idea is to tie variables in the program to a watermark in such a way that random changes in the watermark are highly likely to cause the program to malfunction by misinterpreting the variables.

In an over-simplified scheme, the watermark can be stored as a constant in a known place. If a code rearrangement tool moves it, it can be found relatively easily, as described in more detail below. In the program, a number of boolean variables bi are chosen corresponding to the number of bits in the watermark, and each bi is associated with a bit in the watermark w[i], so that the "correct" value of the variable is the exclusive-or of its stored value and the watermark bit, i.e., bi+w[i] (where "+" is equivalent to XOR for one bit variables). Where the original program uses bi in an expression, it is replaced with bi+w[i], and where the original program has an assignment bi=e, it is replaced with bi=e+w[i]. Thus the program will still calculate its original result, whatever that was, but some of the boolean variables will be complemented as determined by the watermark. The result is a "hinted program" that can be watermarked with any desired watermark by setting W.

Note that this transformation of the program is obfuscating: it increases the apparent number of program variables to include the watermark W, and adds complexity to each computation that sets or uses the bi. However, the weakness of this over-simplified scheme is that the program will produce equivalent results regardless of what value the watermark has. Thus, an attacker could zero out the watermark constant, or replace it with any value, without affecting the operation of the program.

To protect against modification of the watermark, some form of redundancy can be used. For example, in a repetition code, for an N-bit watermark, 2*N bits can be stored. A simple code would just store the two repetitions in adjacent positions (or just store two copies of the watermark), but then it would be easy for an attacker to discover this relationship, and modify both consistently.

One way to make the relationship more obscure, while still making it easy to apply watermarks, is to pick two (obfuscation-time) functions f and g over 1 . . . N with disjoint ranges whose union is 1 . . . 2N, plus an N-bit obfuscation-time mask M. To apply the watermark, set W[f(i)] to w[i] and W[g(i)] to M(i)+w[i]. Where the original program uses bi in an expression, replace it with bi+W[f(i)]. Where the original program has an assignment bi=e, replace it with bi=e+W[g(i)]+M(i). As long as W is set as specified, the program will still calculate its original result, although some of the boolean variables will be complemented, as determined by the watermark of an individual instance. However, if an attacker changes a single bit in W, it will cause a boolean variable to be inconsistently set and read. If the variable affected the original computation, the computation will go wrong. (Even numbers of bits can be changed safely only if they maintain the invariant W[f(i)]=W[g(i)]+M(i).) The difference between the watermarker and the attacker is that the former knows f, g, and M, which appear nowhere in the program, and would be difficult to deduce, even if all other aspects of the scheme were understood.

It should be appreciated that the "variables" need not be data variables, but could also (or instead) encompass other characteristics of the program. For example, the logic at the end of basic blocks can be used to encode information (e.g., the sequence je A; jmp B; is equivalent to jne B; jmp A; and thus information can be encoded in the choice of which of these sequences to use in a particular block).

An attacker who knows that precisely this watermarking algorithm has been used could defeat it by statically examining the code, and for each bi, observing the two indexes in W that are consistently associated with it. More realistically, the attacker can make a table of references to boolean variables that are near references to positions in W, and figure out the pairing from there. Although such an attack, if successful, would allow bit-by-bit modification of the watermark, it would typically have a significant cost in examining code. To make this attack more difficult, positions in W can be associated with other boolean variables in dead code or in don't-care tests.

Although this is not particularly robust against an attack that complements all of W, such an attack would typically allow the attacker to insert only one other watermark, and it can be detected by inserting an additional redundant bit in W.

A number of variations can be made to this technique. For example:

Associate more than one variable with each bit of the watermark.

When modifying the original program, quasi-randomly choose between W[f(i)] and W[g(i)]+M(i) both for loading and for storing, thus making the pattern harder to recognize.

Use more than 2N bits for W, and a stronger code than a repetition code, as discussed elsewhere in this disclosure.

Vary the pattern of code substitutions. E.g., instead of bi=e+W[g(i)]+M(i), sometimes use:

if $W[g(i)]+M(i)$ then $bi=e$ else $bi=\sim e$ and/or:

if $e$ then $bi=W[g(i)]+M(i)$ else $bi=W[g(i)]+\sim M(i)$

If the optimizer rearranges this code, so much the more obscure.

Redundancy in W can be used in conjunction with redundancy in the program variables, using techniques similar to those described in the '346 application. For example, a boolean value b can be represented by a collection of boolean variables, e.g., cl . . . ck, and bits in the watermark can be used to specify the interpretation table (truth function) that tells which value each combination of the values of cl . . . ck represents. If approximately half the combinations represent true, and half false, that still leaves $2^k$ choose $2^{k-1}$ combinations available, enough to absorb more than $2^{k-1}$ bits of watermark. Virtually any $2^{2k-1}$ combinations can be chosen at obfuscation time and assigned arbitrarily to combinations of the watermark bits.

cl . . . ck can be converted to a truth value whenever b is used in a computation and boolean values can be expanded again when they are stored to b. Alternatively, boolean computations can be carried out using multi-bit values; bits from the watermark can be used to select the representation to be used for each intermediate result, just as other bits are used to select the representations of the explicit program variables. In a preferred embodiment, each intermediate result is associated with a distinct part of the watermark's redundant representation.

Since there will be multiple ways to represent each truth value, there will be multiple possible "truth tables" for the boolean operations. These tables can be fixed at obfuscation time, or selected dynamically, using still more bits of the watermark's representation.

As an example, consider the case k=2. There are 6 ways (i.e., 4 choose 2) of allocating half the representations to true:

{00, 01}, {00, 10}, {00, 11}, {01, 10}, {01, 11}, {10, 11}

Arbitrarily pick and number four ($2^{2k-1}$) of them; for example:

0: {01, 11}, 1: {00, 01}, 2: {01, 10}, 3: {00, 11}

There are $2^4$ valid four-entry two-bit tables for each of the sixteen combinations of input and output representations. For each negation in the program, we can choose one of its tables at obfuscation-time, and get the result by indexing this particular table by the two bits of the argument. There is no reason to store the (up to) sixteen tables contiguously; we could scatter them according to an allocation scheme that is only known at obfuscation time.

Alternatively, we could calculate the first bit and the second bit of the result in two separate computations. This would require twice as many four-entry one-bit tables. We could completely compute one before starting on the other, making the linkage between the two bits of the result harder to detect (particularly after an optimizer has gone over the code). Part of the (obfuscation-time) invariant would be that corresponding tables would be used for the two halves of each operation.

Correspondingly, for binary boolean operations, there are $2^{16}$ possible valid sixteen-entry two-bit tables for each of the 64 (4×4×4) combinations of input and output representations. There is no need to store all of them. We can choose any "sufficiently large" subset at obfuscation time—that is, enough tables so that the number of times any one of them is used is small enough to make the attacker's task difficult. We need not store any that the program doesn't use.

Note that since we are dealing with boolean values, we don't have to use arithmetic to subscript into the tables. We can scatter the individual elements according to a scheme known at obfuscation time, and use conditionals to select the address.

There is a potential attack on the schemes as described. The weakness comes at each point in the program where an actual boolean bi is needed (e.g., to control a conditional or loop). The attacker can inspect the code that converts cil, . . . , cik to bi. The code will unambiguously identify the equivalence sets representing true and false, and will reveal both the bits in W that are used to control the conversion and the locations of the associated bits cil, . . . , cik. All of this information combined might provide leverage towards breaking the scheme.

A counter-attack is to chain the use of the bits in W, so that each W[i] contributes to determining the representation of more than one variable, and thus requiring a consistent set of changes to be made to the whole chain rather than to just the bits determining the coding of a single boolean. Although this generally does not complicate an attacker's analysis, it does impede an attacker's attempt to use the analysis of one variable to change the watermark in the associated bits.

Another counter-attack is to use a separately-determined representation for each such boolean. I.e., if the value is in a variable, first assign it to a distinct multi-bit temporary.

Note that converting from a regular boolean to a multi-bit version is not very revealing. Since we can, at obfuscation time, choose to use any one of $2^k$ valid conversion tables, the code will reveal only one element in each equivalence set, rather than all of them. Again, if we are assigning one variable to another, we can pass it through a unique multi-bit temporary on the way.

Although these techniques could be readily applied by hand, in a preferred embodiment a class called WatermarkedBool is built that overrides all the boolean operations with their watermarked versions. This can be inlined to yield more efficient—and more obscure—object code.

4.1.3. Permutations

Marks can also be inserted by modifying program control structures. For example, code blocks can be duplicated, object files can be rearranged during linking, or other similar techniques can be used. Instances of the program will look different, and these difference can be used for purposes of identification. There are a wide variety of software components, structures, and operations that lend themselves to permutation, including without limitation, program basic blocks, the program linking order, sparse jump table indices, components in other tables, the order of null-effect instruction sequences, and the like. More examples are described in the Software Self-Defense Application and the '346 application, which were previously incorporated by reference.

Figure 21A:
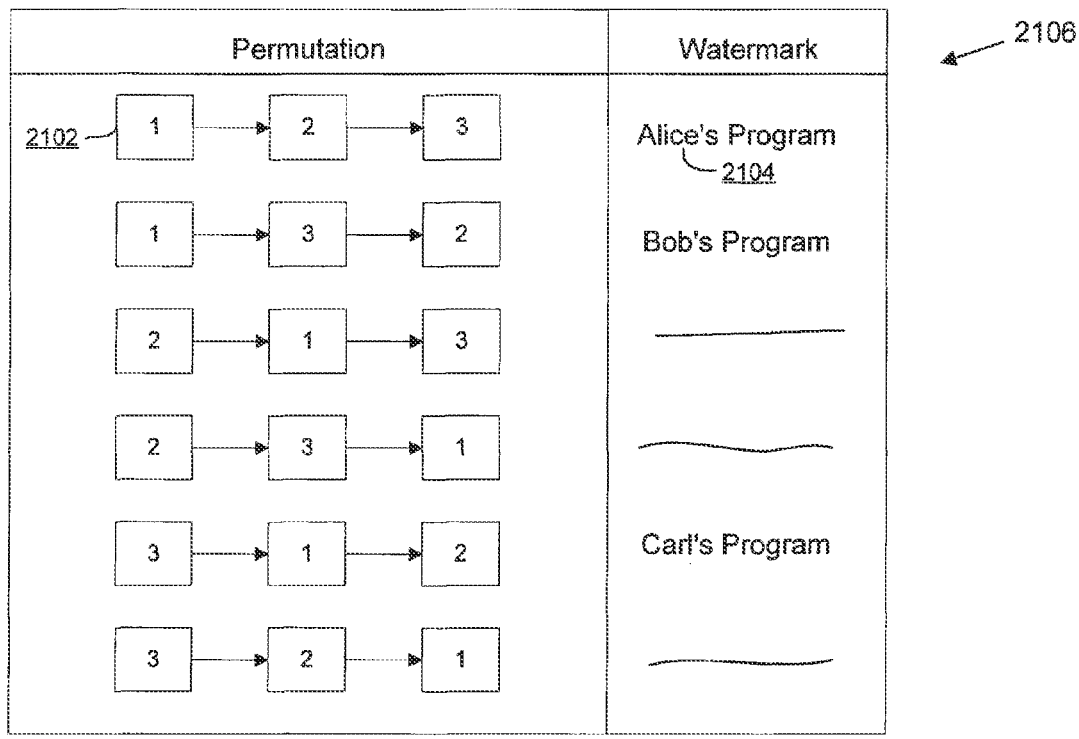
FIGS. 21A and 21B illustrate the encoding of watermarks by permuting program elements.
Figure 21B:
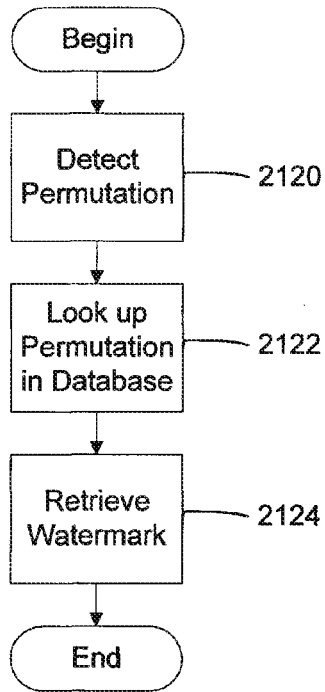

A general technique for embedding watermark information using permutations will first be described, followed by several examples of how this technique can be applied to various program components. As shown in FIG. 21A, a sequence of n program structures 2102 (e.g., basic blocks, jump table indices, null-effect sequences, etc.) can be permuted in n! different ways. In the example shown in FIG. 21A, n is equal to 3, and there are thus 6—i.e., 3!=3*2*1—different permutations of structures 2102. The program creator or distributor can then produce n! instances of a program that each contain a different one of the permutations. The permutations can then be mapped to a unique watermark 2104, and the mapping can be stored in database 2106. As shown in FIG. 21B, when a copy of the program is retrieved, the program creator extracts the watermark by observing which of the permutations has been used (2120), using the permutation to index database 2106 (2122), and retrieving the watermark 2104 contained therein (2124).

It will be appreciated that the technique shown in FIGS. 21A and 21B can be easily extended to more complex situations. For example, the number permutations might be chosen such that it is much larger than the number of assigned watermarks, thus making it more difficult for an attacker to forge a valid mark by simply making a permutation. This is essentially another variation of the sparse space encoding techniques described above. In such an embodiment, the watermark detector could be operable to determine the closest match to a detected permutation, thus providing a degree of fault-tolerance. It will be appreciated that other modifications could be made to the basic scheme set forth in FIGS. 21A and 21B without departing from the principles of the present invention.

4.1.3.1. Basic Block Permutation

Since a major attack is based on reorganizing basic blocks, a solution is to factor out the linear layout of the basic blocks and look at the higher-level control-flow graph. The static flow graph consists of basic blocks (as vertices) connected by jumps and/or statically-known calls. A binary editor can compute such a graph. The graph can be used in at least two ways: as a watermark itself and/or as a registration mark. Both of these are independent of the linear layout of the basic blocks, and are therefore robust against basic-block reorganization by attackers.

Techniques for adjusting the static flow graph include:

Refining the graph by splitting basic blocks or by introducing new basic blocks that are either not executed at runtime or have no effect. This is preferably done in a way that does not significantly degrade performance. See the Software Self-Defense application.

Replicating some basic blocks in the image and, for jumps to such a block, choose the copy to jump to based on bit(s) in the watermark.

Of course, an attacker can use the same techniques to change the static flow graph—e.g., splitting, introducing, or replicating basic blocks—although this will generally require a relatively sophisticated binary editor. Another problem with this approach is that changes to the flow graph are relatively error-prone, and might result in poor debugging capabilities.

In one embodiment the static flow graph serves as a registration mark (the carrier signal) and the watermark is applied on top of that. Thus, reorganizing the basic blocks will not change the watermark per se. Equivalently, the basic-block layout can be normalized before reading the watermark. The problem is then reduced to recording some watermarking bit(s) in each basic block. This could be done using one of the schemes listed above. An attacker might still attempt to split, introduce, or replicate basic blocks; however, in this case it might still be possible to map the resulting static flow graph to the original graph (using, e.g., error-correcting techniques), since the resulting graph will generally be a refinement of the original graph.

4.1.3.2. Register Reallocation

As mentioned above, register allocations are an example of a program component that can be permuted. Suppose a register R is live for a certain range of instructions and another register S is free in that range. In general, R may be replaced by S in that range. A register can typically be considered free at a point V in the program if the register is written at some point, W, after V; the register is not read between V and W; and the control does not flow out between V and W. These conditions are sufficient but not necessary, though they may provide a good first-order approximation of a more flexible rule. See, e.g., Waite and Goos, Compiler Construction (Springer-Verlag, 1984).

In a preferred embodiment, modifications are used that are provably correct, do not require a lot of analysis to make, and that cannot be easily reversed. The last feature is important in protecting this scheme against attackers who know about the general technique. Simple instructions can often be inserted that make the reversal hard. For example, the instruction "mov unused_address, EAX" can be inserted to give the impression that EAX is in use at that point. Additional modification techniques are described in the Software Self Defense application.

4.1.3.3. Watermarking Compiler

Ordinary compilers make many decisions in the course of transforming a source program to machine code. Many of these decisions are made to produce better code (e.g., faster code, or code that uses less memory or fewer registers, etc.). For example, a compiler might select certain instruction sequences that execute more quickly or might allocate registers to minimize spill code. Other decisions that a compiler might make are somewhat arbitrary, such as picking an order in which to place code fragments (object modules) in an executable image. Thus, a compiler's decisions describe a lattice of possible programs, some of which are strictly better than others (e.g., faster and use less memory, etc.), and others that are not readily comparable (e.g., faster but use more memory).

A watermarking compiler can make some of its decisions in order to represent bits of the watermark, rather than purely for performance reasons. Thus the watermark is encoded in fundamental properties of the resulting object code, including but not limited to: instruction selection, spill code placement, register allocation, basic block ordering, procedure linkages (present or absent due to inlining or outlining), data representations, control structure, etc. Compiling the same program with a different watermark will result in different (possibly radically different) byte-code or machine-code. Watermarking during compilation has the advantage (over binary or byte-code watermarking) that the entire program structure is available in a convenient form for manipulation to structure a watermark into the resulting code.

4.2. Detection

Extracting a watermark from a piece of software is essentially the inverse of the process of embedding the watermark. The extraction process typically involves detecting the presence of the watermark, determining how the marks are embedded, retrieving the marks (and possibly noise), and relaying that information to the watermark decoder.

In one embodiment, authorized retrieval of a watermark makes use of secret information not known to attackers. These secrets can be used for both extraction and decoding. Extraction techniques can be categorized generally based on the type of secret information that is used, and where it is used. Two broad categories of extraction techniques are (i) embedding-based identification and (ii) encoding-based identification.

Embedding-based identification uses secret information from the embedding step to locate marks with reasonable accuracy. This information may take a variety of forms, including:

Secret Information Independent of the Watermarked Program: Here, the secret is typically a secret key or other mechanism that makes it computationally infeasible for an attacker to recover the watermark. The secret information could also be a parameter used in generating the marks; e.g., the sequence of opcodes when the payload is stored in immediate operands, the locations of memory addresses in instructions that are used to store the marks, and so forth. Relying on this type of secret is usually prone to generalization attacks and/or information leaks. The resistance to generalization attacks for such techniques depends on the degree of parameterization. The higher this degree, the less identifiable the marks for attackers.

Secret Information Specific to the Watermarked Program: The location of marks, the context surrounding the marks, and the like can be used to find otherwise unidentifiable marks that are resistant to generalization attacks. A disadvantage is that this approach generally entails storing secrets specific to each program in a secure database, the extraction process comparing the program with the secret stored for that program.

In encoding-based identification, the extraction process typically returns marks along with often significant amounts of noise using, e.g., publicly-known (or not-so-secret) placement information. It is then up to the decoding step to filter the information provided by the extraction step to retrieve the payload.

The first step in retrieving watermarks is to locate them. To that end, some container types provide registration. For example, the code-section watermark described in connection with FIG. 16 can be located by searching for the sequence of opcodes: mov, add, xor, . . . , with suitable gaps to account for the variable-size content slots. The sequence is large enough that it does not occur otherwise in the executables that were examined in connection with the work set forth herein.

In addition, some content types provide registration. For example, signature-carrying content also provides registration. A pointer can be slid over the watermarked file byte-by-byte. For each position of the pointer, the data can be interpreted as the watermark; however, the payload is accepted only if the signature is consistent with the salt. This technique was illustrated in connection with FIGS. 10 and 13.

A general strategy to locate watermarks is to iterate over all container types. If a container type provides registration, the registration provided by the content, if any, can be ignored or used to filter out false hits. If the container does not provide registration, it should hold only those content types that do. In this case, the detector iterates over the potential content types for the given container type, and for each content type, uses the content-specific registration mechanism to detect the marks.

If the registration involves searching for a fixed pattern, we call it fixed registration, otherwise we call it variable registration. At retrieval, fixed registration involves pattern matching while variable registration involves applying a generic boolean function to a block of data. In the examples above, the code-section container provides fixed registration and the signature-carrying content provides variable registration. However, some content types may provide fixed registration as well. Fixed registration is simpler to implement and search for, but is more prone to correlation and generalization attacks.

A false watermark might occur because of accidental registration or malicious corruption. Accidental registration occurs when the registration is present naturally in the unprimed program. Malicious corruption occurs when an attacker discovers a watermark and is able to forge a valid watermark with different content.

The vulnerability of a registration technique to accidental registration may be measured as the probability p that a random block of data will pass it. For signature-carrying content with an s-bit signature, p is $\frac{1}{2^s}$ (the probability that a decrypted s-bit value will match another s-bit value). If a file contains n bytes of random data, the expected number of accidental matches in the file is np. For a one megabyte file and a 32-bit signature, this number is $\frac{1}{2^{12}}$. Even so, both fixed and variable registration can be tested against a stamped executable to detect accidental matches in advance. In both cases, the registration can be tuned to avoid them; e.g., the key used to encrypt the signature can be changed.

The presence of many watermarks in a file can be used to filter out false watermarks. The retrieval procedure can report the payload, the container type, the content type, and the count of copies found. If different payloads are found, the payloads with relatively small counts are likely to be false and can be rejected. Another criterion is the number of different container types bearing the same payload. When attackers discover one container type, they are more likely to discover all instances of that container type; so payloads appearing in only a small number of container types are more likely to be maliciously corrupted.

Yet another approach to locating watermarks is to keep a list of the locations at which the watermarks are stored. The detector locates the marks by consulting the list. This is a kind of "original-based" watermarking, in that information about the original program, or at least the watermarked parts of it, is used for reading the watermark. An advantage of this technique is that it does not require the addition of explicit registration information to the program.

Figure 22:
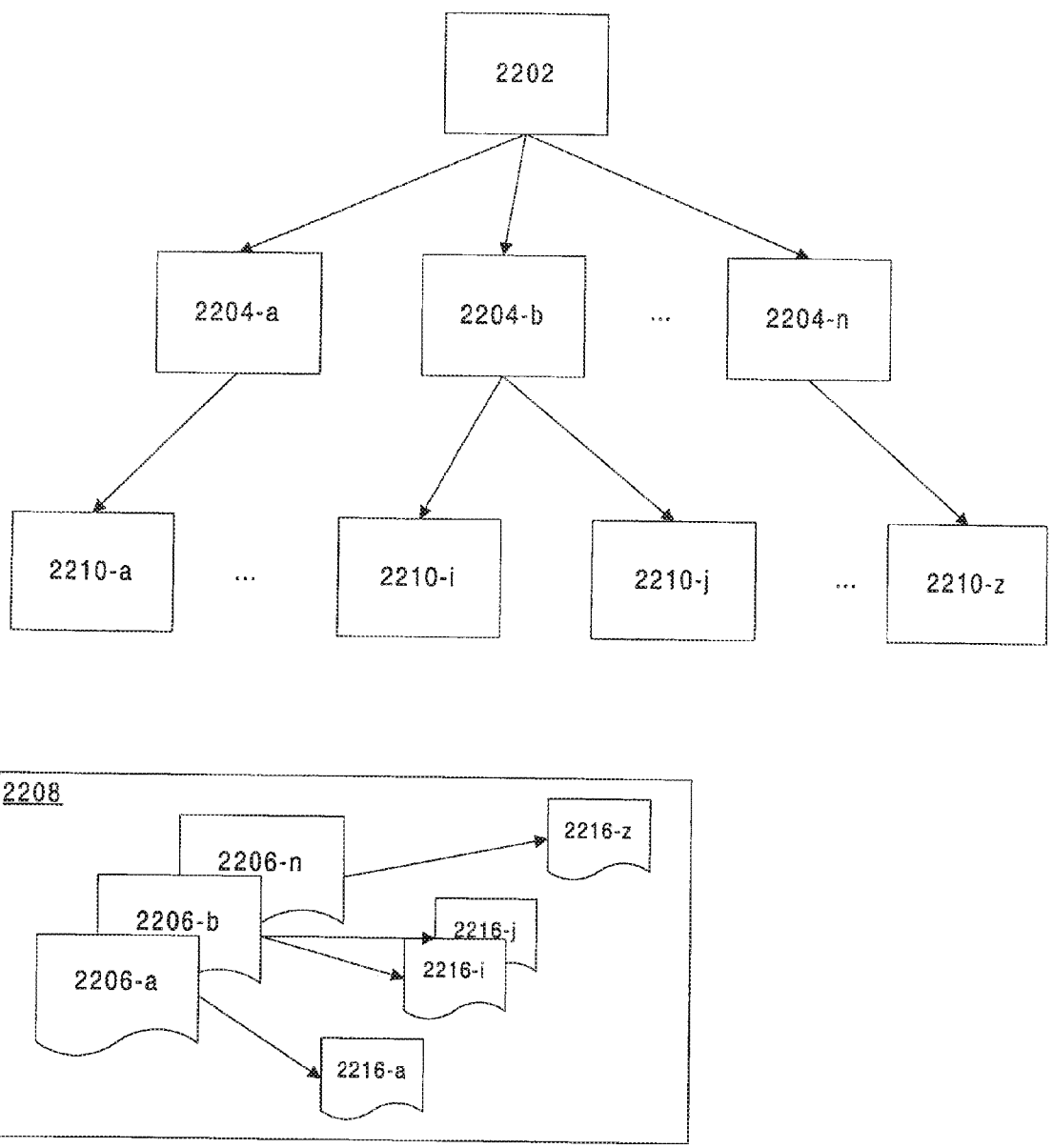
FIG. 22 illustrates an original-based watermarking scheme in accordance with an embodiment of the present invention.

FIG. 22 illustrates the use of this technique. Referring to FIG. 22, a program 2202 is customized, resulting in many different versions 2204. Program versions 2204 may differ in a variety of ways, as described elsewhere herein. In particular, the program versions will typically reserve a different location or set of locations at which to store an instance-specific watermark. When each version 2204 is created, a list 2206 is also created indicating where the watermark is (or will be) stored. For example, the list might include the address of the watermark and the 8-bytes preceding that location (the "prefix") and the 8-bytes following that location (the "suffix"), although it will be appreciated that values other than 8 bytes could be used. The list might also contain information on how to combine the watermark fragments found at those locations and/or other contextual information about these locations to help in retrieving the watermark even if the addressing has been modified. The list 2206 for each version is saved in a database 2208.

Copies of each version are then distributed to consumers or other users. Each copy is individually watermarked with a unique value, or with unique information regarding the details of the transaction. List 2206 for each version of the program is also preferably associated with another list that contains the values of the watermarks that were actually inserted at the specified locations in each instance 2210 of that version 2204 of program 2202.

In one embodiment, a set of uniquely watermarked instances 2210 are created before the program is distributed. When a user purchases a copy of the program, the user is provided with a randomly selected instance from a randomly-selected version of the program. The identity of the instance (e.g., the value of its watermark) is maintained in a list, together with information regarding the consumer's identity and/or other details about the transaction. In other embodiments, the program instance is uniquely marked at the time of distribution. For example, upon receiving a request for a copy of the program, an instance-specific watermark can be inserted into a copy of a randomly-selected version of the program, the instance-specific watermark containing encoded information about the purchaser and/or the details of the transaction.

When a watermark needs to be recovered—for example, when it is discovered that a copy of the program is being distributed without the creator's permission—the suspect program is matched, in turn, against each of the lists in the database to determine where the stamped primers are located. Once a matching list is found, the watermark is extracted from the stamped primers, and the purchaser of that copy of the program is identified.

Figure 23:
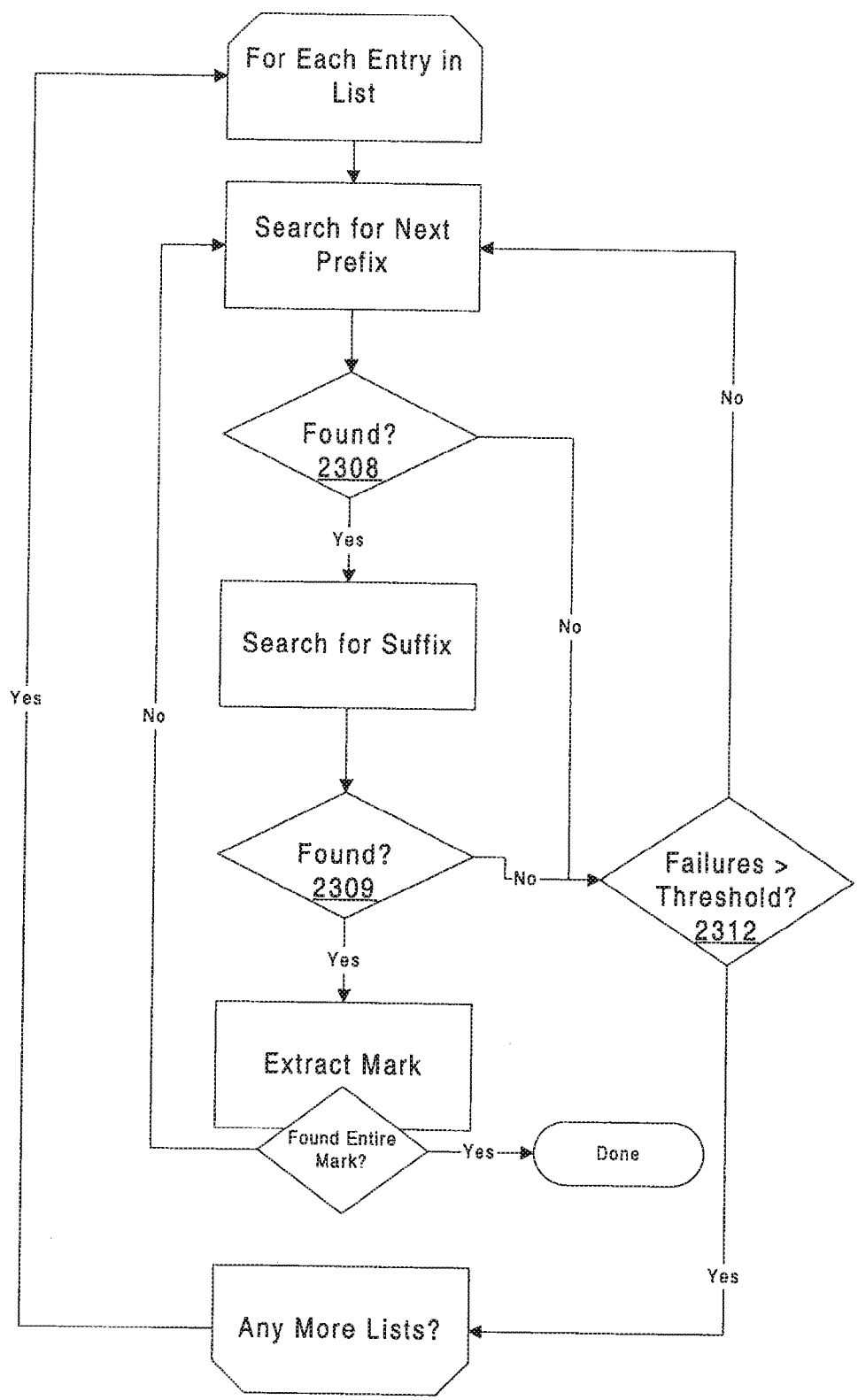
FIG. 23 illustrates a technique for retrieving watermarks in accordance with an embodiment of the present invention.

A method for comparing the suspect binary to the lists in one illustrative embodiment of the present invention is shown in FIG. 23. Referring to FIG. 23, the lists are searched successively until the appropriate list is located. As shown in FIG. 23, starting with the first list, the program is checked for the eight-byte prefix of the first entry in the list. This can be accomplished by looking at the address specified in the list, or simply by performing a string search on the file. If the eight-byte prefix is found (i.e., a "yes" exit from block 2308) and the eight-byte suffix is found (i.e., a "yes" exit from block 2309), then the mark is extracted from the specified location, and a search is performed for the next eight-byte prefix in the list. If, on the other hand, the appropriate eight-byte prefix (or eight-byte suffix) is not found (i.e., a "no" exit from block 2308 or block 2309), then a determination is made as to whether to move on to the next list in the database, or to continue checking for the mark in the current list (block 2312). For example, a counter can be maintained indicating the number of failed searches for a prefix or suffix in the list under consideration. If the failure count exceeds a certain level, processing can move on to the next list in the database (i.e., a "yes" exit from block 2312). Otherwise, processing of the current list continues. To avoid discarding a list for which a large number of matches have been obtained, the failure counter might be decremented each time a successful prefix/suffix match is obtained. Although FIG. 23 illustrates one scheme for searching the database of lists, it will be appreciated that there are a wide variety of ways to search the list database, any suitable one of which could be used without departing from the principles of the present invention. Once each of the individual marks have been extracted, they can be assembled and decoded if necessary to obtain the original watermark payload, which may, for example, identify the particular instance of the program and/or provide other information. If there were a million lists in the database, it would, on average, be necessary to examine approximately 500,000 lists to find a match. However, it will generally be safe to discard most lists after only a few comparisons, since it will typically be unlikely that more than few consecutive prefixes and suffixes found in an incorrect list will occur in the program that is being examined. Thus, it will typically be possible to search even a million lists fairly rapidly. To speed up the search time, all of the 8-byte patterns in the suspect program can be identified and indexed, thus making it very quick to search for any particular one.

The search technique described above will work best on programs that are largely undamaged. If a damaged program or program fragment is encountered, it may be desirable to search the list database in a slightly different manner. For example, if only a fragment of the program is recovered, the database can be searched for the list that includes the largest fraction of matching prefix and suffix strings. This can be done by searching the program fragment for each entry of each list (which could be relatively time-consuming if there are many lists) and choosing the list for which the most matches are found.

Another approach is to build an additional data structure for each list, the data structure containing the fifty least-frequent prefix and suffix strings in the list (or simply fifty randomly-chosen prefix/suffix strings). Only a few primer lists would have non-negligible scores. Each 8-byte primer prefix/suffix pattern should be more or less random, and thus has almost no chance of appearing in the binary. If they were truly random, the odds would be about one in $2^{43}$ ($10^{13}$). Although it will be understood that they will typically not actually be random, as they represent instructions, addresses, and constants that are not particularly random, still, experiments suggest that the vast majority of 8-byte patterns in any particular executable appear only once, and that those patterns do not appear in other executables.

Thus, for example, if all the primer lists that have three or more matches are selected (five matches would be expected to occur in 10% of the suspect binary), it is unlikely that there will be very many—most likely under 1000. The same matching can then be performed against the full set of prefix/suffix patterns in those, e.g., 1000 primer lists. Having found the primer locations, we can then extract the watermark from the stamped primers and decode it—which may still be possible if the mark is encoded using redundancy and other error correction techniques. Or, if the mark itself were stored in the list. Identification of the version, and the extent to which the recovered watermarked fragments matched the stored mark, would allow a confidence interval to be constructed indicating the level of certainty that the recovered instance actually corresponds to the list stored in the database. If the database were maintained by a neutral, trusted third party (i.e., by an entity other than the program's owner), evidence of the similarity between the recovered program and the original instance could be used in identifying and prosecuting the person or entity responsible for distributing or modifying the program without the owner's permission.

For this two-pass statistical analysis, it is not necessary to use the relative location information about the primers, although in one embodiment it can be used as a confirmatory factor.

This model assumes that attacks do not involve further use of sophisticated binary modification tools. For example, rearranging the basic blocks a second time would almost certainly eliminate many of the patterns in the binary. However, such attacks are unlikely if obfuscations such as those described elsewhere in this document have been applied, as they will likely cause such tools to operate poorly, if at all, and when modifying binaries even a small error produces unusable output. Even if an attacker successfully rewrites the binary, unless he does so in a way that explicitly eliminates all of the watermarks, more advanced techniques (e.g., correlation) can be used to recover watermark data given a statistical understanding of the watermark alphabet.

Thus, an original-based watermarking scheme such as that described above may give the owner an added advantage over the attacker, since the owner knows where the marks are supposed to be and the attacker does not. The locations of the marks need not be embedded in the code, but can be stored separately. A disadvantage of such a scheme is its lack of generality; reading of marks is generally not possible on arbitrary code, only on code for which the appropriate data are available. This is not necessarily a disadvantage when there are only a few versions of the program, but with large-scale customization, the database overhead may become significant. Another potential disadvantage of this scheme is that managing all of the lists—especially for a program that is widely distributed—can be relatively cumbersome. However, as shown below, these costs will typically be manageable.

The following example provides some indication of the upper bound on the storage requirements and cost of an original-based watermarking scheme such as the one discussed above. Assume that for each program 2202 (i.e., release), ten thousand distinct versions 2204 are created through binary modification. As shown elsewhere herein, ten thousand versions is probably more than enough to deter plausible collusive attacks. The time taken to generate this many versions can be reduced by performing the customizations automatically and/or in parallel using a batch mode. Also assume that over a period of five years, there are one hundred different releases, each of which has ten thousand different versions. Thus, after five years, there will potentially be instances of one million distinct versions in the field.

Assume that each version reserves space for a ten kilobyte watermark—as might be the case if a particularly collusion-resistant and damage-tolerant mark were desired. If the watermark is divided into ten thousand, one-byte components, each of which is embedded in a separate location, then the list for each version of the program may include ten thousand entries, one for each component of the watermark. The list might also contain a copy of the eight bytes before the marked location, a copy of the eight bytes after the location, and a relative two byte offset to the next location. Thus, each entry in the list may consist of approximately 18-20 bytes of information. Since the list has 10,000 entries, storage for each version's list would be approximately 200 kilobytes.

Thus, over five years, one million of those 200 kilobyte lists—or 200 gigabytes—would be generated. Assuming a storage cost of five dollars per gigabyte (which will probably decrease over the five year period), the one million lists could be stored for approximately $1000. It may also be desirable to keep copies of each of the one hundred program releases and the customization parameters for each of the 1,000,000 versions, but this would be relatively small in comparison. Even if an entire copy of each of the 1,000,000 versions were maintained, the memory requirements—assuming a five megabyte program—would be approximately 5000 gigabytes.

5. Dynamic Watermarks

In contrast to static watermarks, such as those described above, which can be detected by analyzing the static image of the program, dynamic watermarks can be detected only (or most-easily) by analyzing the executable as it is running. For example, the program may produce a special output when presented with a special input, the special output serving as the watermark. Dynamic watermarking techniques are related to software "Easter Eggs," which typically consist of humorous or unexpected information or behavior embedded in a program and accessible only by entering a very specific, and typically unusual, sequence of keystrokes or other commands. For example, Microsoft® Excel 97 contains an Easter Egg that can be found by opening a new worksheet, pressing the F5 key, typing X97:L97, pressing the enter (or return) key, pressing the tab key, then holding down the CTRL and SHIFT keys while using a mouse to click on the "Chart Wizard" icon on the program's toolbar. Upon completion of this input sequence, a primitive flight simulator is displayed. Located within the flight simulator is a sign showing a variety of messages and the names of the program's creators. Additional information on Easter Eggs can be found at http://www.eeggs.com.

Dynamic watermarks can be inserted in a variety of ways and can take a variety of forms. For example, in addition to marks that vary the program's output when presented with a special input, dynamic watermarks may also be encoded in, e.g., variations in the program's run-time performance, variations in the program's memory access characteristics, variations in the program's caching behavior, variations in the program's dynamic control flow, and/or other program characteristics.

For example, subtle changes could be made to the program's internal processing logic so that results would be invariant for "legal" or "expected" inputs, but would differ for special inputs or input sequences. It should also be noted that dynamic watermarking is a good candidate for combination with obfuscation, since obfuscation may include highly complicated calculations designed to make it difficult to determine what is going on. Minor changes in those calculations might have no effect on ordinary user-visible processing, yet cause differences when specific sequences are input into the program.

It will be appreciated that enabling a program to produce a special output or other dynamic watermark will typically entail making some changes to the static image of the program, and thus it would theoretically be possible to detect a "dynamic" watermark by analyzing the static program image. However, the idea behind dynamic watermarking techniques is that recovering the mark via static analysis can be made quite difficult, whereas detecting the mark with the special input can be quite simple. Thus, dynamic watermarking techniques make good candidates for use with in-the-field and/or real-time detection systems. The detection system will preferably record the special input in a protected and/or tamper-resistant environment, and can check for the presence of the watermark by applying the special input to the program and examining the program's response.

As mentioned, one possible dynamic watermarking technique is to design a program so that it reveals a watermark when presented with a special input. An advantage of this approach is that virtually any functionality-preserving transformation (e.g., basic-block reorganization) used by attackers will also preserve the watermark. Another advantage is that it may be much more difficult to detect the existence of a watermark that is not stored statically in the program.

Detection of the code that creates the watermark can be made quite difficult, especially if the code is obfuscated, since the program may include a number of code segments that perform complicated operations, some of which hide predicates, others of which generate a watermark. Since much or most of the precision of some obfuscated operations may be "wasted," there will often be ample room for instance-based customization. For example, the program might calculate a multi-bit variable and then base an operation, such as a jump, on whether the variable is odd or even.

The strength of this type of watermarking technique can be increased by spreading the effects of the watermarking code beyond the generation of the watermark. For example, in the illustration given above, one instance of the program might check an obscure value to see if it is even and condition a jump on the result, as described above; while a second instance may condition the jump on the value being odd. Thus, in the first program instance the watermark is detected if the value is even, while in the second instance the watermark is detected if the value is odd. This would make it more difficult to strip out the watermark and would also make it more difficult to replace one watermark with another. Cleverly embedding the watermark deeply into the program can make it virtually impossible to remove, particularly since the watermark consists of a relationship between a particular input and a particular output, and the attacker will typically not know which input is used.

Dynamic watermarking generally requires a detailed understanding of the program's functionality, and is best carried out at the source-code level. As such, it is typically not feasible to dynamically watermark generic third-party software, since such software will usually be obtained in executable or object code form. However, it is typically unnecessary to hardwire the watermark in the source code and build it separately for different copies. The source-code can create some primed data structures in the image, which can subsequently be stamped to create the specific watermark.

6. Priming and Stamping

A variety of advantageous locations have been described in which to insert watermarks, and it will be appreciated that watermarks can be inserted into these locations using any suitable technique, including conventional watermarking and software editing techniques. A problem with conventional watermarking techniques, however, is that they often require significant computational power, time, and/or memory. This can be particularly unsatisfactory if one wishes to place a unique watermark or fingerprint in individual instances of a piece of software or other content, or if one wishes to delegate the responsibility for inserting such a watermark to another party.

The present invention provides systems and methods for reducing the computational resources needed to apply watermarks, and for facilitating more flexible relationships between the parties responsible for inserting watermarks into a given medium. Specifically, in one embodiment watermarks are inserted using a novel, hinted watermarking process that will, for convenience, be referred to as "priming and stamping." Marks are inserted into the substrate in two stages. In the first stage, known as "priming," parameterized holders are created and/or identified. During the second stage, known as "stamping," marks are written into the "primed" holders.

Priming and stamping can be used to minimize the impact that watermarking individual program instances has on program development and debugging. For example, in one embodiment the source code need not be recompiled for differently watermarked copies; instead, the program can be primed before compilation and different marks can then be stamped into different copies of the compiled program, which will typically take much less time than compiling differently-watermarked versions separately. In addition, priming and stamping can be performed without the aid of special tools for analyzing or instrumenting executables, and typically does not require the rearrangement of compiled code.

The priming and stamping process is described in more detail with reference to FIGS. 24 and 25. As mentioned above, priming and stamping splits the watermark insertion process conceptually into two general phases. In principle, virtually any watermarking algorithm can be split into multiple phases using standard algorithm manipulation techniques. However, it will generally be more efficient to use algorithms specifically designed to be split.

Figure 24:
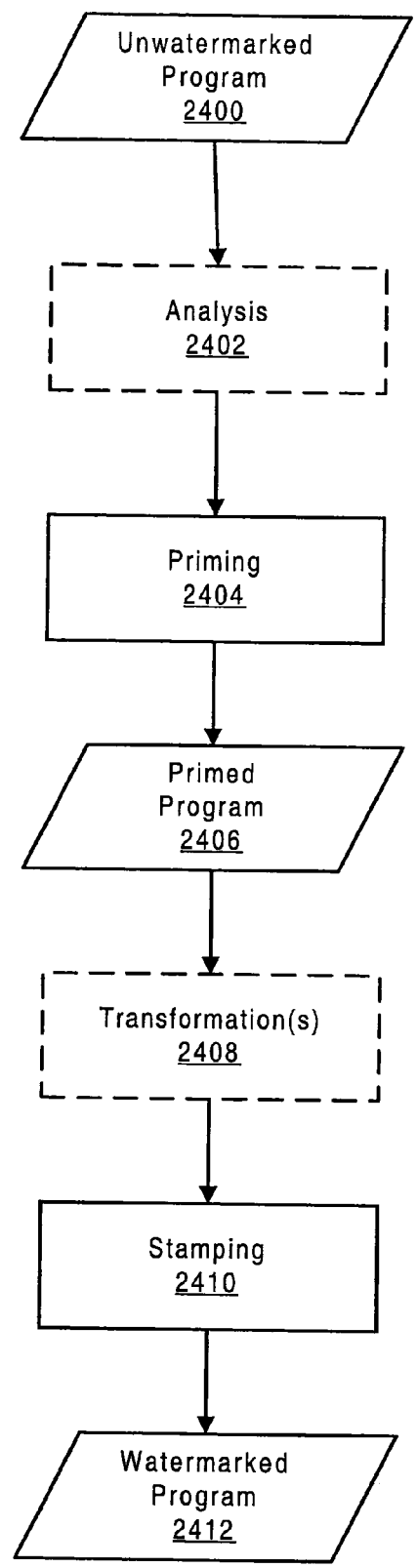
FIG. 24 is a flow chart illustrating a watermark insertion technique in accordance with an embodiment of the present invention.

As shown in FIG. 24, in the first phase, preferably performed once per program, the unwatermarked program 2400 is primed (2404) by inserting code that is operable to create space and/or a framework for inserting marks. As shown in FIG. 24, priming step 2404 may be preceded by an optional analysis step 2402, in which a determination is made as to how and where marks can be embedded. Analysis step 2402 may, for example, consist of determining whether the insertion of a watermark into a particular area of the program would adversely affect the program's performance, as might be the case if a lengthy executable watermark were added to a frequently-executed loop.

In the second phase, the watermark payload is embedded in the program using the hints (or primers) that were inserted by priming step 2404. That is, primed program 2406 is stamped (2410) by replacing the primers with customized watermark data. As shown in FIG. 24, in some embodiments primed program 2406 may undergo one or more transformations 2408 prior to stamping 2410. For example, if primed program 2406 is in source code form, transformation 2408 may include compiling the source code into object code form. Or, if primed program 2406 is already in object code form, transformation 2408 may include linking the object code to form an executable. The primers inserted in priming step 2404 are preferably able to withstand such transformations, or to react to such transformations in a predictable manner, such that stamping step 2410 can locate the primers and apply the appropriate stamps.

Figure 25:
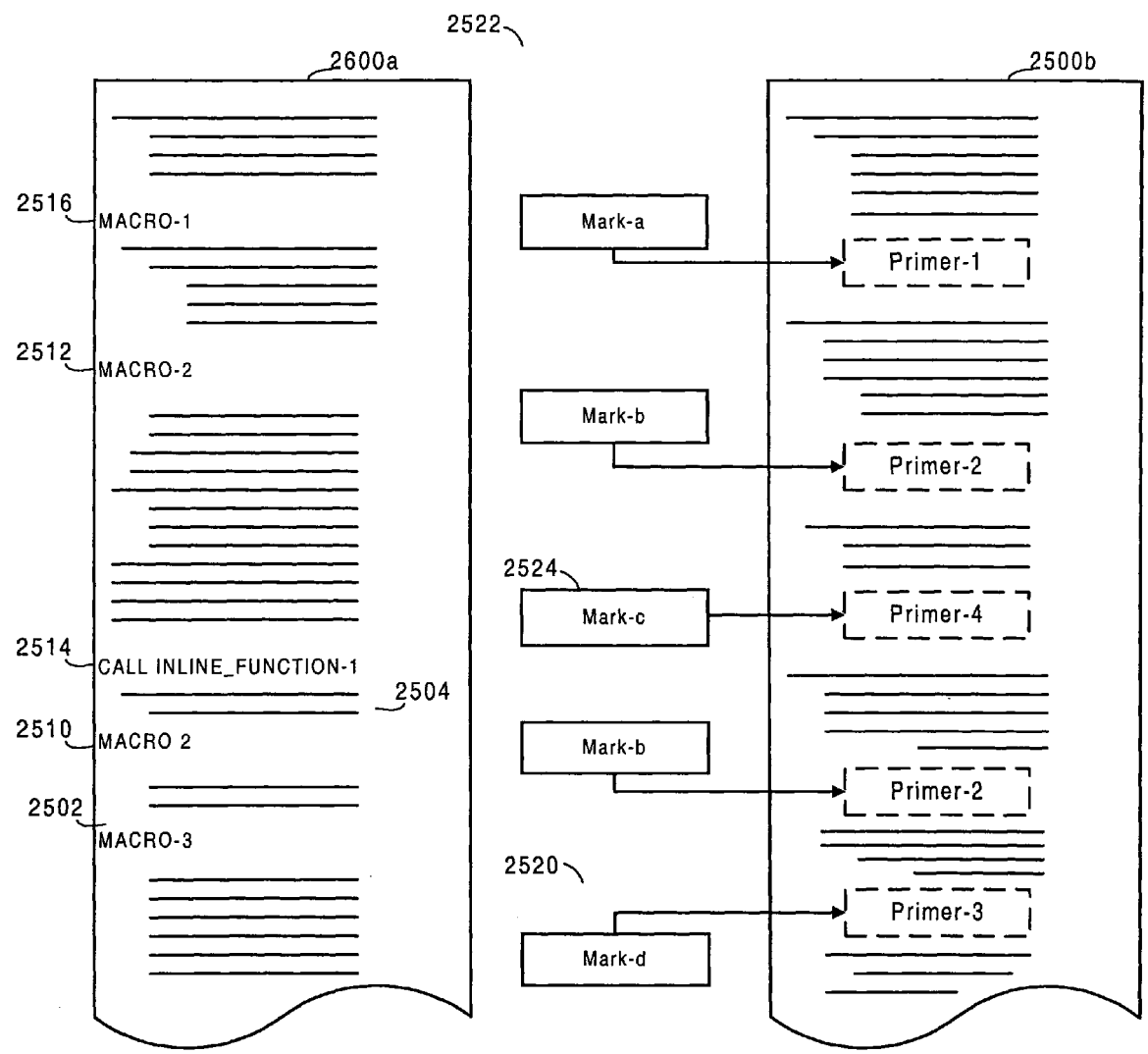
FIG. 25 further illustrates the watermark insertion technique shown in FIG. 24.

FIG. 25 illustrates the priming and stamping process in further detail. Referring to FIG. 25, one effective technique for inserting primers into a program is by using a collection of macros and/or inlined functions. The macros and inlined functions can be called in a number of locations throughout the program. When an executable is created, a standard preprocessor and/or compiler will expand the macros or insert the function code into the program at each location at which the macro or inlined function was referenced. Thus, the macros and inlined functions can be transparently inserted into the source code without substantially changing the semantics of the code and without requiring the programmer to know much, if anything, about the macro's and/or function's implementation. Although some knowledge of the system structure may be needed to insert the macros optimally—for example, placing lengthy macros in frequently-executed code may negatively affect the program's performance—sufficient knowledge to perform adequate placement can generally be obtained empirically using well-know code analysis tools and techniques.

As shown in FIG. 25, after compilation and preferably after any other customizations have been made to the program, a binary image postprocessor can be used to find the primers 2504 created by macros 2502 and inlined functions 2503 in the binary image 2500*b* of program 2500*a*. The desired marks 2506 can then be inserted into the binary image at the locations reserved by the primers.

It will be appreciated that primers can be inserted into the program in any suitable manner. While a combination of macros and inlined functions were used in FIG. 25, in other embodiments, other techniques are used. For example, the code for creating the primer could, instead, be inserted directly into the program. In a preferred embodiment, the macros and inlined functions are relatively stealthy (e.g., they blend into the program). The Markov modeling and other statistical analysis techniques described elsewhere herein can be used for this purpose. It should be appreciated, however, that the macros and inlined functions that are used can take any suitable form.

It will typically be desirable to use a library of several macros and/or inlined functions, since if one copy of the code is discovered it might be possible to discover other copies inserted using the same macro or inlined function. One general category of containers embeds its content in the data section of the executable, and another general category embeds its content in the code section. For example, the following would insert its content in the data section, whereas the inlined functions would insert its content in the code section.

```
#define InsertWatermarkPrimer1( )
{static int X[N] = {PRIMER0, PRIMER1, ... };
```

In a preferred embodiment data section primers are implemented as macros rather than inlined functions, since different invocations of a macro result in separate static variables, while different invocations of an inlined function share a single static variable. Thus, a macro creates multiple copies of the primers, while the inlined function does not. It should also be noted that since the macro is enclosed in a block, it will not cause collision of variable names with the containing block. It may also be inserted multiple times within the containing block without fear of redefining names.

If primers are inserted using macros and/or inlined functions, it will typically be desirable to ensure that the preprocessor and/or compiler inserts enough copies of the macros and/or functions to provide adequate space for storing the marks during stamping. The appropriate number for a given application can be readily determined by simple trial and error experimentation.

In one embodiment the priming process also involves the insertion of source code to hold the watermark and to hide the "uselessness" of the watermark to the overall execution of the program. This code can be thought of as a "container" for the watermark. In general, a watermark container may hold its content in a sequence of possibly non-adjacent slots. At compilation, the content of the container is set to a special predefined pattern (i.e., the primer), which helps locate the watermark container for stamping.

Watermarks inserted in this manner may have two parts: (i) modifiable content, which is stamped with customized data; and (ii) a fixed container which is set at priming and preferably not modified during stamping. The container serves to blend the marks into the program. It may also provide registration information for locating the marks.

The primer pattern that is initially filled into the watermark holder is used to identify the locations to stamp. The pattern is preferably long enough (e.g., at least 32 bits) that it is simple to find primers that do not occur naturally in the software. It will typically be important to ensure that the pattern used to locate the watermark holders does not result in false matches, since unintended stamping can corrupt the software. One technique for protecting against unintended stamping is to count the number of primers that were found, which should match the number that were originally inserted.

The pattern constituting the container may be used to locate the primer with greater reliability. For example, in the context of a code-section watermark, we look for the primer slots as well as the intervening opcodes in the container. An extension of this approach is to remember the locations where the primer can be found. The location information can be used to speed up the stamping procedure by avoiding (or reducing) the need for pattern matching.

6.1. When?

One of the powerful aspects of priming and stamping is that it enables operations performed at the source-code level (e.g., the insertion of inlined functions or macros) to hint the assembly code, thus enabling the entity in charge of stamping the code to quickly and easily find the locations that can be stamped and apply the watermark thereto. Thus, priming and stamping allows the watermarking process to be conveniently divided between several parties over a period of time.

The priming and stamping steps can be performed in variety of ways and at a variety of different times during a program's creation. For example, priming can be performed at the source code level, during compilation, and/or after compilation. In one embodiment the source code is primed with assembly language patterns and compiled. The patterns can be found in the object code or executable by performing byte-level pattern matching. In another embodiment the compiler itself can be modified to identify resources (i.e., prime the program) and/or to generate differently-stamped copies. Such a technique is able to generate highly stealthy marks (e.g., register re-allocation or placement of variables), although the insertion process can be relatively slow. In yet another embodiment the code is primed after compilation, but before linking. The code can then be linked and/or distributed to others and primed. Another option is to modify a standard linker to perform priming and/or stamping. In yet another embodiment, the program is primed and stamped in executable form (i.e., after the linking process).

Like priming, stamping can be performed in a variety of ways. For example, in one embodiment individual copies of a program are stamped with a unique watermark prior to distribution. Alternatively, or in addition, program copies can be stamped as part of the process of activating or installing the program on a user's computer. For example, the user could be prompted to connect via a network to a computer that supplies the stamps to a protected processing application on the user's computer that would apply them to the program. Although stamping could be performed in an obfuscated and/or protected environment on the user's computer to prevent giving away the location of the watermarks, stamping at the user's computer may be somewhat less secure than stamping the program before distribution to the user, as the user will initially have an unstamped version of the program (or at least portions thereof). However, this may not be a great concern in some applications.

Figure 26:
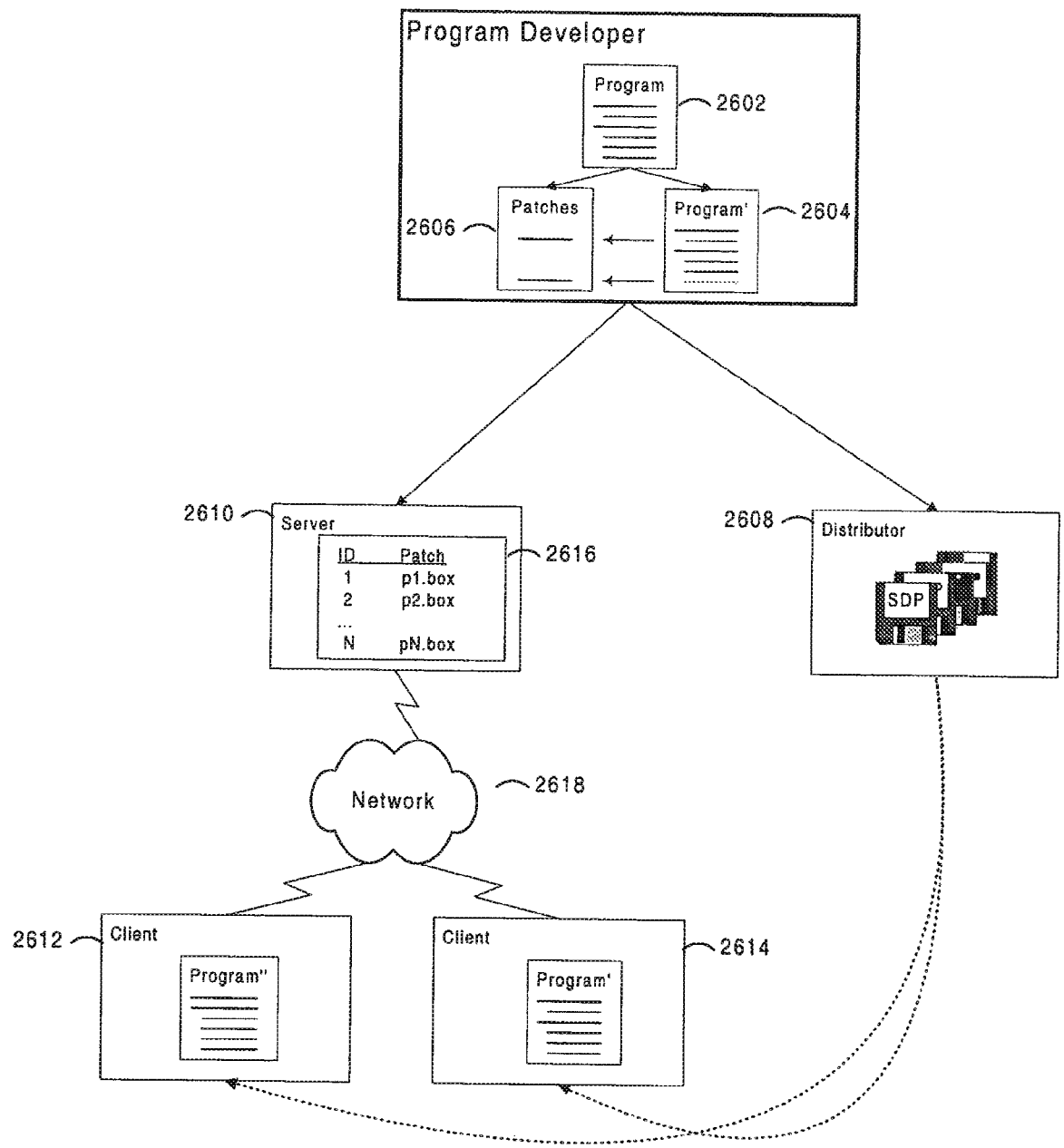
FIG. 26 illustrates a system and method for applying one or more watermarks to a program in accordance with one embodiment of the present invention.
Figure 27:
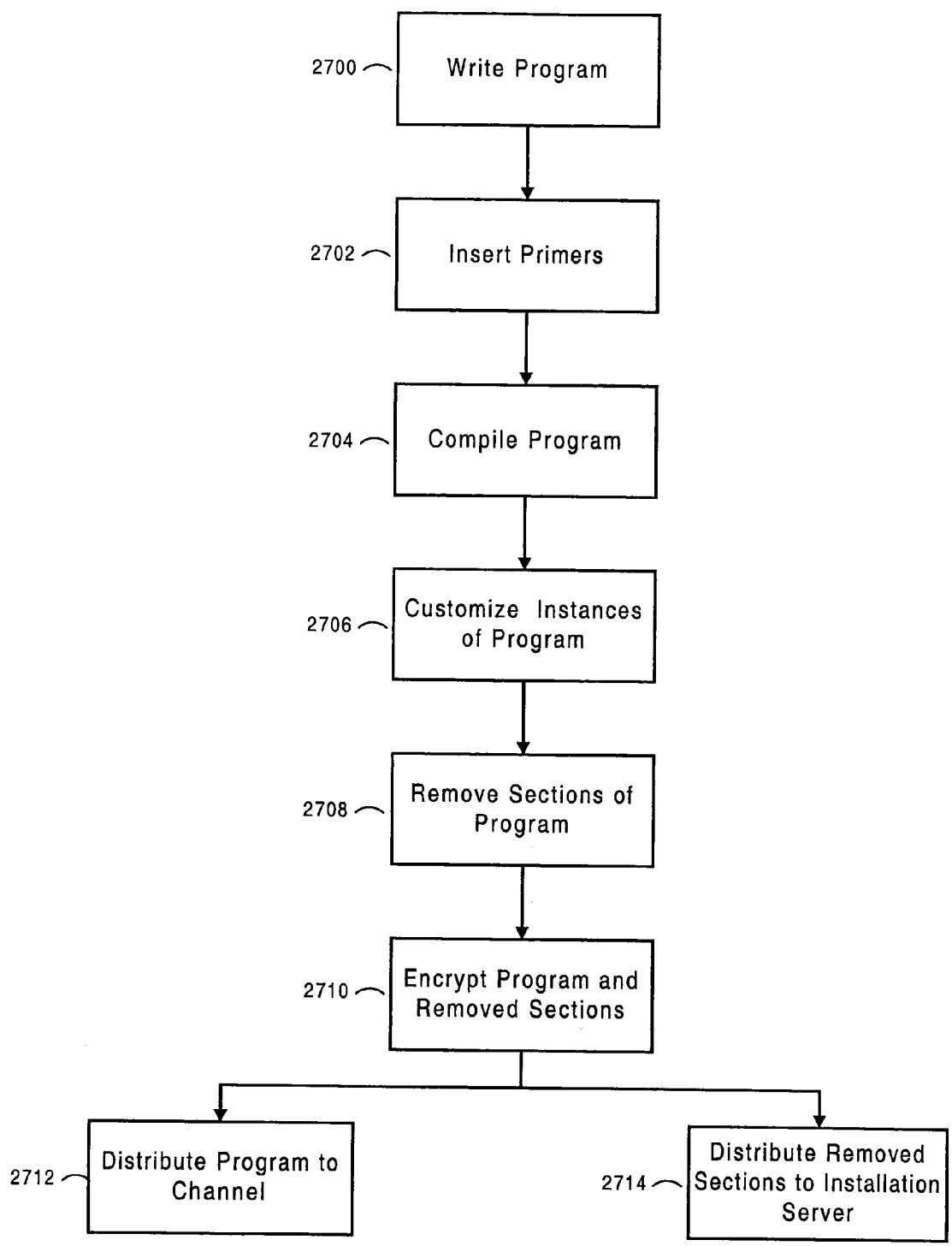
FIG. 27 is a flow chart of a method for applying one or more watermarks to a program in accordance with one embodiment of the present invention.

FIGS. 26 and 27 illustrate one such technique. As shown in FIG. 27, after a program has been written (2700), the program's code is primed or marked (2702). Priming can be done at the source code level, although it should be appreciated that priming could alternatively (or additionally) occur at the object or binary code level. In one embodiment, multiple primers are inserted into the code, each primer being chosen from a predefined set of distinct types (e.g., 10 distinct types). For example, in one embodiment 500 primers of 40 bytes each (on average) are inserted into a 1 megabyte program. It will be recognized that the optimum placement of the primers within the program, as well as the optimum number (and size) of primers to use, will depend on the particular application.

After compilation (2704), the program executable can be customized (e.g., obfuscated), taking care to preserve the primers (2706). To facilitate this process, the positions of the primers can be made known to the customization tool, so that it can avoid altering them. This can be accomplished in a variety of ways. For example, the customization tool can access the primer reading tool directly (e.g., through DLL calls), and/or the primers can be marked with signal flags indicating that a particular section of code is not to be customized. In another embodiment, a primer reading tool is used to generate a file that provides the locations of the primers, and this file is provided to the customization tool. In yet another embodiment some or all of the primers are simply inserted after customization.

After customization, in one embodiment each instance of the program is given credentials. This can be accomplished, for example, by computing one or more hash values (using a suitable hashing algorithm, such as MD5 or SHA-1) for one or more program locations, preferably not including the primed regions. As shown in FIG. 26, after the credentialing step, each customized, primed instance of the program can be split into a relatively large part 2604 consisting of most of the executable program, and a smaller part 2606 containing the watermarks or primed locations and/or other security-related code (and an indication of where smaller part 2606 belongs in code 2604) (2708). Code 2604 can contain length preserving holes where the remaining code (e.g., code 2606) would go. In one illustrative embodiment most or all of these holes are filled with NOPs to add stealth. In another embodiment the holes are removed, thus effectively disabling code 2604 due to addressing misalignment.

Code 2604 may be encrypted, packaged, and sent to customers 2612, 2614 and/or distribution centers 2608 (2710, 2712). The appropriate patches 2606 for each customized instance of the program 2604 are stored at a server 2610 in a list 2616 (2714). Thus, when a customer installs program 2604, the appropriate patches 2606 can be supplied by server 2610. For example, as shown in FIG. 26, at installation a customer 2612 contacts server 2610 via a network 2618 such as the Internet. Customer 2612 supplies information regarding the identity (e.g., credentials) of the customized version of the program that the customer received in the installation package. Server 2610 retrieves the corresponding patches 2606, watermarks them (e.g., if they were not already watermarked), compresses and encrypts them (using, e.g., DES or any other suitable encryption technique), and transmits them to the customer. The customer's system decrypts and decompresses the program and the patches and merges them to form a functioning watermarked program. In a preferred embodiment, the decryption and decompression occur incrementally and concurrently.

In another embodiment, the patches 2606 can be stored on, e.g., the disk on which program 2604 is stored, and the installation program can apply the appropriate patches. It will be recognized that if patch files are distributed from a server 2610, there will be a tradeoff between security and ease of installation. On the one hand, patch files should be relatively small in order to limit the communication overhead of transmitting them from the server to the client. On the other hand, better security can generally be achieved if the patch files include decoy blocks that contain no watermarks, or if the patch files include random intervals around the watermarks to mask the watermarks' exact locations.

Additional description of priming and stamping can be found in the Software Self-Defense application.

7. Combinations of Techniques

It will be appreciated that the watermarking techniques described herein can be advantageously used in combination with each other and/or with the obfuscation, tamper resistance, and other software self-defense techniques described in the Software Self-Defense application and the '346 application. For example, as previously described, obfuscation mechanisms such as opaque predicates can be used to help disguise watermarks that are hidden in unexecuted code or unused data.

Obfuscation techniques can also be used to provide the watermarks themselves. If the program is obfuscated, e.g., in the manner described in the Software Self-Defense application, the pseudo-random nature of the obfuscation techniques will permit information to be embedded in the binary program by adjusting the choices made during the obfuscation process. That is, each choice of whether to apply obfuscation or not represents a bit of information (and choices of multi-bit values represent multiple bits), and the resulting program contains the encoding of all those bits. Recognizing such encodings can be difficult, in that it requires (at worst) a catalog of all the generated watermarked versions to compare against individually (or the ability to re-generate such a catalog at will). However, signature recognition and other pattern-matching techniques can substantially reduce the computational burden of recognizing such mark encodings even in the face of significant damage to the marked version.

8. Protection of Watermarks

A variety of techniques can be used to protect watermarks from detection and removal. In addition to those techniques described previously, many of the software self defense techniques described in the Software Self-Defense application can be advantageously used for this purpose.

8.1. Self-Checking

One method of protecting watermarks from corruption or removal is to include code that performs self-validation at run time. For example, code can be inserted that computes the hash of a region of memory at run time, compares the computed hash value with an expected value, and invokes a tamper response mechanism if the two do not match. The self-validation test need not be focused solely on the watermarks, but can instead test a wide range of memory that includes one or more watermarks or portions thereof. The tests are preferably stealthy and recursive, such that tampering with one test is likely to cause another test to fail. Additional self-validation techniques are described in the Software Self-Defense application.

8.2. Obfuscation

Software obfuscation techniques such as those described in the Software Self-Defense application and the '346 application can also be used to protect watermarks from detection or removal. In addition to using specific obfuscation techniques and constructs directly in connection with encoding and embedding watermarks in a piece of software, the general application of obfuscation techniques will typically also help to protect the watermarks contained in the program, as the more difficult the program is to understand, the more difficult it will be for an attacker to identify the watermarks.

In addition, and as described elsewhere herein, obfuscation techniques can be specifically used to protect watermarks and/or to obscure their relation to the program. For example, obfuscation techniques such as opaque predicates can be used to make watermarks appear as though they affect the program's behavior, thus reducing the chances that an attacker will discover the watermarks by searching for useless code or data.

An example of an opaque predicate is a function or expression that always evaluates to a particular value or values— e.g., true or false—regardless of its input, but is coded such that it is difficult to deduce this. Such a function can thus be used in, e.g., a code branch to make it look like certain code or data might affect the program's behavior, when in reality, the code or data are never reached due to the fact that the condition never evaluates in that direction. Additional examples of opaque predicates and their use can be found in the Software Self-Defense application, the '346 application, and in the Cohen paper, each of which was previously incorporated by reference herein.

In one embodiment, a watermark and an opaque predicate are combined into a single standardized macro or inlined function so that the opaque predicate is executed in the scope of the watermark. The standardized interface also makes it easy to interchange the opaque predicates that are used. The following is an example of such a macro interface in accordance with an embodiment of the present invention:

int OpaquePredicate(int size, int*array);

Another issue is the choice of the obfuscation code for the branch that the opaque predicate never takes. In one embodiment the obfuscation branch loops back to the opaque predicate. Note that successive calls to the opaque predicates described above differ in the values of their static variables. In a preferred embodiment, the obfuscation code is tailored to look like useful code in the host program.

```
#define InsertWatermarkPrimer1( )   {\
    static int X[5] = {PRIMER0, PRIMER1, ... };\
    while (OpaquePredicate1(5, X));\
}
```

The code rearrangement and/or other obfuscation and tamper resistance techniques described in the Software Self-Defense application also provide powerful resistance to cropping and/or deletion attacks, as these techniques generally make identification of a useful part of the program more difficult.

Relatively weak obfuscation, tamper resistance, and/or watermarking techniques can be used to decoy the operation of more effective techniques. For example, decoys can be used to lure the attacker into making program modifications that will break the program or trigger detection of the attacker's activity. For example, having detected a weak watermark or obfuscation technique, the attacker might press forward with eradicating or counteracting it, and not realize that in so doing, he has triggered other, more subtle defensive measures. For example, when removing a weak watermark, the attacker could be lured into making changes to the program binary that would cause the program to fail built-in self-checks, crash or yield incorrect results, and/or trigger communication with an external detection agent.

8.3. Customization

Customizing different instances of a watermarked program makes it harder to identify or remove the watermarks. For example, as described elsewhere herein, customization can make a collusive attack much more difficult by making randomly-picked copies difficult to compare.

Since it may be relatively expensive for a company to generate a different customized copy of a program for each customer, a probability will exist that attackers will be able to get multiple copies of the program with the same customization. However, as shown above, the probability of getting c copies with the same customization decreases steeply with c. That is, it will typically be much more difficult to obtain ten copies of a program with the same customization than it will be to obtain two copies. Thus, it will usually be sufficient to resist only a small degree of collusion. On the other hand, the space overhead of anti-collusion encodings typically increases relatively steeply with the degree of collusion to be resisted, so it will generally be desirable to assure a relatively low degree of collusion by producing a sufficiently large number of differently-customized versions.

8.4. Stealth

Watermarks can also be protected by making the marks and/or their containers blend in with the rest of the program. As described above, watermarks and/or their containers can be made stealthy by using a variety of techniques. For example, watermarks and their containers can use common opcodes, opcode sequences, operands, addressing modes, prefixes, and the like. Statistical modeling techniques can be used to further ensure that the watermarks and containers look like the rest of the code/data in the program. In addition, stealth can be provided by making watermarks and/or containers relatively small. For example, a holder could consist of a single instruction. Stealth can also be enhanced by minimizing the range of possible values used for each container, given the constraints imposed, or made desirable, by other defensive techniques, such as those used to counter forgery or collusion.

8.5. Anti-Debugging

Attackers might attempt to use a debugging tool to analyze the structure and operation of a program in an effort to locate, remove, or forge watermarks. Thus, one way to protect watermarks is to include mechanisms that detect, hinder, and/or prevent the use of debuggers. A variety of such mechanisms are described in the Software Self-Defense application, any suitable ones of which could be used.

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

APPENDIX A

Here we analyze the strength of the two-layer collusion-resistant watermarking code described above in Section 3.7.1.

The analysis that follows assumes generally that:

The bits constituting the watermark (or "fingerprint") are inserted at secret locations, such that an attacker can detect the location of a bit only by comparing copies that differ in that location;

An attacker cannot alter fingerprint bits that are undetected. (Note, however, that in practice the analysis that follows will still hold true even if an attacker alters bits randomly, as long as the fraction of undetected fingerprint bits that are altered is small).

The provider uses a private decoder to infer the identity of a colluder.

It will be appreciated; however, that while the following analysis is based on these assumptions, the practical encoding techniques to which the analysis relates can be used even if one or more of these assumptions is not met, or even if some of the conditions or "requirements" set forth below are not satisfied. While, in such a situation, the encoding scheme may not enjoy the same level of theoretical strength as one which satisfies the assumptions and requirements set forth herein, one of ordinary skill in the art will appreciate that in many cases the level of strength that such an encoding scheme is able to provide will, depending on the application and the expected sophistication of attack, be adequate. Thus, the following analysis should be considered illustrative and not limiting as to the scope of the present invention.

1. Analysis

Suppose c fingerprints are used in an attack to create a corrupted fingerprint. We will refer to the c fingerprints as the "colluding fingerprints." The provider decodes the corrupted fingerprint successfully if some colluding fingerprint has a higher match than all non-colluding fingerprints.

It is possible for attackers to decrease the match of one colluding watermark at the cost of increasing the match of other colluding fingerprints. However, attackers need to minimize the maximum such match, so the strongest attack keeps the matches of all colluding fingerprints roughly the same. Assuming such an attack, it suffices to study the match of a randomly-chosen colluding fingerprint. Let, $f_r$=the corrupted fingerprint $f_c$=a colluding fingerprint, chosen randomly $f_a$=an assigned fingerprint, chosen randomly For decoding to succeed, a symbol in $f_r$ should be more likely to match the corresponding symbol in $f_c$ than it is to match the corresponding symbol in $f_a$. Let, $m_c$=probability that a symbol in $f_r$ matches the corresponding symbol in $f_c$ $m_a$=probability that a symbol in $f_r$ matches the corresponding symbol in $f_a$ $M(f)$=match of $f$ If ($m_c > m_a$), it is possible to increase the number of symbols in a fingerprint, n, to arbitrarily increase the probability that the $M(f_c) > M(f_a)$. In this case, the probability of decoder error can be reduced arbitrarily. Let, $e_1 = P\{M(f_c) \leq M(f_a)\}$, for a randomly-chosen $f_a$ e=probability of decoder error $= P\{M(f_c) \leq M(f_b)\}$, for at least one non-colluding fingerprint $f_b$ $< u * e_1$ Section 2, below, entitled "The Length of the Outer Code," shows how $e_1$ reduces as n increases. However, if $m_c$ is not greater than $m_a$, increasing n will not help the code resist collusion.

Next, we compute $m_c$ and $m_a$ under various forms of attacks. For simplicity of analysis, we assume that, if attackers detect one bit in a symbol, they detect the entire b-bit representation. This may actually happen if the bits of a symbol are located together in the fingerprinted content. In any case, this assumption is conservative: without it, the code would be more secure.

Let,

X=multi-set of c symbols found in some random position of the colluding fingerprints If all symbols in X are identical, the colluders cannot detect this symbol position, so the corrupted fingerprint $f_r$ contains the same symbol at that position. The fraction of symbol positions that remain undetected is expected to be:

$h = 1/q^{c-1}$

In an undetected position, $f_r$ matches $f_c$ perfectly and matches $f_a$ with probability 1/q. Therefore, $m_c = h*1 + (1-h)*m_c'$ $m_a = h*1/q + (1-h)*m_a'$ where, $m_c'$=probability that a detected symbol in $f_r$ matches the corresponding symbol in $f_c$ $m_a'$=probability that a detected symbol in $f_r$ matches the corresponding symbol in $f_a$ If the colluders detect a symbol position, they can set the corresponding symbol in the corrupted fingerprint in the following ways:

Retain Attack: An attacker might retain a symbol from X. In this case, $m_a' = 1/q$ and $m_c' = y/c$, where y is the number of times the retained symbol occurs in X. The strongest such attack would minimize $m_c'$ by retaining the minority symbol in X. If there were always a minority of 1, $m_c' = 1/c$. This suggests that if q<c, $m_c'$ might be less than $m_a'$, which might cause $m_c$ not to be greater than $m_a$, causing the code to fail. This is the case when q=2 and c=3. In this case, detected symbol positions always have a minority of one, so:

$m_c' = 1/3$ $m_a' = 1/2$ $h = 1/4$ $m_c = 1/4 + 3/4 * 1/3 = 1/2$ $m_a = 1/4 * 1/2 + 3/4 * 1/2 = 1/2$

In fact, we have found through simulations that even when the expected occurrence of the minority symbol in X is greater than 1 (true for c>3), the code fails when q<c. On the other hand, if q>c, we know that $m_c' \geq m_a'$, so $m_c \geq m_a$, and the code is secure provided n is suitably large.

Forge attack: In a forgery attack, the attacker forges a symbol not found in X. However, the set of valid symbol representations at any position is private to the provider. Therefore, the colluders cannot forge a valid symbol representation except by chance. (If the colluders could forge a valid symbol, they would gain a significant advantage: $m_a' = 1/q$ and $m_c' = 0$, causing the code to fail). Let, g=probability that a randomly chosen representation outside X is valid $= (q-z)/(2^b - z)$, where z=number of distinct symbols in X $< q/2^b$ Using the conservative value for g, $m_c' = 0$ $m_a' = g/q = 1/2^b$ Now we can compute the value of b needed to withstand attack.

$m_c = h$ $m_a = h/q + 1/2^b$

For $m_c > m_a$, $b > \log(q/(q-1) * 1/h)$ $= \log(q^c/(q-1))$ $= c * \log(q) - \log(q-1)$ Therefore, a conservative value for b is greater than $c * \log(q)$.

Note that when $q \geq c$, the minority-retain attack results in ($m_c' \geq m_a'$) while the forge attack results in ($m_c' < m_a'$). Therefore, when $q \geq c$, the forge attack is stronger.

2. The Length of the Outer Code

Here we show how $e_1$ decreases with n. $M(f_c)$ is a binomial variable $B[n, m_c]$. Similarly, $M(f_a)$ is $B[n, m_a]$. For large n, $B[n, p]$ is roughly normal, $N[n*p, n*p*(1-p)]$. If $M(f_c)$ and $M(f_a)$ are independent, their difference is roughly normal too, $N[n*(m_c - m_a), n*(m_c*(1-m_c) + m_a*(1-m_a))]$. Therefore, $e_1 = P\{M(f_c) - M(f_a) \leq 0\}$ $< \exp(-n/2 * (m_c - m_a)^2 / *(m_c*(1-m_c) + m_a*(1-m_a))$, by Laplace limit Therefore, it is sufficient to set n as follows to keep probability of decoder error under e:

$n > 2 * (m_c(1-m_c) + m_a(1-m_a))/(m_c - m_a)^2 * \log(u/e)$

Suppose $b = c*\log(q) + 1$. Then, $m_c = 1/q^{c-1}$ $m_a = 1/q^{c+1}/(2q^c) = 3/(2q^c)$ So a sufficient value for n is, $n = 2*(1/q^{c-1} + 3/(2q^c))/(1/q^{c-1} - 3/(2q^c))^2 * \log(u/e)$ $< 2*7/(4q^{c-1})/(1/(2q^c))^2 * \log(u/e)$, since $1/q^{c-1} \geq 2/q^c$ $= 2*7*q^{c+2}*\log(u/e)$ When q=c, $n = 14*c^{c+2}*\log(u/e)$ Note that the bit length of the watermark is $n*b = 14*c^{c+3}*\log(c)*\log(u/e)$.

What is claimed is:

1. A method for watermarking a piece of software to resist a collusive attack utilizing a system comprising a processor and a memory encoded with program instructions that, when executed by the processor, cause the processor to perform the method, the method comprising:

selecting a first alphabet having an alphabet-size greater than or equal to an expected number of colluders;

encoding a watermark as a quasi-random sequence of symbols chosen from said alphabet;

embedding the watermark in the piece of software as an outer code; and embedding an inner code in the piece of software.

2. The method as in claim 1, in which each symbol comprises a number of bits that is greater than or equal to the expected number of colluders multiplied by the natural logarithm of the first alphabet-size.

* * * * *